(12) United States Patent
Guatta et al.

(10) Patent No.: US 11,690,147 B2
(45) Date of Patent: *Jun. 27, 2023

(54) ELECTROMAGNETIC COOKING DEVICE WITH AUTOMATIC BOILING DETECTION AND METHOD OF CONTROLLING COOKING IN THE ELECTROMAGNETIC COOKING DEVICE

(71) Applicants: WHIRLPOOL CORPORATION, Benton Harbor, MI (US); Panasonic Corporation, Osaka (JP)

(72) Inventors: Davide Guatta, Brescia (IT); Valeria Nocella, Viterbo (IT)

(73) Assignees: Whirlpool Corporation, Benton Harbor, MI (US); Panasonic Holdings Corporation

(*) Notice: Subject to any disclaimer, the term of this patent is extended or adjusted under 35 U.S.C. 154(b) by 789 days.

This patent is subject to a terminal disclaimer.

(21) Appl. No.: 16/310,843

(22) PCT Filed: Dec. 29, 2016

(86) PCT No.: PCT/US2016/069240
§ 371 (c)(1),
(2) Date: Dec. 18, 2018

(87) PCT Pub. No.: WO2018/125146
PCT Pub. Date: Jul. 5, 2018

(65) Prior Publication Data
US 2020/0351993 A1 Nov. 5, 2020

(51) Int. Cl.
*H05B 6/68* (2006.01)
*H05B 6/70* (2006.01)
*H05B 6/72* (2006.01)

(52) U.S. Cl.
CPC ............ *H05B 6/687* (2013.01); *H05B 6/683* (2013.01); *H05B 6/686* (2013.01); *H05B 6/688* (2013.01);
(Continued)

(58) Field of Classification Search
CPC ........ H05B 6/681; H05B 6/683; H05B 6/686; H05B 6/687; H05B 6/688; H05B 6/70;
(Continued)

(56) References Cited

U.S. PATENT DOCUMENTS 3,536,129 A 10/1970 White
3,603,241 A 9/1971 Drucker
(Continued)

FOREIGN PATENT DOCUMENTS

CN 103175237 A 6/2013
CN 105392226 3/2016
(Continued)

*Primary Examiner* — Ibrahime A Abraham
*Assistant Examiner* — Frederick F Calvetti
(74) *Attorney, Agent, or Firm* — Price Heneveld LLP

(57) ABSTRACT

An electromagnetic cooking device and method of controlling the same is provided herein. The cooking device includes a cavity in which a liquid is placed and a plurality of RF feeds configured to introduce electromagnetic radiation into the cavity for heating the liquid. A controller is provided and is configured to analyze forward and backward power at the plurality of RF feeds to calculate efficiency; determine and monitor a coefficient of variation of the efficiency; detect a heating state in the liquid based on changes in the coefficient of variation; and adjust a power level of the electromagnetic radiation in response to detection of the heating state.

17 Claims, 49 Drawing Sheets

(52) U.S. Cl.
CPC ............... *H05B 6/70* (2013.01); *H05B 6/707* (2013.01); *H05B 6/72* (2013.01)

(58) Field of Classification Search
CPC .......... H05B 6/705; H05B 6/707; H05B 6/72; Y02B 40/00
USPC ....................................................... 219/687
See application file for complete search history.

(56) References Cited

U.S. PATENT DOCUMENTS

| | | | |
|---|---|---|---|
| 3,835,921 A | 9/1974 | Faris et al. | |
| 4,196,332 A | 4/1980 | MacKay B et al. | |
| 4,210,795 A | 7/1980 | Lentz | |
| 4,374,319 A | 2/1983 | Guibert | |
| 4,481,519 A | 11/1984 | Margerum | |
| 4,777,336 A | 10/1988 | Asmussen | |
| 4,831,239 A | 5/1989 | Ueda | |
| 4,868,357 A | 9/1989 | Serikawa et al. | |
| 4,996,403 A | 2/1991 | White | |
| 5,008,506 A | 4/1991 | Asmussen et al. | |
| 5,094,865 A | 3/1992 | Levinson | |
| 5,293,019 A | 3/1994 | Lee | |
| 5,360,965 A | 11/1994 | Ishii et al. | |
| 5,361,681 A | 11/1994 | Hedstrom et al. | |
| 5,369,253 A | 11/1994 | Kuwata et al. | |
| 5,389,764 A | 2/1995 | Nishii et al. | |
| 5,512,736 A | 4/1996 | Kang et al. | |
| 5,521,360 A | 5/1996 | Johnson et al. | |
| 5,632,921 A | 5/1997 | Risman et al. | |
| 5,648,038 A | 7/1997 | Fathi et al. | |
| 5,681,496 A | 10/1997 | Brownlow et al. | |
| 5,756,970 A | 5/1998 | Barger et al. | |
| 5,828,042 A | 10/1998 | Choi et al. | |
| 5,961,871 A | 10/1999 | Bible et al. | |
| 6,034,363 A | 3/2000 | Barmatz et al. | |
| 6,066,838 A | 5/2000 | Koda et al. | |
| 6,150,645 A | 11/2000 | Lewis et al. | |
| 6,172,348 B1 | 1/2001 | Koshino et al. | |
| 6,229,130 B1* | 5/2001 | Furuta ................... H05B 6/6455 374/149 |
| 6,559,882 B1 | 5/2003 | Kerchner | |
| 6,884,979 B1 | 4/2005 | Torngren et al. | |
| 7,105,787 B2 | 9/2006 | Clemen, Jr. | |
| 7,111,247 B2 | 9/2006 | Choi et al. | |
| 7,191,698 B2 | 3/2007 | Bond et al. | |
| 7,326,888 B2 | 2/2008 | Chun et al. | |
| 7,461,588 B2 | 12/2008 | Head | |
| 7,501,608 B2 | 3/2009 | Hallgren et al. | |
| 7,923,664 B2 | 4/2011 | Kruempelmann et al. | |
| 7,992,552 B2 | 8/2011 | Hirano et al. | |
| 8,207,479 B2 | 6/2012 | Ben-Shmuel et al. | |
| 8,218,402 B2 | 7/2012 | Lewis et al. | |
| 8,283,605 B2 | 10/2012 | Arione et al. | |
| 8,324,540 B2 | 12/2012 | Nordh et al. | |
| 8,330,085 B2 | 12/2012 | Ishizaki et al. | |
| 8,338,763 B2 | 12/2012 | Nordh et al. | |
| 8,389,916 B2* | 3/2013 | Ben-Shmuel ............... A23L 3/01 219/748 |
| 8,610,038 B2 | 12/2013 | Hyde et al. | |
| 8,742,305 B2 | 6/2014 | Simunovic et al. | |
| 8,742,306 B2 | 6/2014 | Atzmony et al. | |
| 8,839,527 B2 | 9/2014 | Ben-Shmuel et al. | |
| 8,922,969 B2 | 12/2014 | Sigalov et al. | |
| 8,927,913 B2 | 1/2015 | Hyde et al. | |
| 9,035,224 B2 | 5/2015 | Lim et al. | |
| 9,040,879 B2 | 5/2015 | Libman et al. | |
| 9,078,298 B2 | 7/2015 | Ben-Shmuel et al. | |
| 9,131,543 B2 | 9/2015 | Ben-Shmuel et al. | |
| 9,132,408 B2 | 9/2015 | Einziger et al. | |
| 9,161,390 B2 | 10/2015 | Gelbart et al. | |
| 9,161,394 B2 | 10/2015 | Carlsson et al. | |
| 9,167,633 B2 | 10/2015 | Ben-Shmuel et al. | |
| 9,210,740 B2* | 12/2015 | Libman ................... H05B 6/705 |
| 9,215,756 B2* | 12/2015 | Bilchinsky ............... H05B 1/02 |
| 9,301,344 B2 | 3/2016 | Ibragimov et al. | |
| 9,307,583 B2 | 4/2016 | Sim et al. | |
| 9,332,591 B2 | 5/2016 | Libman et al. | |
| 9,351,347 B2 | 5/2016 | Torres et al. | |
| 9,363,852 B2 | 6/2016 | Carlsson et al. | |
| 9,363,854 B2 | 6/2016 | Sim et al. | |
| 9,374,852 B2 | 6/2016 | Bilchinsky et al. | |
| 9,398,644 B2 | 7/2016 | Okajima | |
| 9,398,646 B2 | 7/2016 | Nobue et al. | |
| 9,414,444 B2 | 8/2016 | Libman et al. | |
| 9,459,346 B2 | 10/2016 | Einziger et al. | |
| 9,462,635 B2 | 10/2016 | Bilchinsky et al. | |
| 9,462,642 B2 | 10/2016 | Chu et al. | |
| 10,904,961 B2* | 1/2021 | Guatta ................... G01R 21/133 |
| 2003/0070799 A1 | 4/2003 | Mueller et al. | |
| 2006/0191926 A1 | 8/2006 | Ray et al. | |
| 2008/0105675 A1 | 5/2008 | Choi et al. | |
| 2008/0297208 A1 | 12/2008 | Baudin et al. | |
| 2009/0011101 A1 | 1/2009 | Doherty et al. | |
| 2009/0236333 A1 | 9/2009 | Ben-Shmuel et al. | |
| 2009/0236334 A1 | 9/2009 | Ben-Schmuel et al. | |
| 2009/0321428 A1 | 12/2009 | Hyde et al. | |
| 2010/0059509 A1 | 3/2010 | Imai et al. | |
| 2010/0176121 A1 | 7/2010 | Nobue et al. | |
| 2010/0176123 A1 | 7/2010 | Mihara et al. | |
| 2010/0182136 A1 | 7/2010 | Pryor | |
| 2010/0187224 A1 | 7/2010 | Hyde et al. | |
| 2010/0231506 A1 | 9/2010 | Pryor | |
| 2011/0139773 A1 | 6/2011 | Fagrell et al. | |
| 2012/0067873 A1 | 3/2012 | Mihara et al. | |
| 2012/0103972 A1* | 5/2012 | Okajima ................ H05B 6/686 219/490 |
| 2012/0168645 A1 | 7/2012 | Atzmony et al. | |
| 2012/0312801 A1* | 12/2012 | Bilchinsky ............... H05B 6/00 219/490 |
| 2013/0048881 A1 | 2/2013 | Einziger et al. | |
| 2013/0056460 A1* | 3/2013 | Ben-Shmuel .......... H05B 6/705 219/709 |
| 2013/0080098 A1 | 3/2013 | Hadad et al. | |
| 2013/0142923 A1* | 6/2013 | Torres ...................... A21D 8/06 219/709 |
| 2013/0146590 A1* | 6/2013 | Einziger .................. G01S 13/89 219/709 |
| 2013/0186887 A1 | 7/2013 | Hallgren et al. | |
| 2013/0200066 A1* | 8/2013 | Gelbart .................... H05B 6/70 219/492 |
| 2013/0206752 A1 | 8/2013 | Moon et al. | |
| 2013/0240757 A1 | 9/2013 | Einziger et al. | |
| 2013/0306627 A1* | 11/2013 | Libman ................... H05B 6/687 219/709 |
| 2013/0334215 A1 | 12/2013 | Chen et al. | |
| 2014/0203012 A1 | 7/2014 | Corona et al. | |
| 2014/0287100 A1 | 9/2014 | Libman | |
| 2014/0305934 A1 | 10/2014 | DeCamillis et al. | |
| 2015/0070029 A1* | 3/2015 | Libman ................... H05B 6/705 324/637 |
| 2015/0136760 A1 | 5/2015 | Lima et al. | |
| 2015/0156823 A1 | 6/2015 | Okajima | |
| 2015/0156827 A1 | 6/2015 | Ibragimov et al. | |
| 2015/0271877 A1* | 9/2015 | Johansson ............... H05B 6/686 219/750 |
| 2015/0346335 A1 | 12/2015 | Einziger et al. | |
| 2015/0366006 A1 | 12/2015 | Ben-Shmuel et al. | |
| 2016/0073453 A1 | 3/2016 | Hyde et al. | |
| 2016/0095171 A1 | 3/2016 | Chaimov et al. | |
| 2016/0128138 A1 | 5/2016 | Li et al. | |
| 2016/0205973 A1 | 7/2016 | An et al. | |
| 2016/0249416 A1 | 8/2016 | Elboim et al. | |
| 2016/0273970 A1 | 9/2016 | Alon et al. | |
| 2016/0278170 A1 | 9/2016 | Atherton et al. | |
| 2016/0323940 A1 | 11/2016 | Guatta | |
| 2016/0330803 A1 | 11/2016 | Guatta | |
| 2017/0290104 A1* | 10/2017 | Bullo ................... H05B 6/6438 |
| 2019/0191499 A1* | 6/2019 | Guatta ................... A23L 7/174 |
| 2019/0274196 A1* | 9/2019 | Guatta ................... H05B 6/50 |

(56) References Cited

U.S. PATENT DOCUMENTS

| | | | | |
|---|---|---|---|---|
| 2019/0313489 A1* | 10/2019 | Guatta | ............... | H05B 6/705 |
| 2021/0120639 A1* | 4/2021 | Guatta | ............... | H05B 6/705 |

FOREIGN PATENT DOCUMENTS

| | | | |
|---|---|---|---|
| EP | 0550312 | A2 | 7/1993 |
| EP | 1076475 | * | 2/2001 |
| EP | 1076475 | A2 | 2/2001 |
| EP | 1193584 | A1 | 4/2002 |
| EP | 1471773 | A2 | 10/2004 |
| EP | 1795814 | A2 | 6/2007 |
| EP | 2051564 | A2 | 4/2009 |
| EP | 2512206 | A1 | 10/2012 |
| EP | 2824991 | A1 | 1/2015 |
| EP | 2446703 | B1 | 4/2015 |
| EP | 2446704 | B1 | 4/2015 |
| EP | 2446705 | B1 | 4/2015 |
| EP | 2906021 | A1 | 8/2015 |
| EP | 2916619 | A1 | 9/2015 |
| EP | 2446706 | B1 | 1/2016 |
| EP | 2205043 | B1 | 1/2017 |
| EP | 2239994 | B1 | 11/2018 |
| FR | 2766272 | A1 | 1/1999 |
| GB | 2193619 | A | 2/1988 |
| RU | 2253193 | C2 | 5/2005 |
| TW | 419577 | * | 1/2001 |
| WO | 9107069 | | 5/1991 |
| WO | 9913688 | | 3/1999 |
| WO | 0036880 | | 6/2000 |
| WO | 0223953 | A1 | 3/2002 |
| WO | 2008018466 | A1 | 2/2008 |
| WO | 2010052724 | A2 | 5/2010 |
| WO | 2011058537 | A1 | 5/2011 |
| WO | 2011108016 | A1 | 9/2011 |
| WO | 2011138675 | A2 | 11/2011 |
| WO | 2011138688 | A2 | 11/2011 |
| WO | 2012052894 | A1 | 4/2012 |
| WO | 2012162072 | A1 | 11/2012 |
| WO | 2013078325 | A1 | 5/2013 |
| WO | 2014006510 | A2 | 1/2014 |
| WO | 2014024044 | A1 | 2/2014 |
| WO | 2015099651 | A1 | 7/2015 |
| WO | 2015127999 | A1 | 9/2015 |
| WO | 2016144872 | A1 | 9/2016 |

* cited by examiner

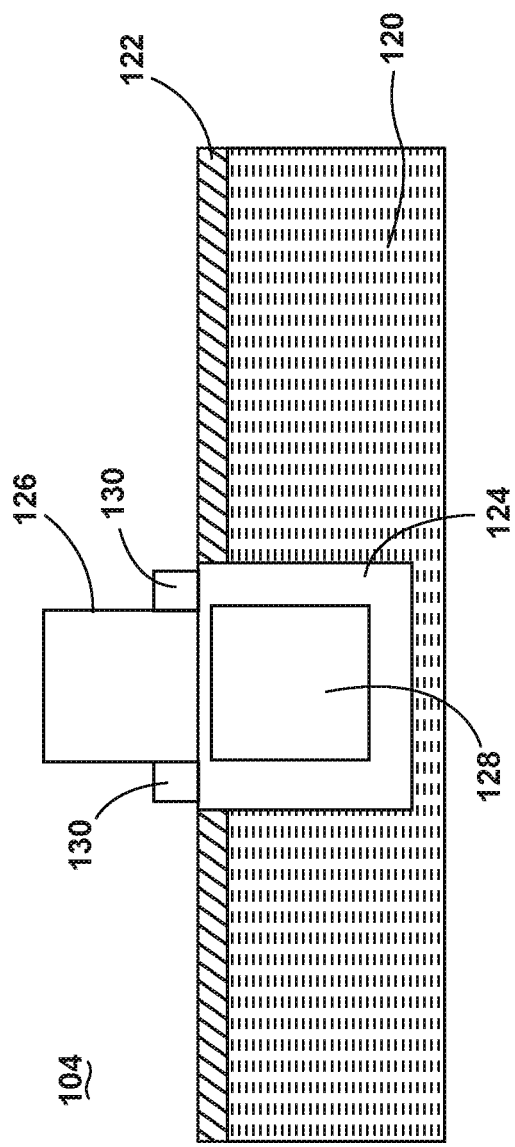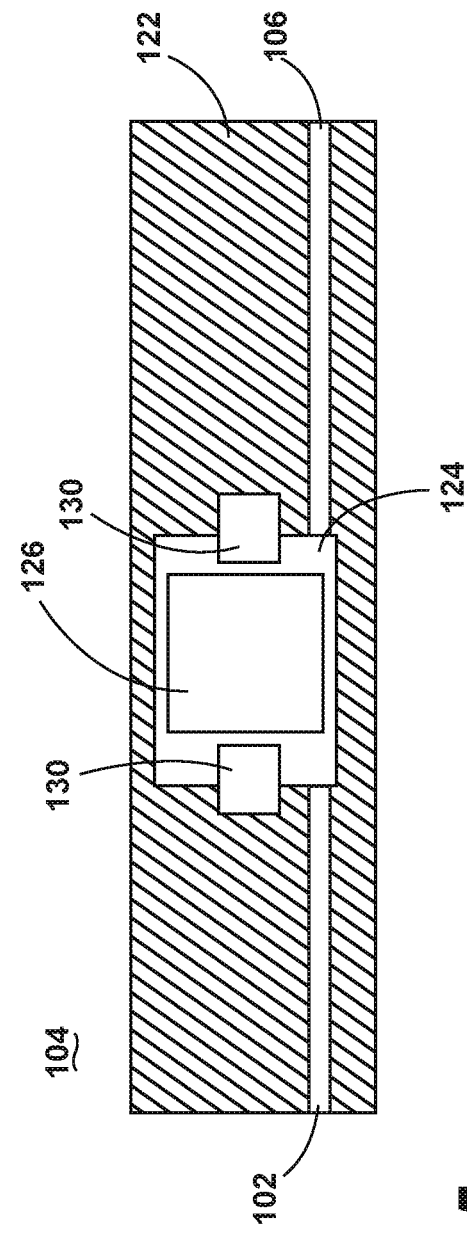

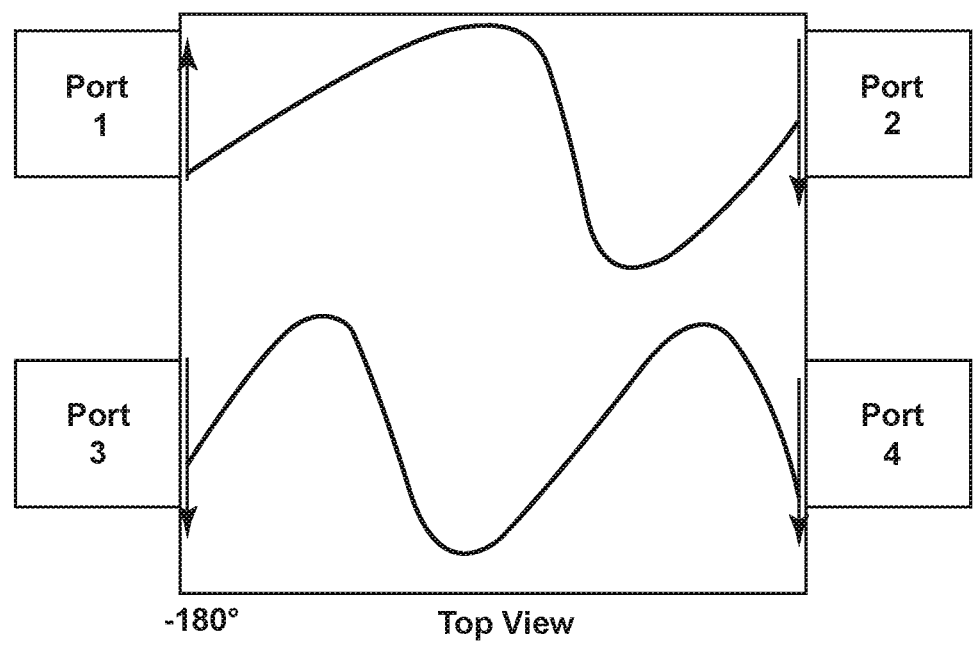
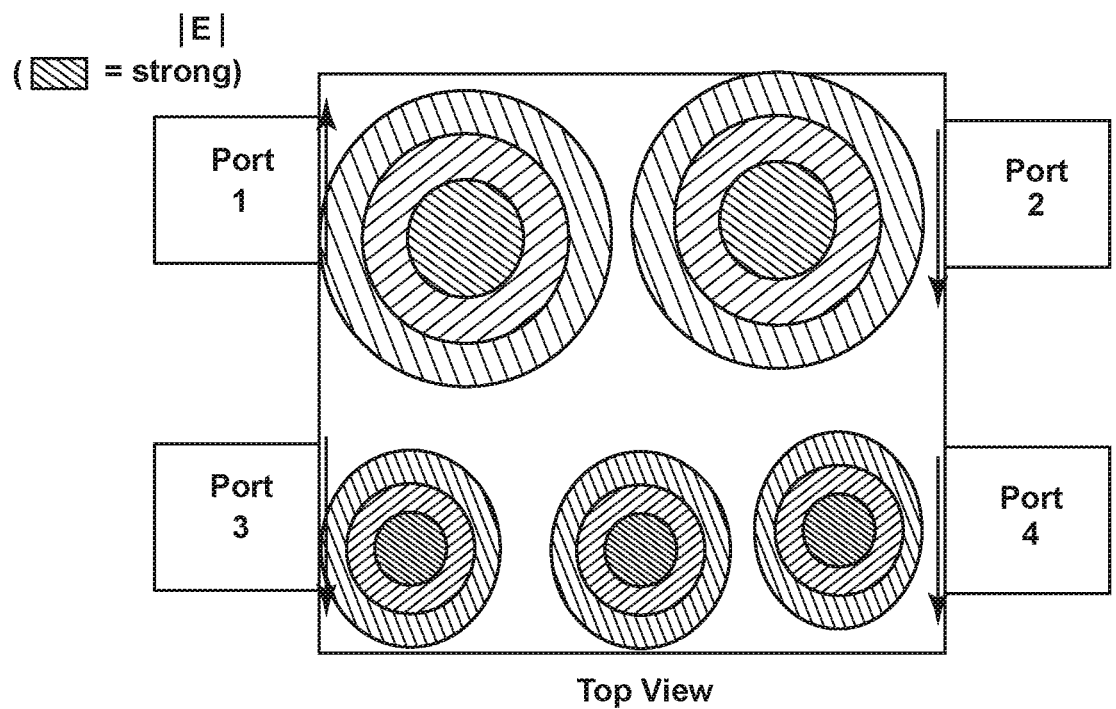
FIG. 15

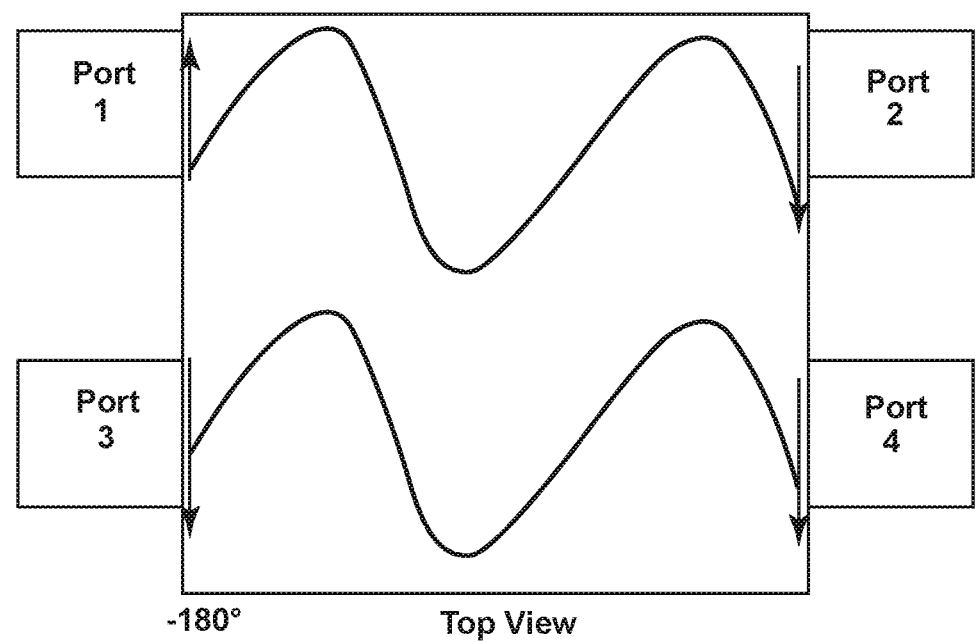
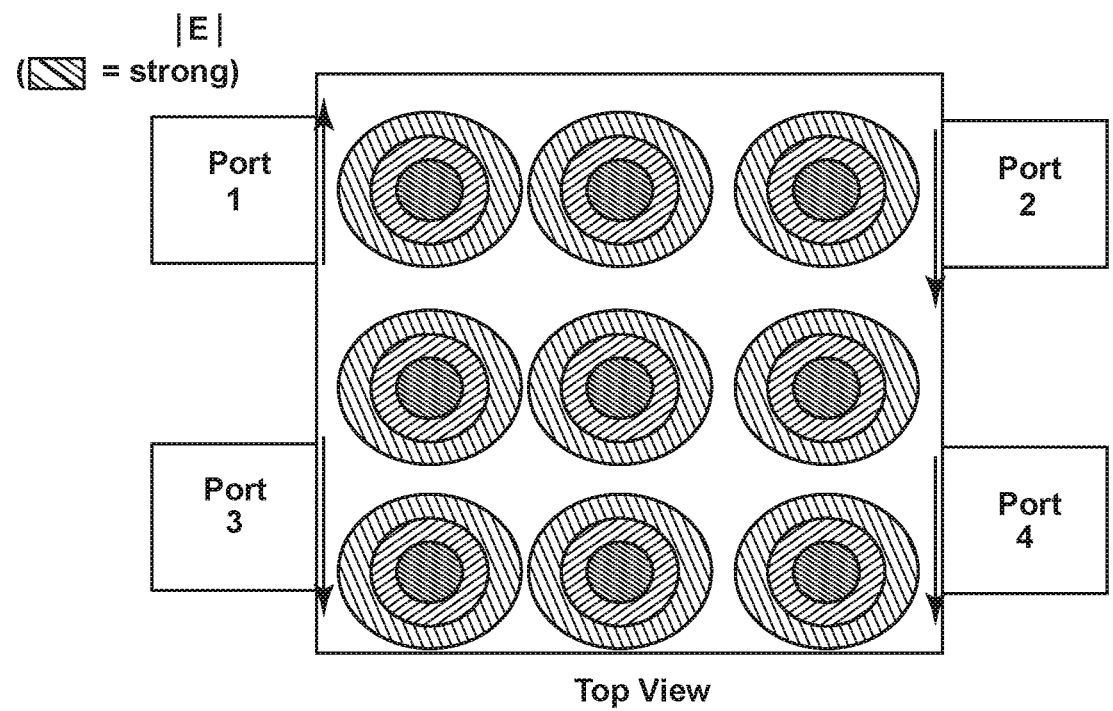
FIG. 16

ELECTROMAGNETIC COOKING DEVICE WITH AUTOMATIC BOILING DETECTION AND METHOD OF CONTROLLING COOKING IN THE ELECTROMAGNETIC COOKING DEVICE

BACKGROUND

The present device generally relates to a method and device for electromagnetic cooking, and more specifically, to a method and device for determining and controlling the resonant modes within a microwave oven.

A conventional microwave oven cooks food by a process of dielectric heating in which a high-frequency alternating electromagnetic field is distributed throughout an enclosed cavity. A sub-band of the radio frequency spectrum, microwave frequencies at or around 2.45 GHz cause dielectric heating primarily by absorption of energy in water.

To generate microwave frequency radiation in a conventional microwave, a voltage applied to a high-voltage transformer results in a high-voltage power that is applied to a magnetron that generates microwave frequency radiation. The microwaves are then transmitted to an enclosed cavity containing the food through a waveguide. Cooking food in an enclosed cavity with a single, non-coherent source like a magnetron can result in non-uniform heating of the food. To more evenly heat food, microwave ovens include, among other things, mechanical solutions such as a microwave stirrer and a turntable for rotating the food. A common magnetron-based microwave source is not narrowband and not tunable (i.e. emits microwaves at a frequency that is changing over time and not selectable). As an alternative to such a common magnetron-based microwave source, solid-state sources can be included in microwave ovens which are tunable and coherent.

SUMMARY

According to one aspect of the present invention, an electromagnetic cooking device is provided. The cooking device includes a cavity in which a liquid is placed and a plurality of RF feeds configured to introduce electromagnetic radiation into the cavity for heating the liquid. A controller is provided and is configured to analyze forward and backward power at the plurality of RF feeds to calculate efficiency; determine and monitor a coefficient of variation of the efficiency; detect a heating state in the liquid based on changes in the coefficient of variation; and adjust a power level of the electromagnetic radiation in response to detection of the heating state.

According to another aspect of the present invention, a method of controlling cooking in an electromagnetic cooking device is provided. The electromagnetic cooking device has a cavity in which a liquid is placed and a plurality of RF feeds configured to introduce electromagnetic radiation into the cavity to heat the liquid. The method includes the steps of analyzing forward and backward power at the plurality of RF feeds to calculate efficiency, determining a coefficient of variation of the efficiency, detecting a heating state in the liquid based on changes in the coefficient of variation, and adjusting a power level of the electromagnetic radiation in response to detection of the heating state.

According to yet another aspect of the present invention, an electromagnetic cooking device is provided. The cooking device includes a cavity in which a liquid is placed, a plurality of RF feeds configured to introduce electromagnetic radiation into the cavity to heat the liquid, and a user interface with which to specify a heating process for the liquid. A controller is provided and is configured to: analyze forward and backward power at the plurality of RF feeds to calculate efficiency; determine and monitor a coefficient of variation of the efficiency, the coefficient of variation being proportional to a boiling level of the liquid; detect a heating state in the liquid based on changes in the coefficient of variation, the heating state being determined by the heating process specified via the user interface; and adjust a power level of the electromagnetic radiation in response to detection of the heating state.

BRIEF DESCRIPTION OF THE DRAWINGS

In the drawings:

FIG. 4 is a cross-sectional diagram illustrating an integrated circulator for use in a high-power radio frequency amplifier in accordance with various aspects described herein;

FIG. 5 is a top-view diagram illustrating the integrated circulator of FIG. 4;

FIG. 15 is a diagram illustrating features of a method to characterize the unbalanced resonant modes of the cavity in accordance with various aspects described herein;

FIG. 16 is a diagram illustrating features of a method to characterize the balanced resonant modes of the cavity in accordance with various aspects described herein;

DETAILED DESCRIPTION

It is to be understood that the specific devices and processes illustrated in the attached drawings, and described in the following specification are simply exemplary embodiments of the inventive concepts defined in the appended claims. Hence, other physical characteristics relating to the embodiments disclosed herein are not to be considered as limiting, unless the claims expressly state otherwise.

A solid-state radio frequency (RF) cooking appliance heats up and prepares food by introducing electromagnetic radiation into an enclosed cavity. Multiple RF feeds at different locations in the enclosed cavity produce dynamic electromagnetic wave patterns as they radiate. To control and shape of the wave patterns in the enclosed cavity, the multiple RF feeds can radiate waves with separately controlled electromagnetic characteristics to maintain coherence (that is, a stationary interference pattern) within the enclosed cavity. For example, each RF feed can transmit a different frequency, phase and/or amplitude with respect to the other feeds. Other electromagnetic characteristics can be common among the RF feeds. For example, each RF feed can transmit at a common but variable frequency. Although the following embodiments are directed to a cooking appliance where RF feeds direct electromagnetic radiation to heat an object in an enclosed cavity, it will be understood that the methods described herein and the inventive concepts derived therefrom are not so limited. The covered concepts and methods are applicable to any RF device where electromagnetic radiation is directed to an enclosed cavity to act on an object inside the cavity. Exemplary devices include ovens, dryers, steamers, and the like.

Figure 1:
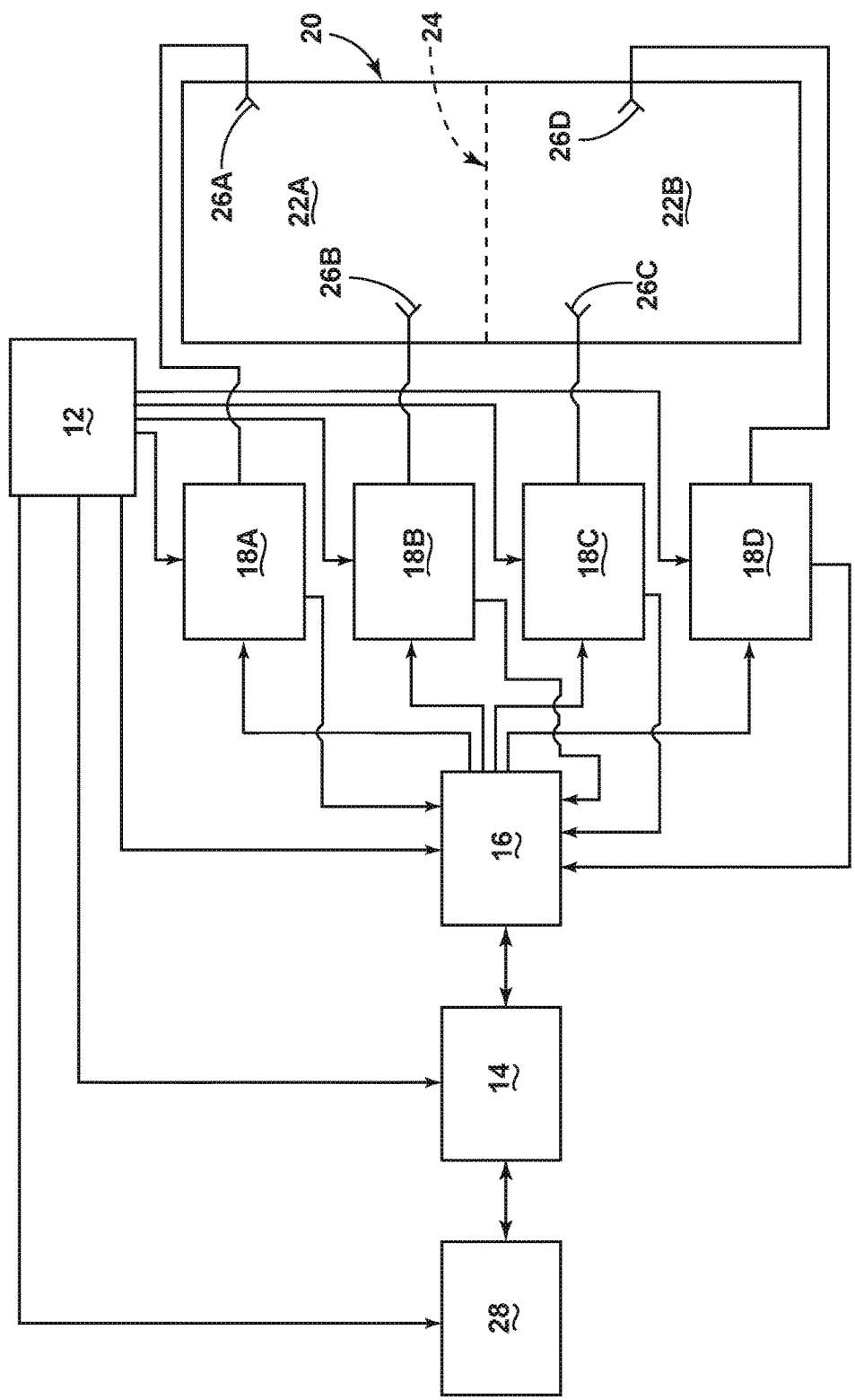
FIG. 1 is a block diagram of an electromagnetic cooking device with multiple coherent radio frequency feeds in accordance with various aspects described herein.

FIG. 1 shows a block diagram of an electromagnetic cooking device 10 with multiple coherent RF feeds 26A-D according to one embodiment. As shown in FIG. 1, the electromagnetic cooking device 10 includes a power supply 12, a controller 14, an RF signal generator 16, a human-machine interface 28 and multiple high-power RF amplifiers 18A-D coupled to the multiple RF feeds 26A-D. The multiple RF feeds 26A-D each transfer RF power from one of the multiple high-power RF amplifiers 18A-D into an enclosed cavity 20.

The power supply 12 provides electrical power derived from mains electricity to the controller 14, the RF signal generator 16, the human-machine interface 28 and the multiple high-power RF amplifiers 18A-D. The power supply 12 converts the mains electricity to the required power level of each of the devices it powers. The power supply 12 can deliver a variable output voltage level. For example, the power supply 12 can output a voltage level selectively controlled in 0.5-Volt steps. In this way, the power supply 12 can be configured to typically supply 28 Volts direct current to each of the high-power RF amplifiers 18A-D, but can supply a lower voltage, such as 15 Volts direct current, to decrease an RF output power level by a desired level.

A controller 14 can be included in the electromagnetic cooking device 10, which can be operably coupled with various components of the electromagnetic cooking device 10 to implement a cooking cycle. The controller 14 can also be operably coupled with a control panel or human-machine interface 28 for receiving user-selected inputs and communicating information to a user. The human-machine interface 28 can include operational controls such as dials, lights, switches, touch screen elements, and displays enabling a user to input commands, such as a cooking cycle, to the controller 14 and receive information. The user interface 28 can include one or more elements, which can be centralized or dispersed relative to each other. The controller 14 may also select the voltage level supplied by power supply 12.

The controller 14 can be provided with a memory and a central processing unit (CPU), and can be preferably embodied in a microcontroller. The memory can be used for storing control software that can be executed by the CPU in completing a cooking cycle. For example, the memory can store one or more pre-programmed cooking cycles that can be selected by a user and completed by the electromagnetic cooking device 10. The controller 14 can also receive input from one or more sensors. Non-limiting examples of sensors that can be communicably coupled with the controller 14 include peak level detectors known in the art of RF engineering for measuring RF power levels and temperature sensors for measuring the temperature of the enclosed cavity or one or more of the high-power amplifiers 18A-D.

Based on the user input provided by the human-machine interface 28 and data including the forward and backward (or reflected) power magnitudes coming from the multiple high-power RF amplifiers 18A-D (represented in FIG. 1 by the path from each of the high-power amplifiers 18A-D through the RF signal generator 16 to the controller 14), the controller 14 can determine the cooking strategy and calculate the settings for the RF signal generator 16. In this way, one of the main functions of the controller 14 is to actuate the electromagnetic cooking device 10 to instantiate the cooking cycle as initiated by the user. The RF signal generator 16 as described below then can generate multiple RF waveforms, that is, one for each high-power amplifier 18A-D based on the settings indicated by the controller 14.

The high-power amplifiers 18A-D, each coupled to one of the RF feeds 26A-D, each output a high power RF signal based on a low power RF signal provided by the RF signal generator 16. The low power RF signal input to each of the high-power amplifiers 18A-D can be amplified by transforming the direct current electrical power provided by the power supply 12 into a high power radio frequency signal. In one non-limiting example, each high-power amplifier 18A-D can be configured to output an RF signal ranging from 50 to 250 Watts. The maximum output wattage for each high-power amplifier can be more or less than 250 Watts depending upon the implementation. Each high-power amplifier 18A-D can include a dummy load to absorb excessive RF reflections.

The multiple RF feeds 26A-D transfer power from the multiple high-power RF amplifiers 18A-D to the enclosed cavity 20. The multiple RF feeds 26A-D can be coupled to the enclosed cavity 20 in spatially separated but fixed physical locations. The multiple RF feeds 26A-D can be implemented via waveguide structures designed for low power loss propagation of RF signals. In one non-limiting example, metallic, rectangular waveguides known in microwave engineering are capable of guiding RF power from a high-power amplifier 18A-D to the enclosed cavity 20 with a power attenuation of approximately 0.03 decibels per meter.

Additionally, each of the RF feeds 26A-D can include a sensing capability to measure the magnitude of the forward and the backward power levels or phase at the amplifier output. The measured backward power indicates a power level returned to the high-power amplifier 18A-D as a result of an impedance mismatch between the high-power amplifier 18A-D and the enclosed cavity 20. Besides providing feedback to the controller 14 and the RF signal generator 16 to implement, in part, a cooking strategy, the backward power level can indicate excess reflected power that can damage the high-power amplifier 18A-D.

Along with the determination of the backward power level at each of the high-power amplifiers 18A-D, temperature sensing at the high-power amplifier 18A-D, including at the dummy load, can provide the data necessary to determine if the backward power level has exceeded a predetermined threshold. If the threshold is exceeded, any of the controlling elements in the RF transmission chain including the power supply 12, controller 14, the RF signal generator 16, or the high-power amplifier 18A-D can determine that the high-power amplifier 18A-D can be switched to a lower power level or completely turned off. For example, each high-power amplifier 18A-D can switch itself off automatically if the backward power level or sensed temperature is too high for several milliseconds. Alternatively, the power supply 12 can cut the direct current power supplied to the high-power amplifier 18A-D.

The enclosed cavity 20 can selectively include subcavities 22A-B by insertion of an optional divider 24 therein. The enclosed cavity 20 can include, on at least one side, a shielded door to allow user access to the interior of the enclosed cavity 20 for placement and retrieval of food or the optional divider 24.

The transmitted bandwidth of each of the RF feeds 26A-D can include frequencies ranging from 2.4 GHz to 2.5 GHz. The RF feeds 26A-D can be configured to transmit other RF bands. For example, the bandwidth of frequencies between 2.4 GHz and 2.5 GHz is one of several bands that make up the industrial, scientific and medical (ISM) radio bands. The transmission of other RF bands is contemplated and can include non-limiting examples contained in the ISM bands defined by the frequencies: 13.553 MHz to 13.567 MHz, 26.957 MHz to 27.283 MHz, 902 MHz to 928 MHz, 5.725 GHz to 5.875 GHz and 24 GHz to 24.250 GHz.

Figure 2:
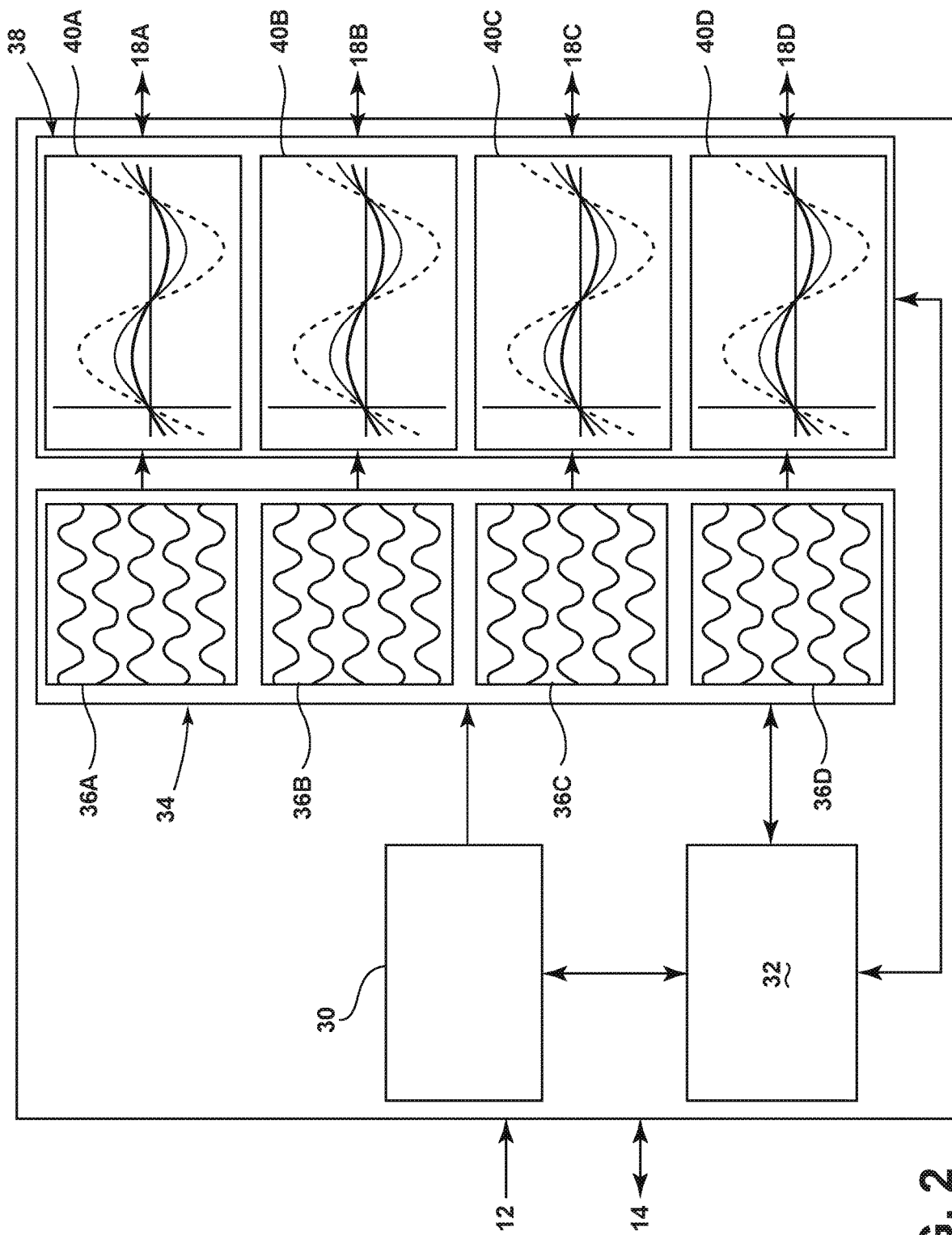
FIG. 2 is a block diagram of a radio frequency signal generator of FIG. 1.

Referring now to FIG. 2, a block diagram of the RF signal generator 16 is shown. The RF signal generator 16 includes a frequency generator 30, a phase generator 34 and an amplitude generator 38 sequentially coupled and all under the direction of an RF controller 32. In this way, the actual frequency, phases and amplitudes to be output from the RF signal generator 16 to the high-power amplifiers are programmable through the RF controller 32, preferably implemented as a digital control interface. The RF signal generator 16 can be physically separate from the cooking controller 14 or can be physically mounted onto or integrated into the controller 14. The RF signal generator 16 is preferably implemented as a bespoke integrated circuit.

As shown in FIG. 2 the RF signal generator 16 outputs four RF channels 40A-D that share a common but variable frequency (e.g. ranging from 2.4 GHz to 2.5 GHz), but are settable in phase and amplitude for each RF channel 40A-D. The configuration described herein is exemplary and should not be considered limiting. For example, the RF signal generator 16 can be configured to output more or less channels and can include the capability to output a unique variable frequency for each of the channels depending upon the implementation.

As previously described, the RF signal generator 16 can derive power from the power supply 12 and input one or more control signals from the controller 14. Additional inputs can include the forward and backward power levels determined by the high-power amplifiers 18A-D. Based on these inputs, the RF controller 32 can select a frequency and signal the frequency generator 30 to output a signal indicative of the selected frequency. As represented pictorially in the block representing the frequency generator 30 in FIG. 2, the selected frequency determines a sinusoidal signal whose frequency ranges across a set of discrete frequencies. In one non-limiting example, a selectable bandwidth ranging from 2.4 GHz to 2.5 GHz can be discretized at a resolution of 1 MHz allowing for 101 unique frequency selections.

After the frequency generator 30, the signal is divided per output channel and directed to the phase generator 34. Each channel can be assigned a distinct phase, that is, the initial angle of a sinusoidal function. As represented pictorially in the block representing the per channel phase generator 36A-D in FIG. 2, the selected phase of the RF signal for a channel can range across a set of discrete angles. In one non-limiting example, a selectable phase (wrapped across half a cycle of oscillation or 180 degrees) can be discretized at a resolution of 10 degrees allowing for 19 unique phase selections per channel.

Subsequent to the phase generator 34, the RF signal per channel can be directed to the amplitude generator 38. The RF controller 32 can assign each channel (shown in FIG. 2 with a common frequency and distinct phase) to output a distinct amplitude in the channel 40A-D. As represented pictorially in the block representing the per channel amplitude generator in FIG. 2, the selected amplitude of the RF signal can range across a set of discrete amplitudes (or power levels). In one non-limiting example, a selectable amplitude can be discretized at a resolution of 0.5 decibels across a range of 0 to 23 decibels allowing for 47 unique amplitude selections per channel.

The amplitude of each channel 40A-D can be controlled by one of several methods depending upon the implementation. For example, control of the supply voltage of the amplitude generator 38 for each channel can result in an output amplitude for each channel 40A-D from the RF signal generator 16 that is directly proportional to the desired RF signal output for the respective high-power amplifier 18A-D. Alternatively, the per channel output can be encoded as a pulse-width modulated signal where the amplitude level is encoded by the duty cycle of the pulse-width modulated signal. Yet another alternative is to coordinate the per channel output of the power supply 12 to vary the supply voltage supplied to each of the high-power amplifiers 18A-D to control the final amplitude of the RF signal transmitted to the enclosed cavity 20.

As described above, the electromagnetic cooking device 10 can deliver a controlled amount of power at multiple RF feeds 26A-D into the enclosed cavity 20. Further, by maintaining control of the amplitude, frequency and phase of the power delivered from each RF feed 26A-D, the electromagnetic cooking device 10 can coherently control the power delivered into the enclosed cavity 20. Coherent RF sources deliver power in a controlled manner to exploit the interference properties of electromagnetic waves. That is, over a defined area of space and duration of time, coherent RF sources can produce stationary interference patterns such that the electric field is distributed in an additive manner. Consequently, interference patterns can add to create an electromagnetic field distribution that is greater in amplitude than any of the RF sources (i.e. constructive interference) or less than any of the RF sources (i.e. destructive interference).

The coordination of the RF sources and characterization of the operating environment (i.e. the enclosed cavity and the contents within) can enable coherent control of the electromagnetic cooking and maximize the coupling of RF power with an object in the enclosed cavity 20. Efficient transmission into the operating environment can require calibration of the RF generating procedure. As described above, in an electromagnetic heating system, the power level can be controlled by many components including the voltage output from the power supply 12, the gain on stages of variable gain amplifiers including both the high-power amplifiers 18A-D and the amplitude generator 38, the tuning frequency of the frequency generator 30, etc. Other factors that affect the output power level include the age of the components, inter-component interaction and component temperature.

Figure 3:
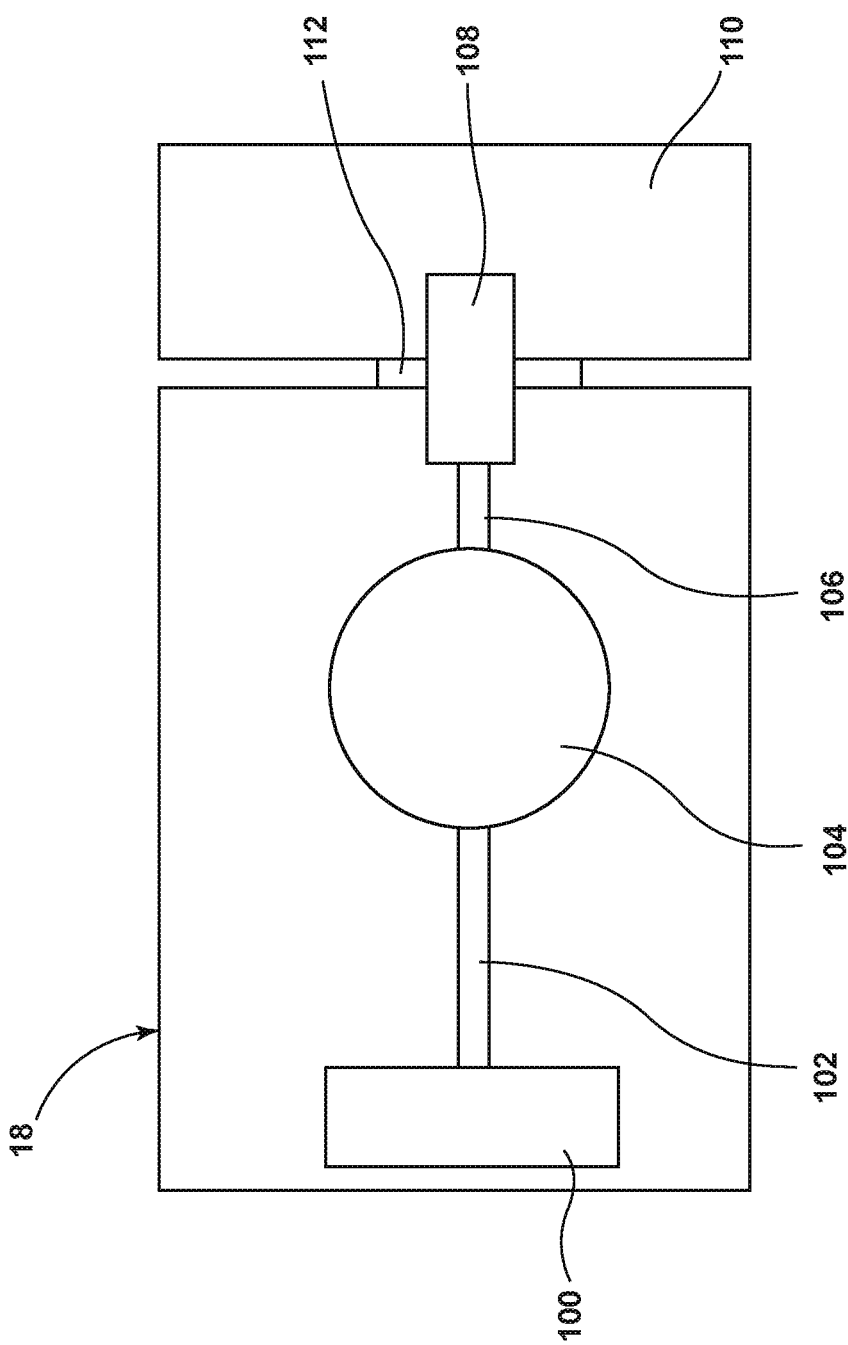
FIG. 3 is a schematic diagram illustrating a high-power radio frequency amplifier coupled to a waveguide in accordance with various aspects described herein.

Referring now to FIG. 3, a schematic diagram illustrating a high-power amplifier 18 coupled to a waveguide 110 in accordance with various aspects described herein is shown. The high-power amplifier 18 includes one or more amplification stages 100 coupled via a guiding structure 102 to a circulator 104. The circulator 104 is coupled by a guiding structure 106 to a waveguide exciter 108. The high-power amplifier 18 is electrically coupled to the waveguide 110 by the waveguide exciter 108 and mechanically coupled by an electromagnetic gasket 112.

The high-power amplifier 18 is configured such that a number of amplification stages 100 are interconnected to amplify a radio frequency signal from the amplifier input to the amplifier output. The amplification stages 100 include one or more transistors configured to convert a small change in input voltage to produce a large change in output voltage. Depending upon the configuration of the circuit, the amplification stages 100 can produce a current gain, a voltage gain or both.

The output of the amplification stages 100 is coupled to the circulator 104 via a guiding structure 102. The guiding structure 102 can be any electrical connector capable of carrying high-power radio frequency signal including but not limited to a microstrip printed on a dielectric substrate of a printed circuit board. The circulator 104 is a passive multi-port component that transmits radio frequency signals from one port to the next where a port is a point on the circulator 104 for coupling a radio frequency signal from one component to another. In the high-power amplifier 18, the circulator 104 acts as a protective device to isolate the amplification stages 100 from deleterious effects that can occur when a mismatched load reflects power.

The circulator 104 is coupled to the waveguide exciter 108 via the guiding structure 106. The high-power amplifier 18 is terminated at its output by the waveguide exciter 108. The waveguide exciter 108 converts electromagnetic energy from a first mode suitable for transmission within the high-power amplifier 18 to a second mode suitable for transmission within the waveguide 110. In this way, the waveguide 110 acts as an RF feed 26A-D to convey the amplified electromagnetic signal from the high-power amplifier to the microwave cavity.

The electromagnetic gasket 112 provides a secure connection between the high-power amplifier 18 and the waveguide 110 and surrounds the portion of the waveguide exciter 108 positioned between the high-power amplifier 18 and the waveguide 110. The electromagnetic gasket 112 can be formed of one or more materials useful for securing the connection between the high-power amplifier 18 and the waveguide 110 and providing electromagnetic shielding at radio frequencies. Such materials can include, but are not limited to, silicone-based constituents filled with conductive particles such as silver or nickel.

The provision of the waveguide exciter 108 that terminates the output of the high-power amplifier 18 reduces the electromagnetic losses typically incurred at the junction of microwave devices coupled via conventional connectors. That is, conventional microwave devices are interconnected via coaxial connectors (e.g. BNC or N-type connectors) that incur RF losses due to the additional path lengths for the connectors as well as the losses at the coupling of the coaxial connectors. The electromagnetic gasket 112 augments the efficiency of the waveguide exciter 108 by shielding the waveguide exciter 108 as well as providing the mechanical support of the coupling between the high-power amplifier 18 and the waveguide 110.

Referring now to FIG. 4, a cross-sectional side view illustrating the circulator 104 in accordance with various aspects described herein is shown. As described above, the circulator 104 is coupled to the output of the amplification stages via the guiding structure 102. The circulator 104 includes a laminate 122 mounted to a metal base plate 120.

Two ferrite magnets 126, 128 in axial alignment perpendicular to the laminate 122 are secured to the laminate 122 by clips 130. The ferrite magnets 126, 128 can be any shape suitable for the circulator design, including, but not limited to a disk.

The guiding structure 102 can include a microstrip that is printed on a laminate 122. The laminate 122 is a dielectric substrate that can include any material suitable for the provision of insulating layers of a printed circuit board including, but not limited to, FR-2 material or FR-4 material. The laminate 122 is positioned on the metal base plate 120 that provides mechanical support to the circulator 104. Additionally, the metal base plate 120 acts as a thermal dissipating mass and to spread heat generated by the circulator 104. The metal base plate 120 includes a pocket 124 to house the lower ferrite magnet 128.

During the manufacturing of the circulator 104, the lower ferrite magnet 128 is placed in the pocket 124 of the metal base plate 120. The laminate 122 and microstrip guiding structure are applied to the metal base plate 120. The upper ferrite magnet 126 is placed above lower ferrite magnet 128 and secured to the laminate 122 by clips 130.

FIG. 5 is a top-view diagram illustrating the integrated circulator of FIG. 4. As described, the circulator 104 includes, as part of its magnetic circuit, the laminate 122 of a printed circuit board as well as the microstrip guiding structure 102 coupled to the output of the amplification stages (cf. element 100 in FIG. 3). In this way, the circulator 104 does not include input or output pins that require a soldered connection during the manufacturing process. Conventional solder joints can expose the high-power amplifier to reliability issues because the soldering process can result in cold-spots or bad couplings. Therefore, the circulator 104 is not a conventional discrete component soldered in the high-power amplifier. Instead the circulator 104 is directly integrated as a component of the high-power amplifier.

For the output power level at the end of the amplification stages 100 to hit a desired set-point level, the RF signal generator (cf. element 16 in FIG. 1) can rely on feedback in the form of signals indicative of the forward and backward power levels or the relative phases of the radio frequency signals conveyed to the enclosed cavity (cf. element 20 in FIG. 1). Therefore, in addition to the amplifying components for outputting a radio frequency signal that is amplified in power with respect to an input radio frequency signal, conventional high-power amplifiers can include a measuring component that outputs a signal indicative of the radio frequency power transmitted and received by the amplifying component. However, by integrating such a measurement component within the high-power amplifier, the output stage of a high-power amplifier can incur electrical losses that can reduce the power and fidelity of the radio frequency signal output to the radio frequency feed (cf. elements 26A-D in FIG. 1) such as a waveguide.

Figure 6:
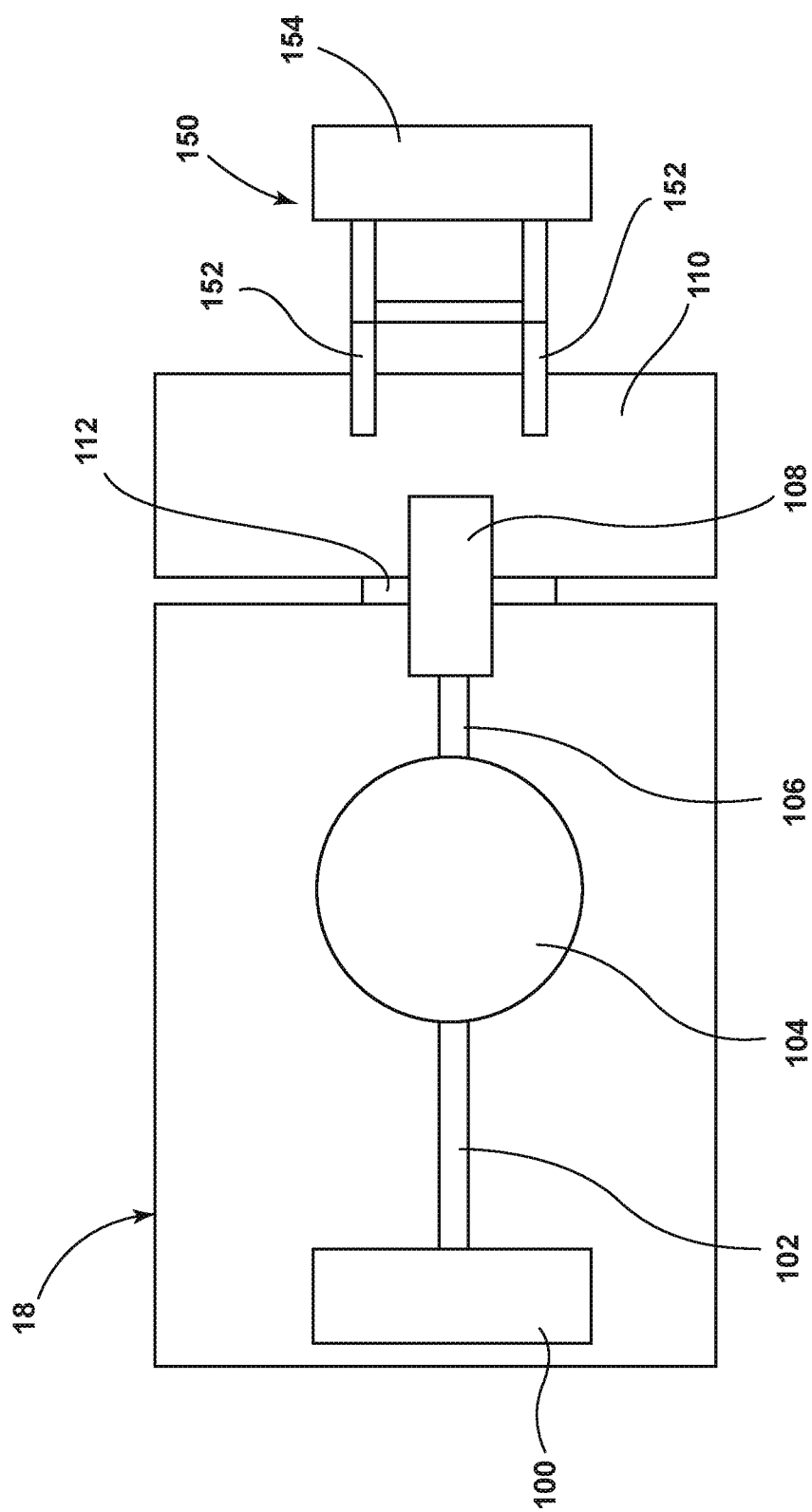
FIG. 6 is a schematic diagram illustrating a high-power radio frequency amplifier coupled to a waveguide with an integrated measurement system in accordance with various aspects described herein.

Referring now to FIG. 6, schematic diagram illustrating a high-power amplifier 18 coupled to a waveguide 110 with an integrated measurement system 150 in accordance with various aspects described herein is shown. The integrated measurement system 150 includes probe antennas 152 coupled to electronic components 154. The probe antennas 152 include portions located within the waveguide 110 that convert radio frequency electromagnetic waves within the waveguide 110 into an analog electric power signal. The probe antennas 152 can be any type of antenna useful for measuring radio frequency electromagnetic waves within a waveguide, including but not limited to, dipole antennas.

The electronic components 154 are coupled to the probe antennas 152 and can include an analog-to-digital convertor (ADC) such that the output signal is digital and readily input to a device such as the RF signal generator (cf. element 16 in FIG. 1), controller (cf. element 14 in FIG. 1) or the RF controller (cf. element 32 in FIG. 1). The electronic components 154 can be any component useful for the measurement of radio frequency signals including, but not limited to, radio frequency log power detectors that provide a direct current output voltage that is log-linear with respect to the detected radio frequency power level within the waveguide 110.

Figure 7:
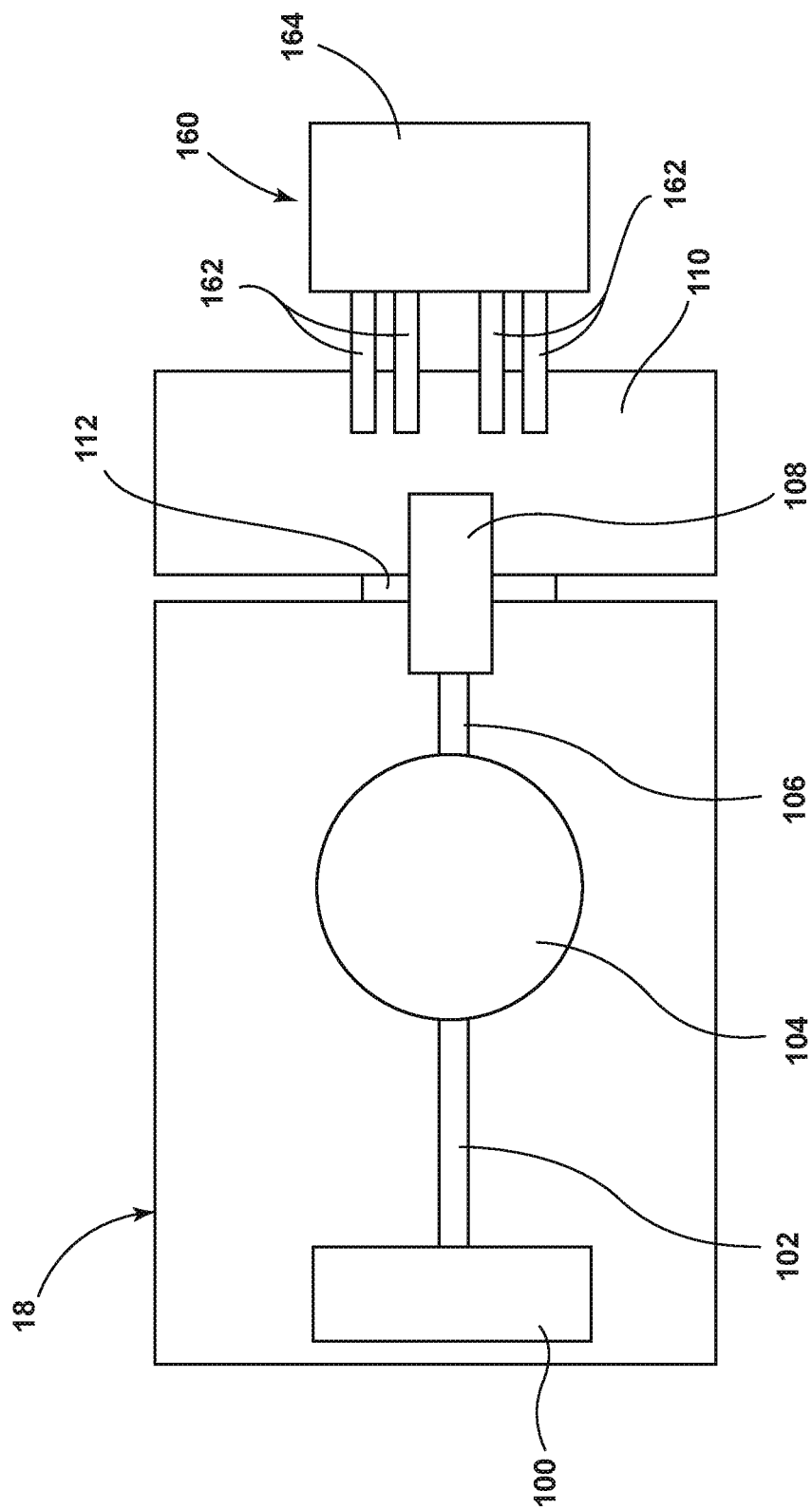
FIG. 7 is a schematic diagram illustrating a high-power radio frequency amplifier coupled to a waveguide with an integrated measurement system including a reflectometer in accordance with various aspects described herein.

The measurement system can include additional components useful for further characterizing the radio frequency transmissions conveyed through the waveguide 110. Referring now to FIG. 7, a schematic diagram illustrating a high-power radio frequency amplifier 18 coupled to a waveguide 110 with an integrated measurement system 160 that includes a reflectometer 164 in accordance with various aspects described herein is shown. The integrated measurement system 160 includes probe antennas 162 coupled to a reflectometer 164. The probe antennas 162 include portions located within the waveguide 110 that convert radio frequency electromagnetic waves within the waveguide 110 into an analog electric power signal. The probe antennas 162 can be any type of antenna useful for measuring radio frequency electromagnetic waves within a waveguide, including but not limited to, dipole antennas.

The reflectometer 164 can include any components useful for measuring the phase of a radio frequency signal including, but not limited to, a directional coupler containing matched calibrated detectors or a pair of single-detector couplers oriented so as to measure the electrical power flowing in both directions within the waveguide 110. In this way, the integrated measurement system 160 can characterize the radio frequency transmissions according to power and phase and can be used to form a networked description as embodied in the scattering matrix or S-parameters. In one non-limiting implementation, the reflectometer 164 is a six port reflectometer configured to measure the phase of the forward and backward radio frequency radiation within the waveguide.

The reflectometer 164 is coupled to the probe antennas 162 and can include an analog-to-digital convertor (ADC) such that the output signal indicative of the phase or power of the radio frequency electromagnetic wave within the waveguide 110 or scattering matrix is digital and readily input to a device such as the RF signal generator (cf. element 16 in FIG. 1), controller (cf. element 14 in FIG. 1) or the RF controller (cf. element 32 in FIG. 1).

The electromagnetic cooking device 10 may utilize one or more control methods to adjust the power level to reach a desired set-point level. Such a process may have challenges that are not easily resolved by conventional control schemes. For example, in order to minimize cook time, the device 10 may attempt to reach a maximum power level or set-point level as fast as possible. However, if the maximum power level is overshot, the high-power amplifiers 18A-D may be damaged. For this reason, the system may implement a control scheme that prevents over-damping that could extend cooking time, while also protecting the circuitry and hardware from exceeding a maximum power level.

Figure 8:
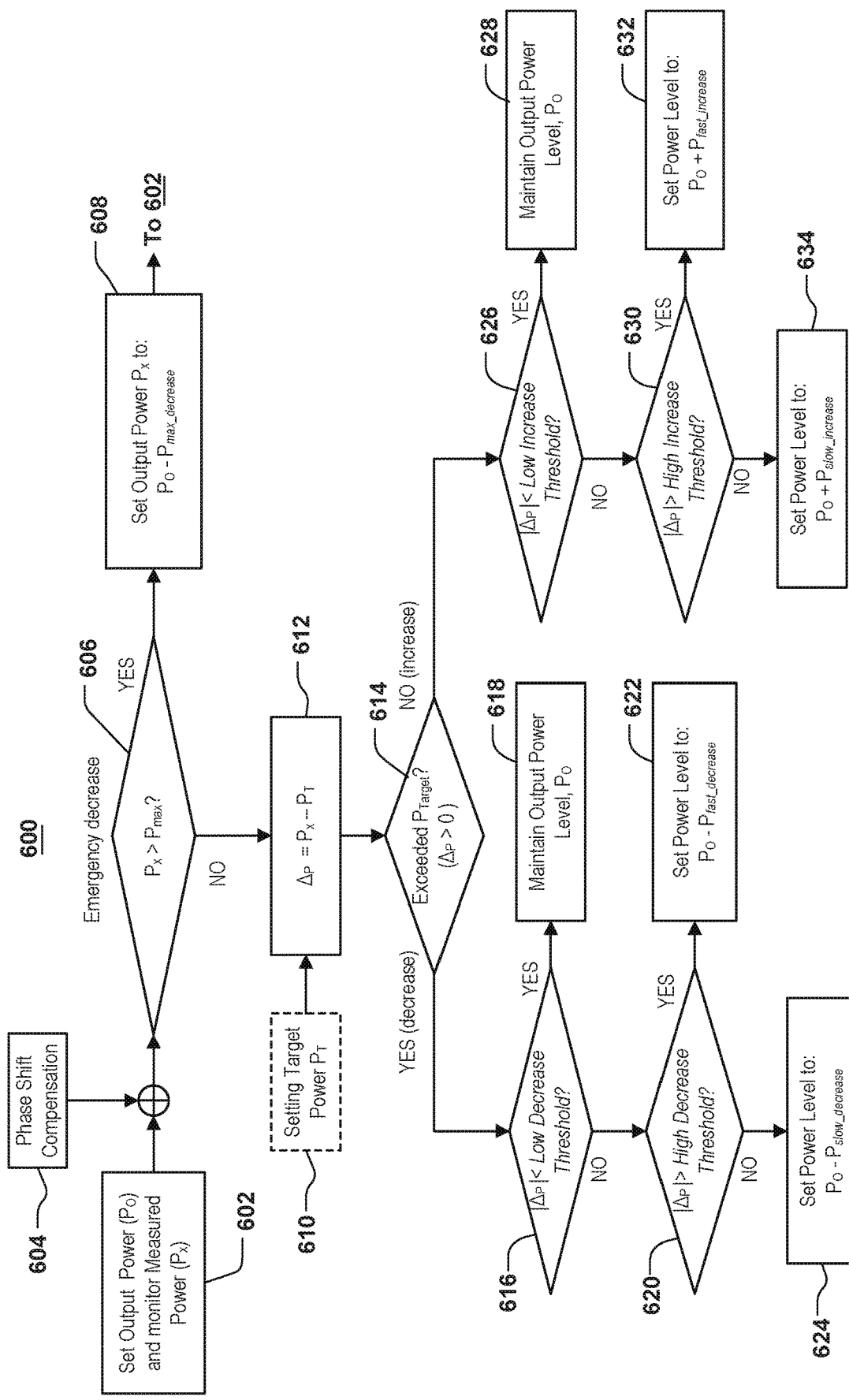
FIG. 8 is a flowchart illustrating a binary control routine for controlling the output power of high-power amplifiers.

Referring to FIG. 8, a flow chart of a method 600 for control of the output power level of the device 10 is shown. In some embodiments, an amplitude of the power utilized to generate the RF feeds 26A-D, 226 A-D may generally be controlled by the controller 14 in communication with the power supply 12 and/or the amplitude generator 38. Additionally, the controller 14 may be operable to detect the power level output from each of the high-power amplifiers 18A-D via the measurement system (e.g. integrated measurement system 150, 160). Accordingly, upon initiation of a heating process in step 602, the controller 14 may set the output power level $P_O$ of one or more of the high-power amplifiers 18A-D to a desired or target output power $P_T$. Additionally the controller 14 may monitor the measured power $P_x$. In step 604, the controller 14 may also control or update the phase shift between or among the RF feeds 18A-D by controlling the RF controller 32. Throughout the method 600, the controller 14 may receive signals communicating the measured power $P_x$ from the measurement system. In this way, the device 10 may provide for closed loop feedback to ensure that the target output power $P_T$ is rapidly achieved and maintained.

As previously discussed the high-power amplifiers 18A-D may be damaged if the power level exceeds a maximum power level $P_{max}$ or rated power level. Accordingly in step 606, the controller 14 may compare the measured power $P_x$ to the maximum power level $P_{max}$. If the maximum power level $P_{max}$ is exceeded, the controller 14 may continue to step 608 and decrease the setting for the output power $P_O$ by the maximum power adjustment $P_{max\_decrease}$. The maximum power adjustment may be one of a plurality of power adjustment levels that may be applied by the controller 14 to adjust the output power $P_O$ from the high-power amplifiers 18A-D. Additional power adjustment levels and the relationship among the power adjustment levels are further discussed in the following description. The controller may adjust the output power $P_O$ by controlling the power supply 12 and/or the amplitude generator 38.

In step 606, if the measured power level $P_x$ is less than the maximum power level $P_{max}$, the method may continue to step 610 to set or update the target power $P_T$. In step 612, the controller 14 may compare the measured power level $P_x$ to the target power $P_T$ to determine the power difference $\Delta P$. Continuing to step 614, the controller 14 may determine whether the power difference $\Delta P$ is negative or positive and accordingly, whether the output power $P_O$ needs to be increased or decreased respectively. If the power difference $\Delta P$ is greater than zero, the controller 14 may compare the power difference $\Delta P$ to a plurality of adjustment thresholds and decrease the output power $P_O$ by a power adjustment level in steps 616 to 624. If the power difference $\Delta P$ is less than zero, the controller 14 may compare the power difference $\Delta P$ to a plurality of adjustment thresholds and increase the output power $P_O$ by a power adjustment level in steps 626 to 634. In this way, the device 10 may compensate for differences between the measured power level $P_x$ and the target power $P_T$ efficiently without requiring significant processing power from the controller 14.

If the power difference $\Delta P$ is greater than zero in step 614, the controller 14 may continue to step 616 to compare the absolute value of the power difference $|\Delta P|$ to a low power decrease threshold. In step 618, if the power difference $|\Delta P|$ is less than the low power decrease threshold, the controller 14 may maintain the output power level $P_O$ at a current setting. If the power difference $|\Delta P|$ is greater than the low power decrease threshold, the controller 14 may continue to step 620 to compare the power difference $|\Delta P|$ to a high decrease threshold. In step 620, if the power difference $|\Delta P|$ is greater than the high power decrease threshold, the controller 14 may continue to step 622 to decrease the output power level $P_O$ by a fast decrease power adjustment level $P_{fast\_decrease}$. In step 620, if the power difference $|\Delta P|$ is less than the high power decrease threshold, the controller 14 may continue to step 624 to decrease the output power level $P_O$ by a slow decrease power adjustment level $P_{slow\_decrease}$. The fast decrease power adjustment level $P_{fast\_decrease}$ may be greater in magnitude than the slow decrease power adjustment level $P_{slow\_decrease}$. In this way, the controller 14 may cause the output power level $P_O$ to change rapidly or slowly to provide a desired system response of the device 10. Following any of steps 618, 622, or 624, the controller 14 may return to step 602.

If the power difference $\Delta P$ is less than zero in step 614, the controller 14 may continue to step 626 to compare the absolute value of the power difference $|\Delta P|$ to a low power increase threshold. In step 628, if the power difference $|\Delta P|$ is less than the low power increase threshold, the controller 14 may maintain the output power level $P_O$ at a current setting. If the power difference $|\Delta P|$ is greater than the low power increase threshold, the controller 14 may continue to step 630 to compare the power difference $|\Delta P|$ to a high increase threshold. In step 630, if the power difference $|\Delta P|$ is greater than the high power increase threshold, the controller 14 may continue to step 632 to increase the output power level $P_O$ by a fast increase power adjustment level $P_{fast\_increase}$. In step 630, if the power difference |ΔP| is less than the high power increase threshold, the controller 14 may continue to step 634 to increase the output power level $P_O$ by a slow increase power adjustment level $P_{slow\_increase}$. The fast increase power adjustment level $P_{fast\_increase}$ may be greater in magnitude than the slow increase power adjustment level $P_{slow\_increase}$. In this way, the controller 14 may cause the output power level $P_O$ to change rapidly or slowly to provide a desired system response of the device 10. Following any of steps 628, 632, or 634, the controller 14 may return to step 602.

As discussed herein, the method 600 may provide for the output power level $P_O$ to be adjusted by the plurality of power adjustment levels. The different power adjustment levels may provide for the output power level $P_O$ to be adjusted by a magnitude commensurate to a specific state of the output power level $P_O$ in comparison to the target power level $P_T$ and the maximum power level $P_{max}$. For example, a relationship among the power adjustment levels discussed herein may be as follows: $P_{max\_decrease} > P_{fast\_increase} > P_{slow\_increase}$ and $P_{max\_decrease} > P_{fast\_decrease} > P_{slow\_decrease}$. Additionally, the high increase and high decrease thresholds may correspond to greater values than the low increase and low decrease thresholds. Accordingly, each of the plurality of power adjustment levels and the power level thresholds discussed herein may be adjusted to suit a variety of applications to provide a desired response of the device 10.

By characterizing the conveyed radio frequency transmissions according to power and phase measurements or scattering matrix, the electromagnetic cooking device (cf. element 10 in FIG. 1) with solid-state radio frequency sources can precisely excite an enclosed cavity (cf. element 20 in FIG. 1) by controlling the coupling factor of the resonant modes or standing waves that determine the heating pattern therein. That is, a solid-state electromagnetic cooking device can energize desired heating patterns by coupling specific resonant modes to the microwave cavity via the actuation of the radio frequency sources where the heating pattern is determined by the modulus of the resonant mode. The resonant modes are a function of the cavity dimension, food load type, food load placement and excitation condition of the multiple coherent radio frequency sources (e.g. the operating frequency and phase shift between the sources, etc.). The electromagnetic cooking device can be configured to control the solid-state radio frequency sources to select the coupling factor of the resonant modes to energize a specific heating pattern or a sequence of heating patterns over time. The heating patterns related to specific resonant modes can determine the evenness or unevenness of the cooking process. However, because the resonant modes are a function of the food load type and placement, the cavity size and excitation condition, it is not possible to have an a priori knowledge of the resonant modes and their critical frequencies.

Figure 9:
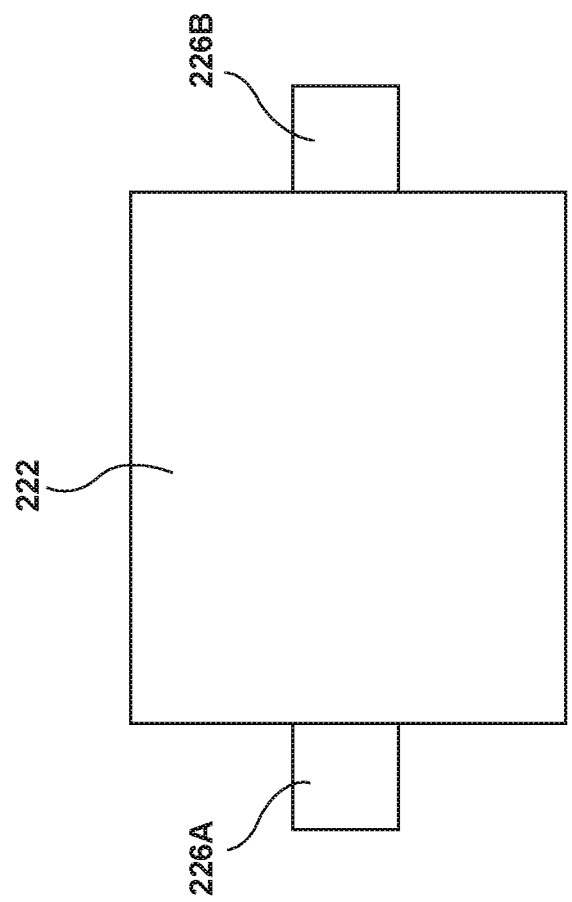
FIG. 9 is a schematic diagram illustrating a resonant cavity coupled to two radio frequency waveguides in accordance with various aspects described herein.

Therefore, the electromagnetic cooking device can be configured to determine the resonant modes within an enclosed cavity in-situ. Referring now to FIG. 9, a schematic diagram illustrating a resonant cavity 222 coupled to two RF feeds 226A,B embodied as waveguides in accordance with various aspects described herein is shown. The RF feeds 226A,B transfer power from their respective high-power amplifiers (cf. elements 18A,B in FIG. 1) to the enclosed cavity 222. The RF feeds 226A,B can be coupled to the enclosed cavity 222 in spatially separated but fixed physical locations. The RF feeds 226A,B can convey RF transmissions to the enclosed cavity 222 at a selected frequency and phase where the phase shift or difference between the RF transmissions directly relates to the class of symmetry of the excited resonant mode. For example activating the RF sources in an in-phase relationship (i.e. phase shift=0°) activates modes of even symmetry while activating the sources in an antiphase relationship (i.e. phase shift=180°) activates modes of odd symmetry. The symmetries determine the heating patterns in the oven as will be described below. Although the example is given that activating the RF sources in an in-phase relationship (i.e. phase shift=0°) activates modes of even symmetry while activating the sources in an antiphase relationship (i.e. phase shift=180°) activates modes of odd symmetry, other phase shifts may be employed depending on the hardware architecture of the system.

In operation, the electromagnetic cooking device determines the set of symmetries (e.g. even or odd) for the resonant modes to be excited within the cavity 222. The electromagnetic cooking device is configured to excite the cavity 222 for a set of operating frequencies and store the efficiency measured for each frequency. The efficiency is determined by the useful power output divided by the total electrical power consumed which can be measured according to the ratio of forward power less the backward power to forward power as in:

$$\eta = \frac{\sum P_{forward} - \sum P_{backward}}{\sum P_{forward}}$$

The electromagnetic cooking device is configured to store the efficiency map in memory for the excited classes of symmetries.

Figure 10:
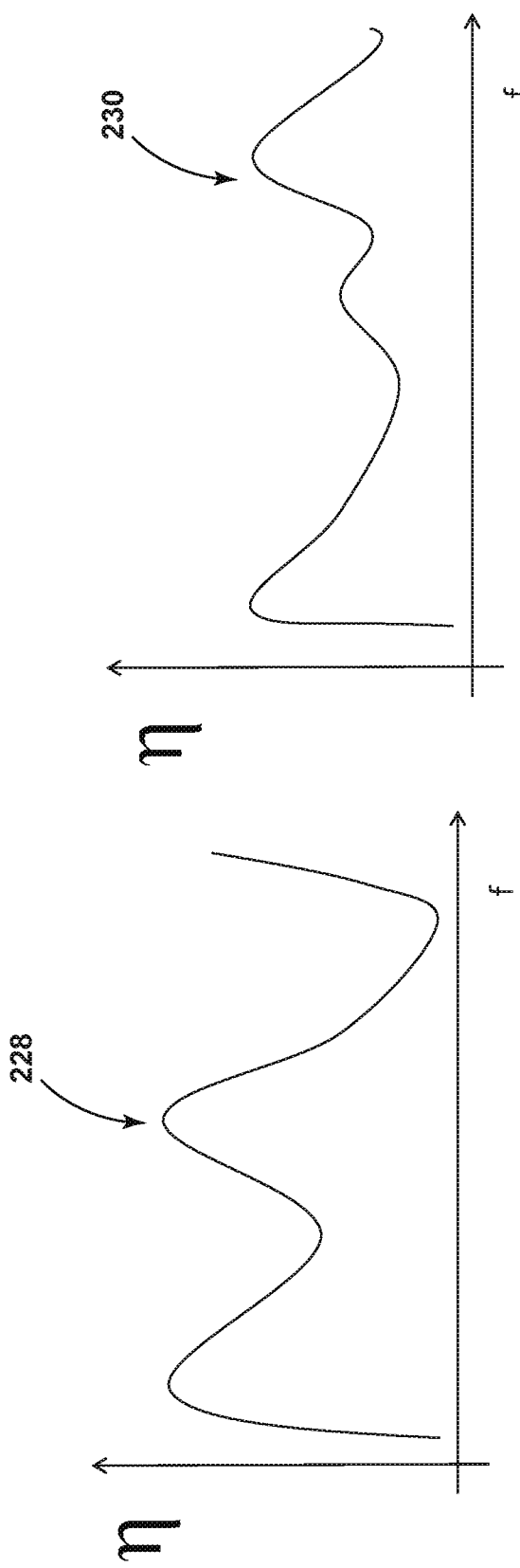
FIG. 10 is a graphical diagram illustrating efficiency versus frequency for in-phase and antiphase excitations of the resonant cavity of FIG. 8.

Referring now to FIG. 10, a graphical diagram illustrating efficiency versus frequency for in-phase excitations 228 and antiphase excitations 230 of the resonant cavity is shown. In this non-limiting illustrative example, the electromagnetic cooking device is configured to conduct two sets of excitations for each operating frequency and obtain two efficiency measurements.

Figure 11:
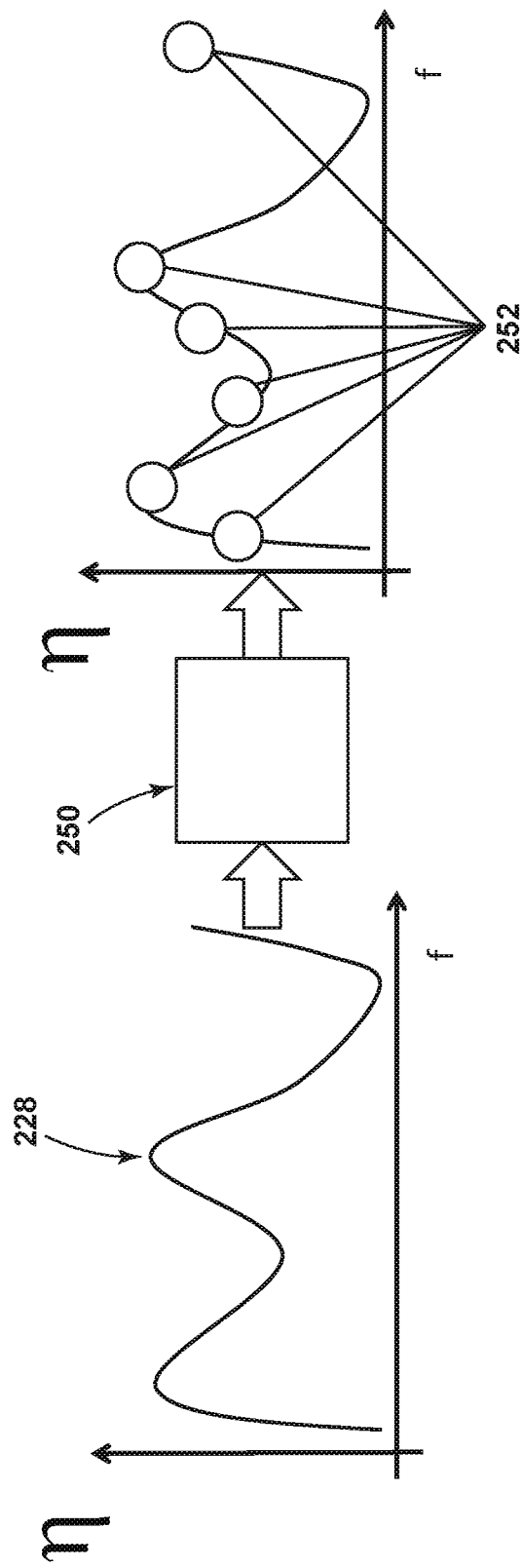
FIG. 11 is a diagram illustrating features of a method of analysis to determine the resonant modes of the cavity in accordance with various aspects described herein.

Referring now to FIG. 11, a diagram illustrating features of a method of analysis to determine the resonant modes of the cavity in accordance with various aspects described herein is shown. The electromagnetic cooking device can analyze the recorded map of efficiency (shown for the in-phase excitation 228) by modeling the response as a passband RLC circuit in order to recognize the critical frequencies of the poles (i.e. the resonant frequencies of the resonant modes) that have been excited for the specific class of symmetry. For this purpose, a processor 250 as a physical or logical subcomponent of the controller (cf. element 14 in FIG. 1) or the RF controller (cf. element 32 in FIG. 2) can be configured to identify local maxima of the efficiency function. The processor 250 can implement any algorithm useful for determining the critical frequencies of the poles of the efficiency map including, but not limited to vector fitting, magnitude vector fitting, etc. In this way, the processor 250 can determine a list of resonant frequencies 252 for each symmetry plane.

Additionally, the processor 250 can determine a quality factor (Q-factor) based on the relative bandwidth of each determined pole. The processor 250 can determine the presence of foodstuff located within the cavity based on the estimate of the Q-factor. For example, if the processor 250 determines that a selected resonant mode has a low Q-factor such as at or below seven, the processor 250 can determine that the portions of the enclosed cavity where the excited mode has a local or global maximum contain foodstuff. Similarly, if the processor 250 determines that a selected resonant mode has a high Q-factor such as greater than 1000, the processor can determine that the portions of the enclosed cavity where the excited mode has a local or global maximum do not have foodstuff. The processor 250 can classify the type of foodstuff located within the cavity based on the estimate of the Q-factor. For example, frozen food has a Q-factor of about 300, water has a Q-factor of about 7 and metal objects have a Q-factor of about 1000. For each determined pole, the processor 250 can associate a resonant frequency used to excite the mode and a Q-factor for determining the type of foodstuff that will be heated by the mode. Additional benefits of determining the Q-factor are described below.

Figure 12:
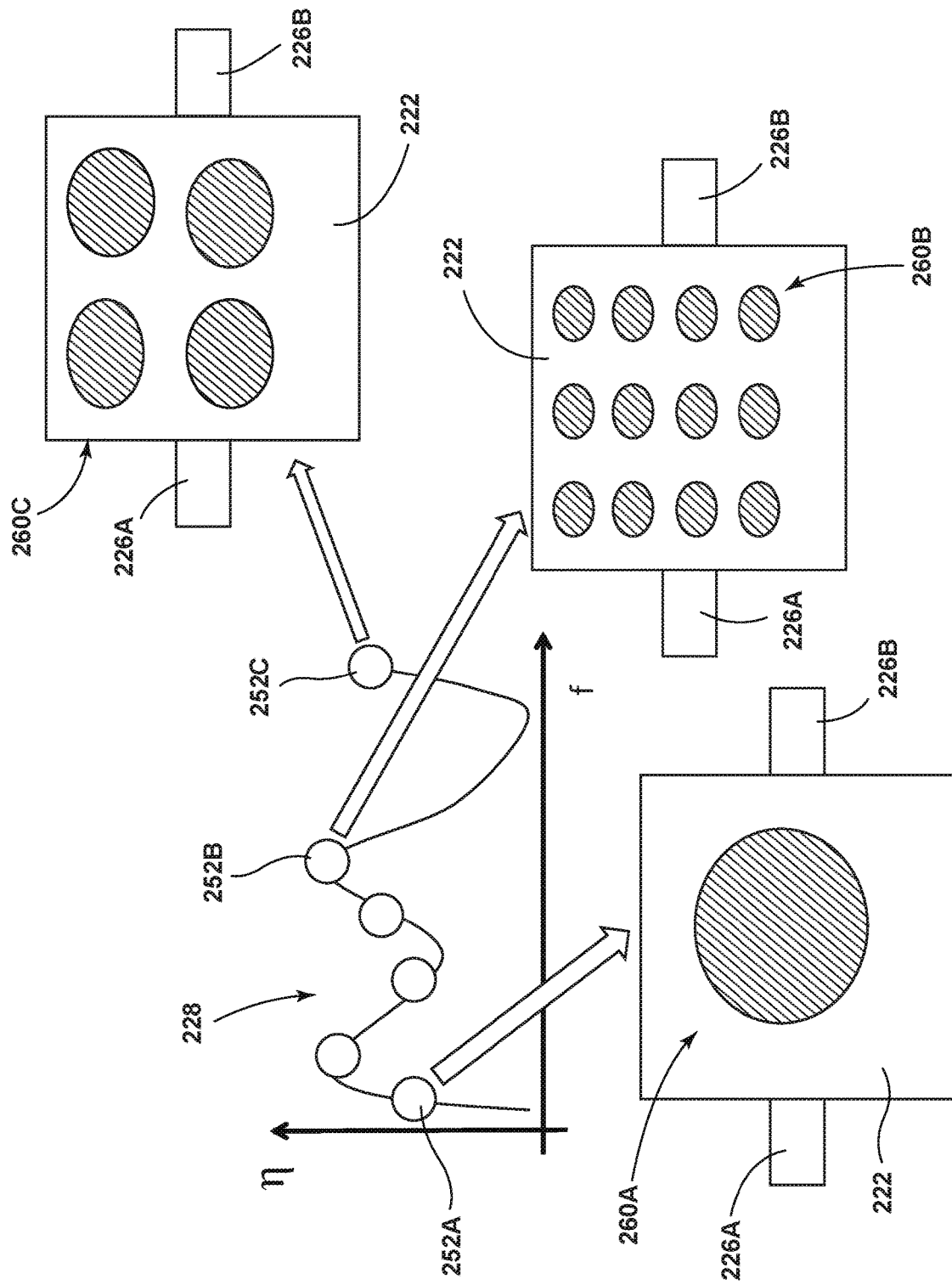
FIG. 12 is a diagram illustrating features of a method to characterize the resonant modes of the cavity in accordance with various aspects described herein.

Referring now to FIG. 12, a diagram illustrating features of a method to characterize the resonant modes of the cavity in accordance with various aspects described herein is shown. Building on the previously described example of an in-phase excitation 228 of the radio frequency feeds 226A,B where a processor of the electromagnetic cooking device determines a set of poles 252 indicative of the resonant modes excitable in the cavity 222, the determined poles 252A-C each correspond to a heating pattern 260A-C within the cavity 222. Recall that the heating pattern is determined by the modulus of the resonant mode. Each heating pattern 260A-C will have a spatial pattern with contours indicative of uniform heating. While depicted in FIG. 12 with a binary set of contours, the actual heating patterns will include many contours indicative of a continuum of heating levels. For ease of understanding, the single contour level indicates the hottest areas of the heating pattern and demonstrates the even and odd symmetries of the resonant modes.

Figure 13B:
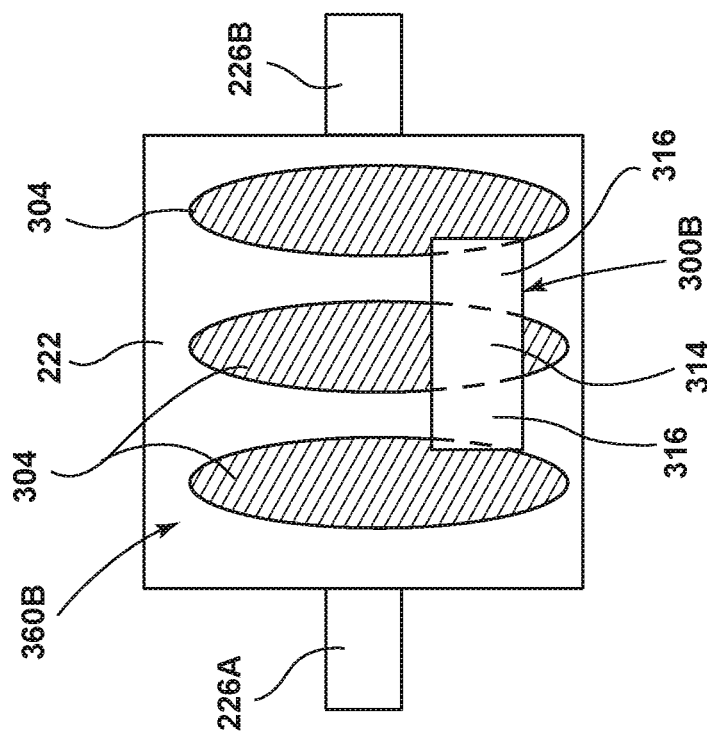
FIGS. 13A and 13B are schematic diagrams illustrating features of a method to locate and classify foodstuff positioned within a resonant cavity in accordance with various aspects described herein.
Figure 13A:
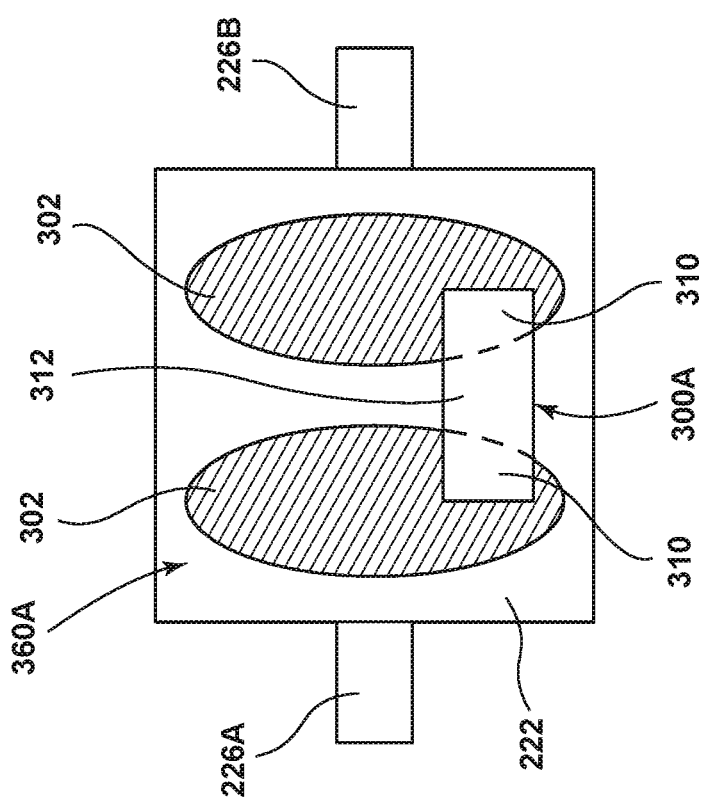

Referring now to FIGS. 13A and 13B, a schematic diagram illustrating features of a method to locate and classify foodstuff 300A,B positioned within a resonant cavity 222 in accordance with various aspects described herein is shown. Initiating an antiphase phase excitation (shown in FIG. 13A), the electromagnetic cooking device can generate a heating pattern 360A in the cavity 222 with an even symmetry where the maximum heating contours 302 do not occur in the center of the cavity 222. Because a large portion 312 of the foodstuff 300A is lying within a minimum of the heating pattern 360A and only a small portion 310 of the foodstuff 300A is lying within a maximum of the heating pattern 360A, the cavity reflections are more significant than the electromagnetic response from the foodstuff 300A leading to a relatively low efficiency. In contrast, because a large portion 314 of the foodstuff 300B is lying within a maximum of the heating pattern 360B and only a small portion 316 of the foodstuff 300B is lying within a minimum of the heating pattern 360B for an in-phase excitation (FIG. 13B), the cavity reflections are minimized and the efficiency is higher than the efficiency determined during the even symmetry excitation. Therefore, the electromagnetic cooking device can determine if foodstuff is located in the center of the cavity 222 by comparing the efficiencies between the efficiencies between an in-phase excitation and an antiphase excitation. To wit, a higher efficiency with in-phase excitation indicates that foodstuff is not located in the center of the cavity 222 and a higher efficiency with an antiphase excitation indicates the foodstuff is located at the center of the cavity 222. In this way, the electromagnetic cooking device can be configured to determine the presence of foodstuff positioned in the center of the microwave cavity 222 based on the efficiency of the activated resonant modes of even symmetry or determine the presence of foodstuff positioned remotely from the center of the microwave cavity 222 based on the efficiency of the activated resonant modes of odd symmetry.

Additionally, the processor can be configured to further analyze the Q-factors according to the efficiency and symmetry of the resonant modes to detect and locate more than one type of foodstuff in the cavity 222. The processor can be configured to average the Q-factors for a subset of the identified resonant modes to classify a portion 310, 314 of a foodstuff 300A, 300B according to its position within the microwave cavity 222. For example, the processor can average the Q-factors of the even symmetry modes to determine the type of foodstuff located in a portion 310 of the foodstuff 300A that intersects with the maximum heating contours 302 of the even symmetry heating patterns 360A. Similarly, the processor can average the Q-factors of the odd symmetry modes to determine the type of foodstuff located in a portion 314 of the foodstuff 300B that intersects with the maximum heating contours 304 of the odd symmetry heating patterns 360B.

Cooking applications usually require power levels in the range of hundreds of watts, as a very common power budget for magnetron heating sources in microwave ovens is in the range of 800-1000 W. Nonetheless, not all applications require such a high power level. For example, an application may require a lower power level as low as 80 W to ensure homogeneous heating and/or a controlled process. Moreover, some cooking processes are destroyed or harmed if too high power levels are used (i.e. the quality of the cooking process diminishes as power level increases). One example of such a process is melting of butter or chocolate. Another example is raising bread, where a temperature suitable for yeast growth must not be exceeded for a certain amount of time.

The use of solid-state sources allows a precise excitation of the enclosed cavity 20, 222, i.e. precise coupling to certain resonant modes to which specific heating patterns correspond. As noted above, the resonant modes are a function of the cavity dimension, food load type and displacement and excitation condition (i.e. operating frequency and phase shift between sources in case of use of multiple coherent sources). On the other hand, with traditional non-coherent magnetron sources, such coupling is less controllable since the operating frequency is fixed and the phase shift relationship does not exist. In order to leverage the increased controllability of solid-state sources it is desirable to control the coupling factor of the resonant modes in order to realize a specific heating pattern and/or a specific sequence over time of heating patterns related to specific resonant modes in order to achieve increased evenness and/or controlled unevenness. Such controlled unevenness may be used for a zone cooking application in which the electric field, namely the source of heating pattern, is unbalanced to the left or to another portion of the enclosed cavity 20, 222. Because the resonant modes are a function of the food load and its displacement, cavity size, and excitation condition, it is not possible to have an a priori knowledge of the resonant modes and their critical frequencies. It is therefore not possible to determine which resonant modes are excited for a specific set of cavity size/food load type and displacement and excitation condition without having all this information, for example, receiving user input at the user interface 28 or having additional sensors like cameras to detect the enclosed cavity 20 loading conditions and all its characteristics. Again, this information is needed to have information about the heating pattern and use it accordingly.

Figure 14:
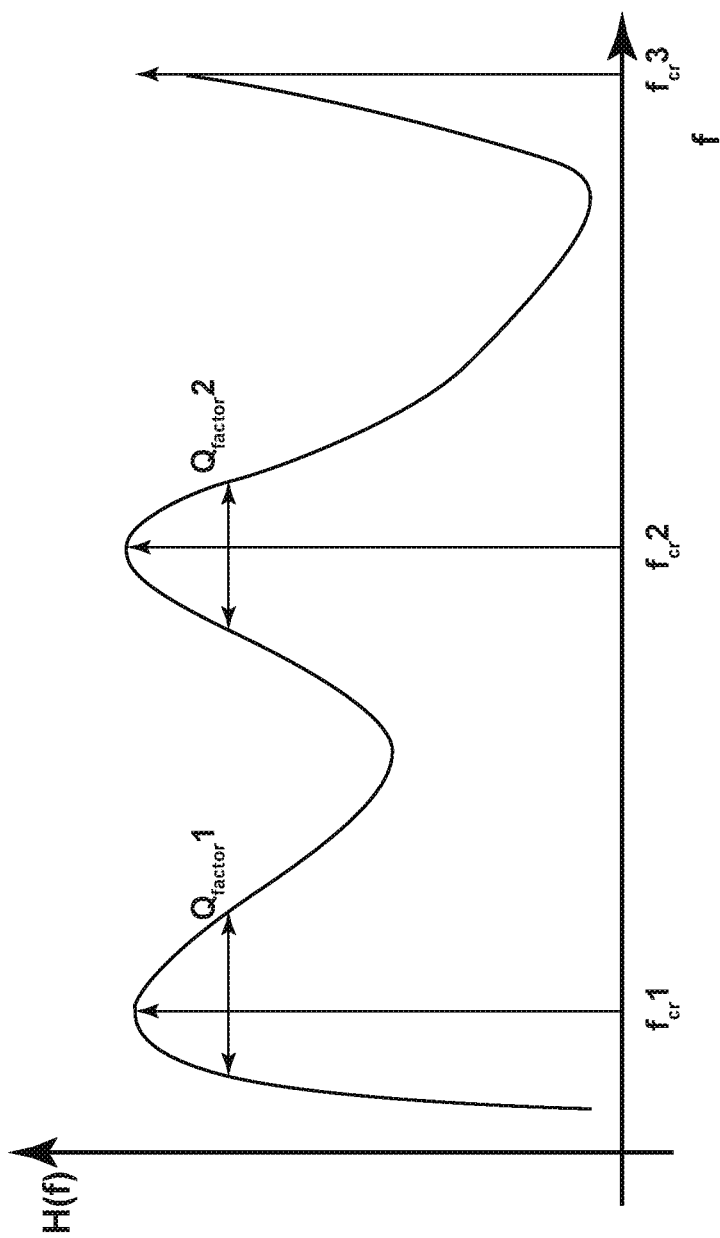
FIG. 14 is a graphical diagram illustrating efficiency versus frequency for in-phase excitations of the resonant cavity of FIG. 8 showing the Q factors.

The embodiments described here relate to a method to use preclassified resonant modes to be activated (i.e. to which the sources transfer energy) into the enclosed cavity 20, 222 to obtain even or uneven heating of a food load. This technique may be referred to as spectromodal control as it is founded on the connection between absorption spectrum and resonant modes. The theory ensures homogeneous heating patterns, center-dominating heating patterns, or unbalanced patterns. The theory stems from the observation that in an enclosed cavity 20, 222, the coupling between sources and resonant modes is a function of the operating frequency, since such resonant modes exist only at specific discrete frequencies (the resonant frequency, critical frequency or so-called eigenvalues of the modes). Microwave cavities can be represented as circuits finding an equivalent circuit that shares the same frequency response. In view of this circuital (filter-like) representation, the resonant modes may be represented as pass-band filters centered at their critical frequencies and with a band inversely proportional to their Q-factor. The Q-factor is related to the losses (dielectric losses that occur into the load as well as metallic losses coming from surface currents arising into metals). The passband representation of the enclosed cavity 20, 222 is depicted in FIG. 14. The coupling of such resonant modes with respect to the operating frequency can be thought of as a coupling factor related to the frequency/time factor of the excitations.

The coupling of the sources with the modes of the resonant enclosed cavity 20, 222 is a function of the excitations displacement and phase relationship in between them (when multiple coherent sources are used) with respect to the enclosed cavity 20, 222. This second coupling factor can be thought as related to the 'space' factor of the excitations. The applied phase shift directly relates to the class of symmetry of the transferred resonant mode. Take as example the enclosed cavity 222 depicted in FIG. 9. Activating the sources in phase relationship activates modes of even symmetry while activating the sources in antiphase relationship activates modes of odd symmetry. This behavior is depicted in FIGS. 13A and 13B where FIG. 13A represents the antiphase relationship and FIG. 13B represents the in-phase relationship. The explanation can be found considering the phase relationship between the two planes on which the two sources lay, i.e. the natural phase shift that the two aforementioned classes of symmetries impose on the enclosed cavity 222. For instance, every resonant mode (that composes the so called free-response of the enclosed cavity 20) imposes specific boundary conditions on cavity walls, namely where the sources are placed. If the enclosed cavity 20, 222 excitation is obtained through waveguides, a very common case for microwave ovens 10, the waveguides shall be placed in the location and with a phase shift in between them that matches the resonant mode that they are designed to excite. In this case, the enclosed cavity 20, 222, when excited (the so called forced-response), will present an electromagnetic field configuration corresponding to that which the resonant mode to which the excitation is targeted would have. Using such considerations, it is possible to get a map of critical frequencies and class of symmetries (spectromodal identification). Moreover, it is possible to measure or estimate the coupled efficiency for each identified resonant mode.

FIG. 15 is provided to show an example of an unbalanced excitation in the enclosed cavity 222 and the resulting heating pattern. FIG. 16 is provided to show an example of a balanced excitation in the enclosed cavity 222 and the resulting heating pattern.

Below is a list that shows the resonant modes classified according to their symmetry and provided with their critical frequencies and efficiencies. The values shown are for purposes of example.

Symmetry 1 (even, average efficiency=79%)
Mode 1 (frequency=2.40 GHz, efficiency=70%)
Mode 2 (frequency=2.41 GHz, efficiency=95%)
Mode 3 (frequency=2.45 GHz, efficiency=80%)
Mode 4 (frequency=2.50 GHz, efficiency=72%)
Symmetry 2 (odd, average efficiency=79%)
Mode 1 (frequency=2.40 GHz, efficiency=69%)
Mode 2 (frequency=2.41 GHz, efficiency=78%)
Mode 3 (frequency=2.45 GHz, efficiency=90%)

Figure 17:
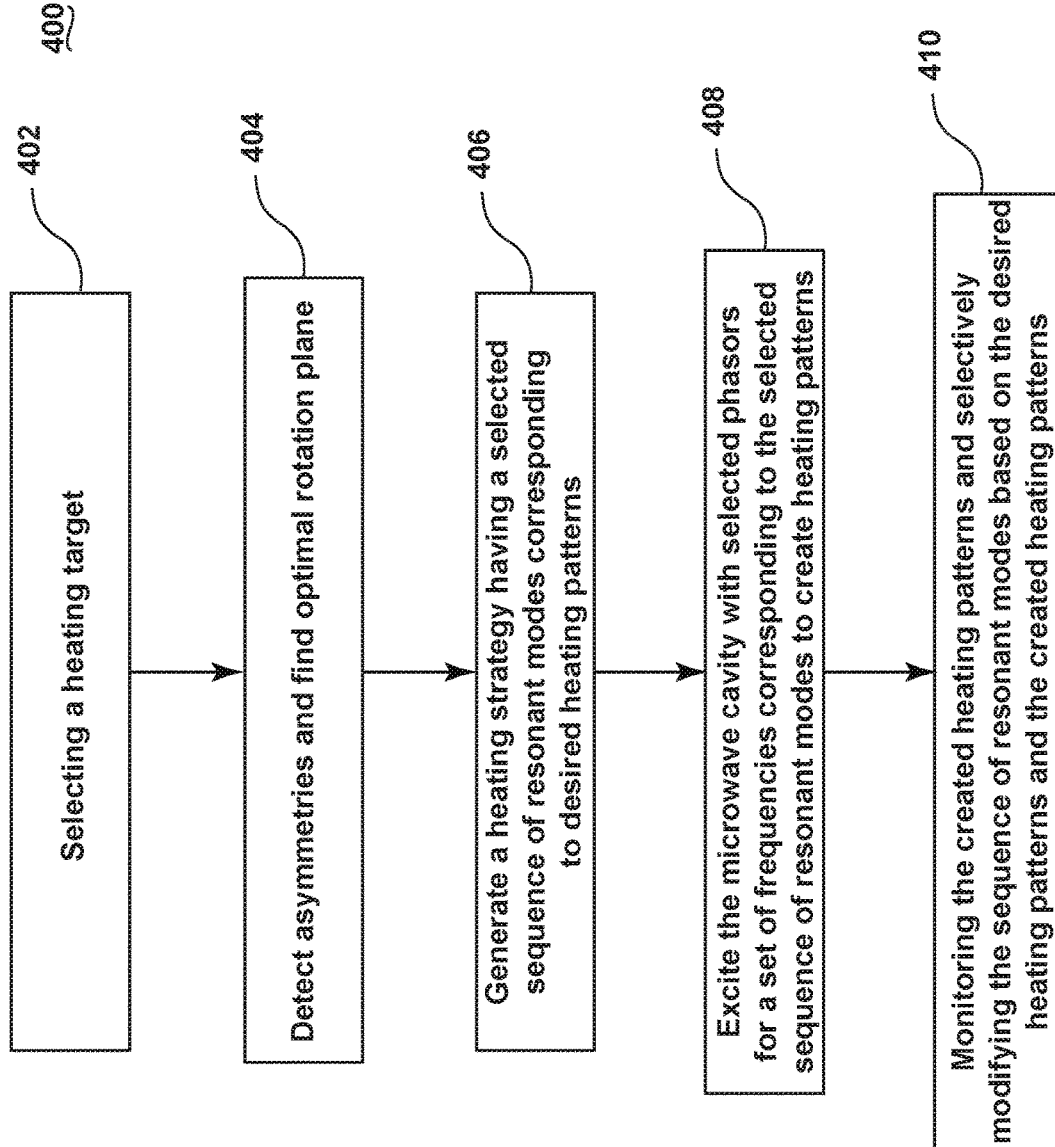
FIG. 17 is a flowchart illustrating a method of exciting an enclosed cavity with radio frequency radiation in accordance with various aspects described herein.

The controller 14 may be configured to perform a method (400) of activating a sequence of preclassified resonant modes into an enclosed cavity 20, 222 to control a heating pattern therein with RF radiation from a plurality of RF feeds 26A-26D, 226A-226B shown in FIG. 17. The plurality of RF feeds 26A-26D, 226A-226B transfer the RF radiation into the enclosed cavity 20, 222 and measure the forward and backward power at the plurality of RF feeds 26A-26D, 226A-226B. The method includes the steps of selecting a heating target corresponding to an amount of energy that is to be to delivered to each symmetry plane in the enclosed cavity 20, 222 based in part upon a load positioned in the enclosed cavity 20, 222 (step 402); detecting asymmetries and find the optimal rotation plane (step 404); generating a heating strategy based on the heating target to determine desired heating patterns, the heating strategy having a selected sequence of resonant modes to be excited in the enclosed cavity 20, 222 that correspond to the desired heating patterns (step 406); exciting the enclosed cavity 20, 222 with a selected set of phasors for a set of frequencies corresponding to each resonant mode of the selected sequence of resonant modes (step 408) to create heating patterns; and monitoring the created heating patterns based on the forward and backward power measurements at the RF feeds 26A-26D, 226A-226B to use closed-loop regulation to selectively modify the sequence of resonant modes into the enclosed cavity 20, 222 based on the desired heating patterns and the created heating patterns as monitored (step 410).

A heating target is an energy set point specified according to a symmetry plane in the enclosed cavity 20, 222. In other words, a heating target is the amount of energy that the microwave oven 10 is configured to deliver to each symmetry plane. Moreover, the target set point can be specified according to the ratio between the symmetry planes. For example, the target set point can be set as a 2:1 ratio for even and odd symmetry planes where the even symmetry plane is set to receive twice the energy as the odd symmetry plane. The heating target is configured according to food load and cooking cycle requirements. For example, a balanced heating target may be configured for a reheat cycle. In another example, where two separate food loads like two small glasses are placed in a symmetric fashion with respect to the cavity center on left and right halves of the oven 10, the heating target can be configured for an even symmetry heating pattern.

Figure 18:
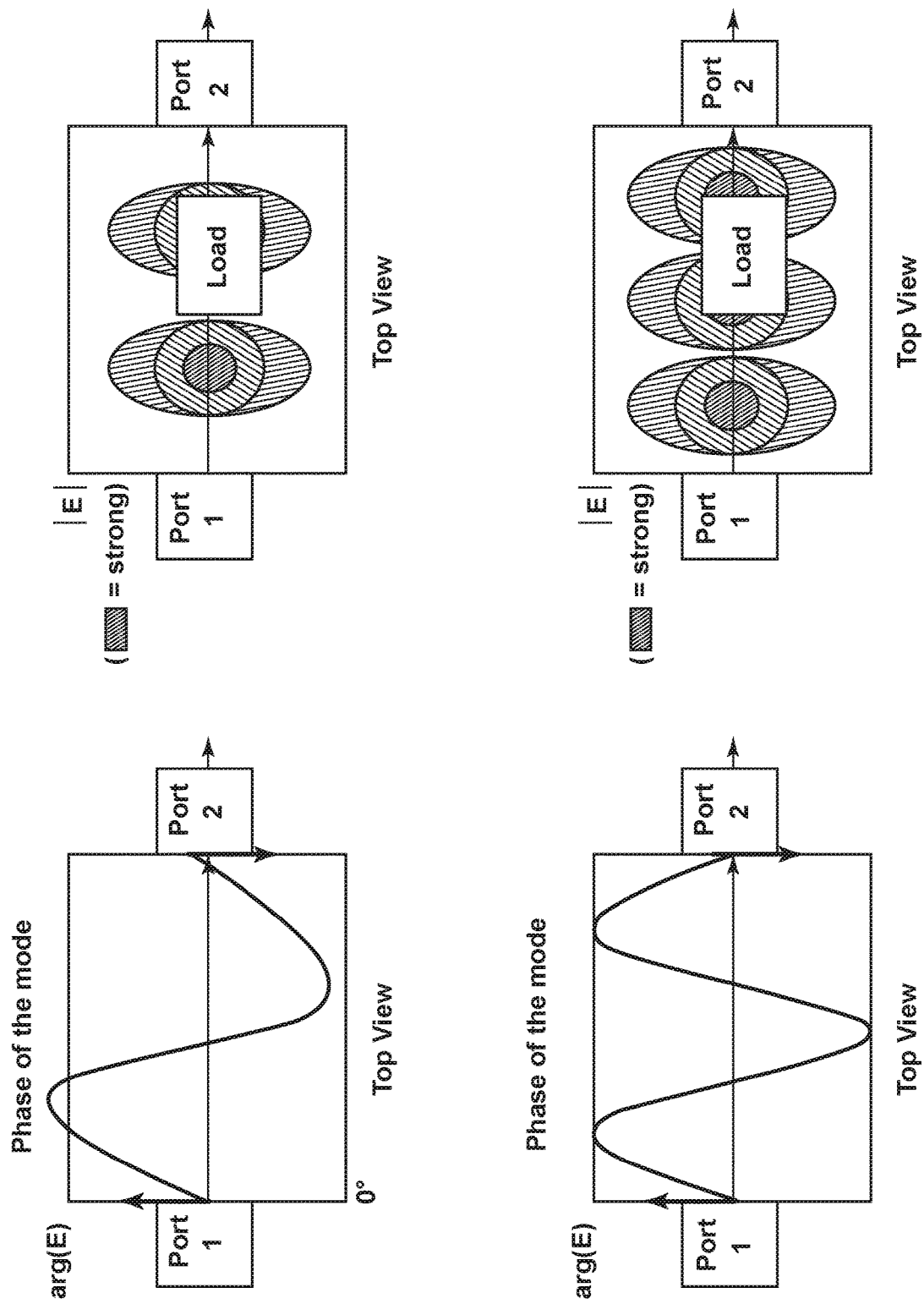
FIG. 18 is a diagram illustrating features of a method to characterize the unbalanced resonant modes of the cavity when a non-centered food load is present in accordance with various aspects described herein.

The spectromodal theory ensures that sources in phase and in anti-phase give rise to specific heating patterns that are symmetric with respect to the center of the cavity 20, 222. Thus, these patterns are suitable for managing centered food loads, but may be very susceptible to displacements, as highlighted in FIG. 18 where most of the energy is injected in the right side of the food load because of the overlapping of the two patterns.

Figure 19:
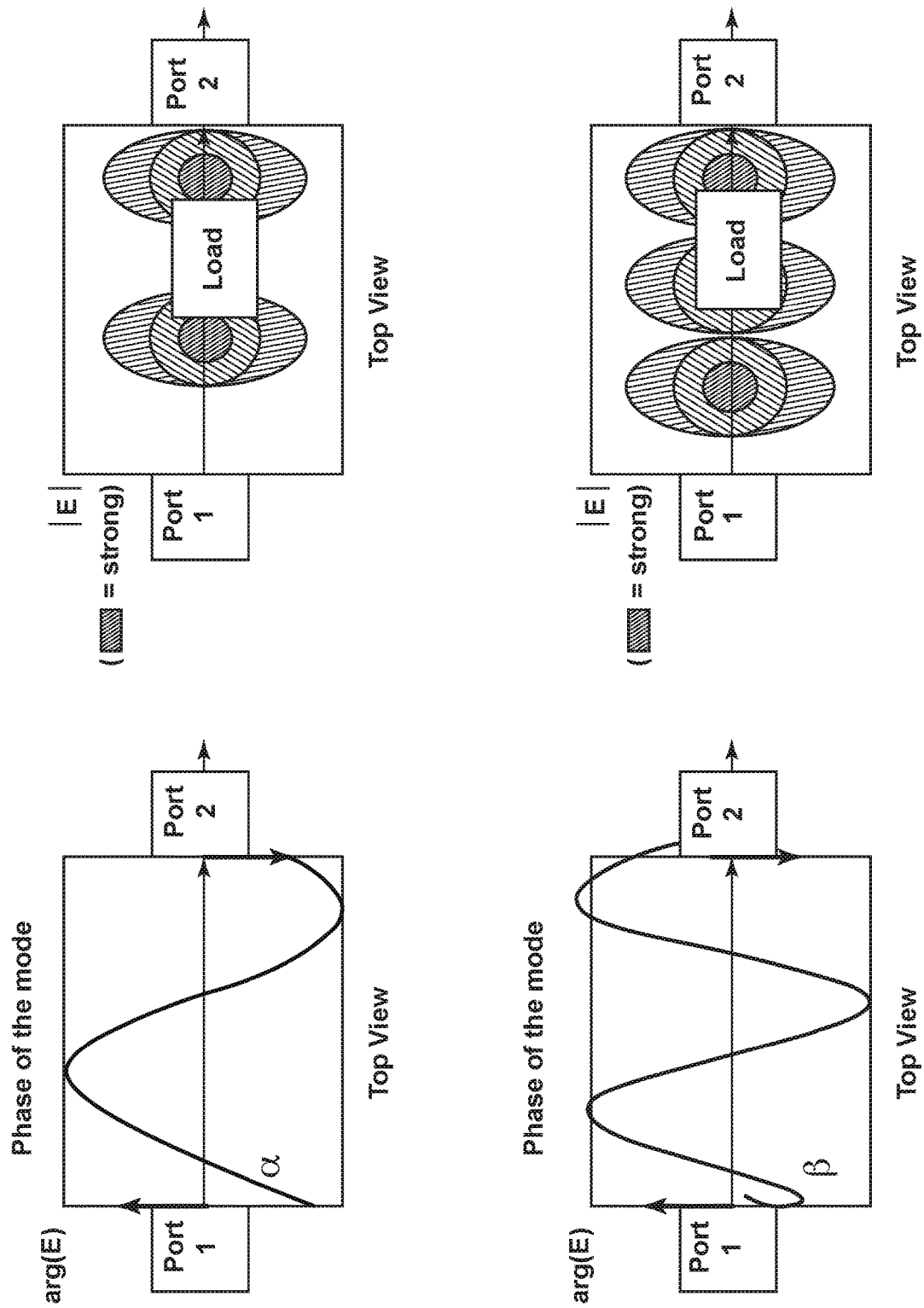
FIG. 19 is a diagram illustrating features of a method to characterize the balanced resonant modes of the cavity when a non-centered food load is present in accordance with various aspects described herein.

The point is that a non-centered food load introduces a rotation in the symmetry plane that causes the system oven-load to lose its symmetric properties. It is thus possible to compensate for this undesired scenario, identifying the rotation of the actual symmetry plane and applying it to the RF feeds 26A-26D, 226A-226B, hence changing their phase relationship, as depicted in FIG. 19 where α and β are the delta-phase between the RF feeds 26A-26D, 226A-226B.

This approach can be exploited to manage 3D displacements, i.e. on the width axis (as already described in FIG. 18), on the height axis and the depth axis, by just applying the RF feeds phase-shift to the proper symmetry plane.

The outcome of selecting a heating target in step 402 is a set of frequency-phase shift excitations for each RF feed 26A-26D, 226A-226B that couple with one specific resonant mode. The phase-shifts applied are the ones specific of each symmetry class, i.e. the natural phase shift that the classes of symmetries impose on the cavity 20, 222. These resonant modes might then be called 'unrotated' or 'nominal' resonant modes. The manner of identifying asymmetries and finding the optimal rotation plane (step 404) is described below.

The unrotated resonant modes selected refer to a symmetric ideal scenario, hence they might be suboptimal for an asymmetric scenario. Such an asymmetrical scenario may be caused by the position of the food load, or by the system itself (e.g., asymmetries in the manner in which the RF excitations are fed into the cavity). After identifying the unrotated resonant modes, the controller 14 checks whether they suit the actual system in order to find the optimal rotation that compensates for eventual asymmetries and thus provides optimized resonant modes. In some cases some of the unrotated resonant modes may turn out to not require rotation for efficiency optimization. Accordingly, not all optimized resonant modes are rotated. Step 402 is made up of different substeps: (1) phasors excitations; (2) excitations analysis; (3) resonant mode rotation; and (4) use of power and phase sensors (vector) instead of power sensors (scalar).

For the first substep (phasors excitations substep (1)), after having selected a nominal phasor, it is possible to identify a set of excitations for each resonant mode to be analyzed, by acting on the phase-shifts and keeping the frequency locked for that resonant mode. Specifically, for each unrotated resonant mode, the controller 14 generates a set of excitations with the same frequency (of the nominal mode) and a combination of phase-shifts. The set of phases might be defined a-priori, statically defined on run-time, or even be adaptive according to different parameters. Furthermore, the phase-axis might include all the phase-shifts inside the analysis range or a few samples only, in order to save computational time at the expense of approximation. The phase-shifts are not arbitrarily defined, since an excitation related to a specific symmetry plane might couple with another one if rotated too close to it. It is thus advantageous for the controller 14 to set proper bounds to the phase-axis.

The selected actuations may be stored together with their efficiencies, which can be calculated as:

Efficiency=(sum of input power−sum of reflected power)/(sum of input power).

Figure 20:
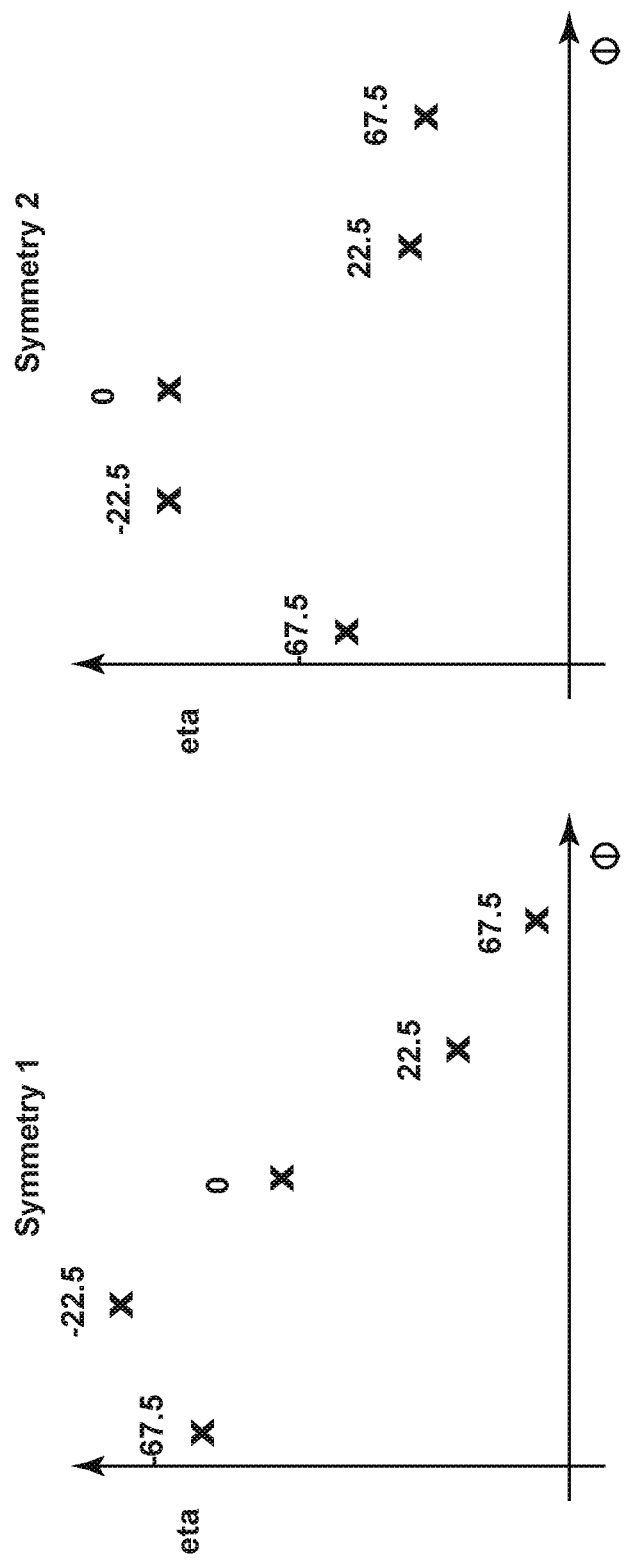
FIG. 20 are plots of the phase vs efficiency curves of one example for two symmetries.

For each mode of each symmetry class, the map phasor/efficiency is stored, i.e. if a cavity has two ports with two possible classes and two modes for each one has been selected, four sets of excitations will be performed, each set with all the defined phase-shifts, thus obtaining four sets of efficiency measurements to be further analyzed. A visual example is shown in FIG. 20 where for each resonant mode, the controller 14 performs the following:

for symmetry 1 the phasors ψ are abs(ψ)=1, arg(ψ)=e^jf0−ϕ with ϕ={−67.5°, −22.5°, 0°, 22.5°, 67.5°} for both ports; and for symmetry 2 the phasors ψ are abs(ψ)=1, arg(ψ)=e^jf0−ϕ with ϕ={−67.5°, −22.5°, 0°, 22.5°, 67.5° } for port 1 and ϕ=−180°−{−67.5°, −22.5°, 0°, 22.5°, 67.5°} for port 2.

The recorded map of efficiency is then analyzed in the second substep (excitations analysis substep (2)) in order to find the phase-shift that optimizes efficiency, since theoretically the efficiency vs phase curve should follow a sinusoidal trend with a maximum on the actual symmetry plane of the system (which is 0° for symmetric ones).

Figure 21:
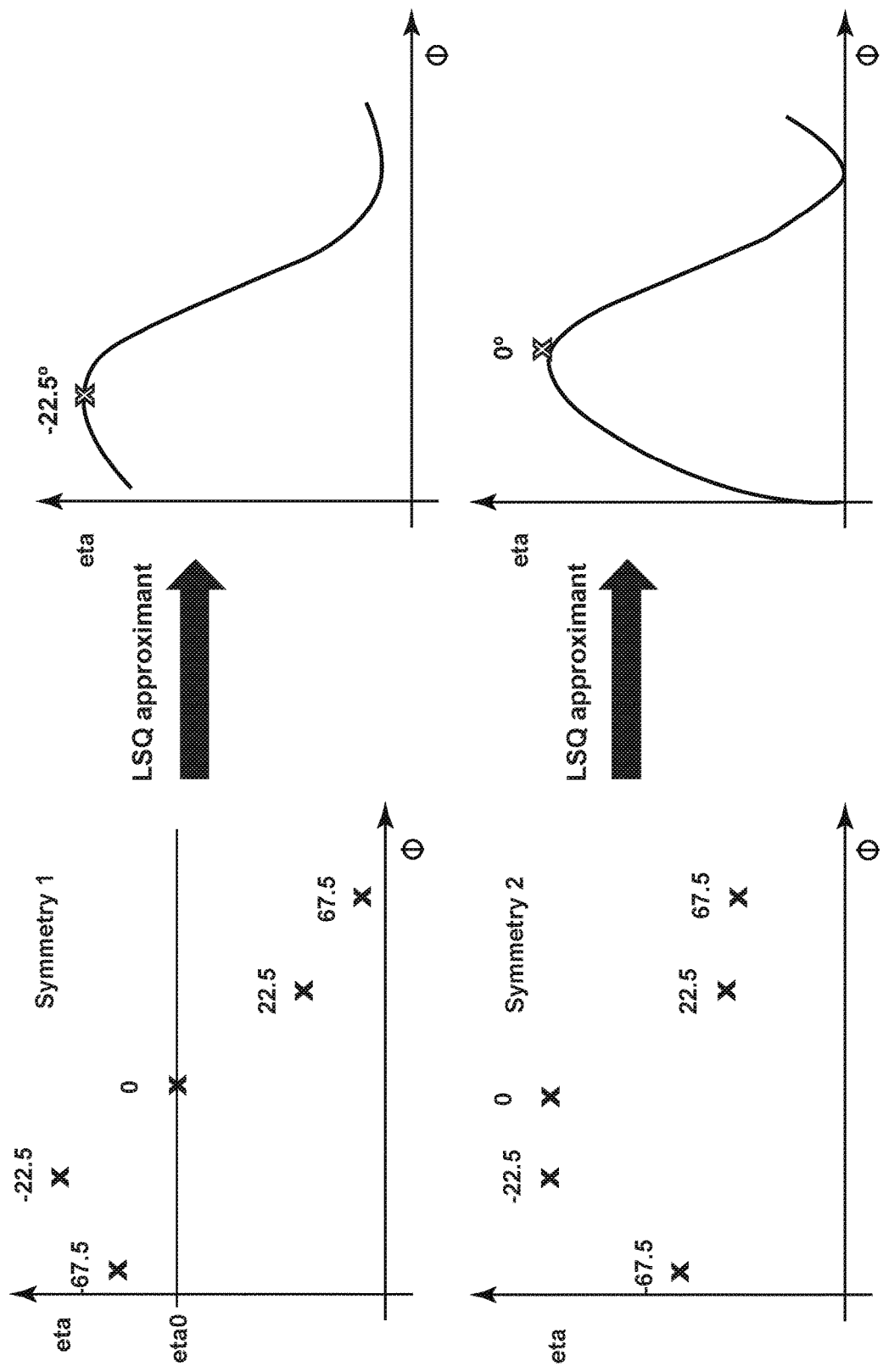
FIG. 21 are plots of the phase vs efficiency curves of another example for two symmetries.

Different strategies might be adopted in order to draw the efficiency vs phase curve, depending on the choices made at the previous stage. If all the phase-axis has been considered, it is enough to scan the excitations and find the one with the highest efficiency. Otherwise it is possible to apply an interpolation algorithm (linear, spline etc.) or even to define a model exploiting the a-priori knowledge about the trend of the curve (LSQ, linear regression etc.). A visual example is shown in FIG. 21.

It is also worth noticing that, since the rotation of the axis is the combination of the phase-shifts between each pair of RF feeds 26A-26D, 226A-226B and thus locking one source/source phase relationship to a value has an impact on all the other relationships, the maximum detection on one phase direction is correlated to all of the others. Hence, the optimal combination of the phase-shifts is not equal to the combination of the optimum for each direction taken separately.

This leads to an optimization problem of a (nport−1)-dimensional function, so for a 4-port microwave oven 10 the maximum has to be searched in a 3-dimensional plane.

For instance, given a 4-port microwave oven 10 and a phase-axis to be scanned made of four elements[−pi/4−pi/8+pi/8+pi/4] all the possible combinations of the phase-shifts between the ports is (provided that one is taken as reference, so the phase does not change):

$$(n\text{port}-1)^{nphi}=3^4=81$$

Hence, while in a 2-port microwave oven 10 there is only one efficiency-phase curve to study, in a more complex system the number of excitations and sensing needed to find the actual optimum rotation might dramatically increase.

For example, for a three-port system:

$$Sx = y$$

$$\begin{bmatrix} s11 & s12 & s22 \\ s21 & s22 & s23 \\ s31 & s32 & s33 \end{bmatrix} \begin{bmatrix} x1 \\ x2 \\ x3 \end{bmatrix} = \begin{bmatrix} y1 \\ y2 \\ y3 \end{bmatrix}$$

$$p(y1) \sim y1 * y1^* = [s11\,x1]^2 + [s12\,x2]^2 +$$
$$[s13\,x3]^2 + 2[s11\,s12\,x1\,x2]\cos(\varphi x1 - \varphi x2 - \varphi s11 - \varphi 12) + +$$
$$2[s11\,s13\,x1\,x2]\cos(\varphi x1 - \varphi x3 - \varphi s11 - \varphi 13) + +$$
$$2[s13\,s12\,x2\,x3]\cos(\varphi x2 - \varphi x3 - \varphi s13 - \varphi 12)$$

The 'free' phase shifts in the previous equation (i.e. the quantities to be controlled) are a number of three while the control variables are just two. This stems from the fact that the given the phase shift between the first and the second port ($\varphi x1-\varphi x2$) and the phase shift between the first and the third port ($\varphi x1-\varphi x3$) the last phase shift ($\varphi x2-\varphi x3$) is not a control variable but satisfies the previous two equations. That means that the number of control variables is less than the number of variables to be controlled and no optimal control is possible optimizing one factor at a time.

Different approaches might be used to find the solution, such as:

solve the full problem;

approximate the full problem with a heuristic function;

consider all the sub-problems separately and combine the results (as depicted in the FIG. 21); or consider just one or a subset of the sub-problems (the most meaningful ones with respect to a specific criterion) and solve it/them exactly or even approximately.

Once the optimal rotation plane has been found, the resonant mode is changed accordingly per the third substep (resonant mode rotation substep (3)). From reconciling the information from all the symmetry planes it is possible to have the full picture of the resonant modes available in the cavity classified per class of symmetry.

Following substep (3), phase sensors are used to collect the S-matrix of the system (scattering matrix) in the fourth substep (use of power and phase sensors substep (4)). The scattering matrix makes it possible to perform the spectro-modal excitation without actually exciting the system. It is possible instead to apply the equation:

$$Sx=y$$

where S is the scattering matrix of the system and x are the input phasors and y are the output phasors and compute the input and reflected powers as:

$$\text{input power}=x*conj(x)$$

$$\text{output power}=y*conj(y)$$

where conj denotes the complex conjugate.

As noted above the efficiency can be calculated as:

Efficiency=(sum of input power−sum of reflected power)/(sum of input power).

Figure 22:
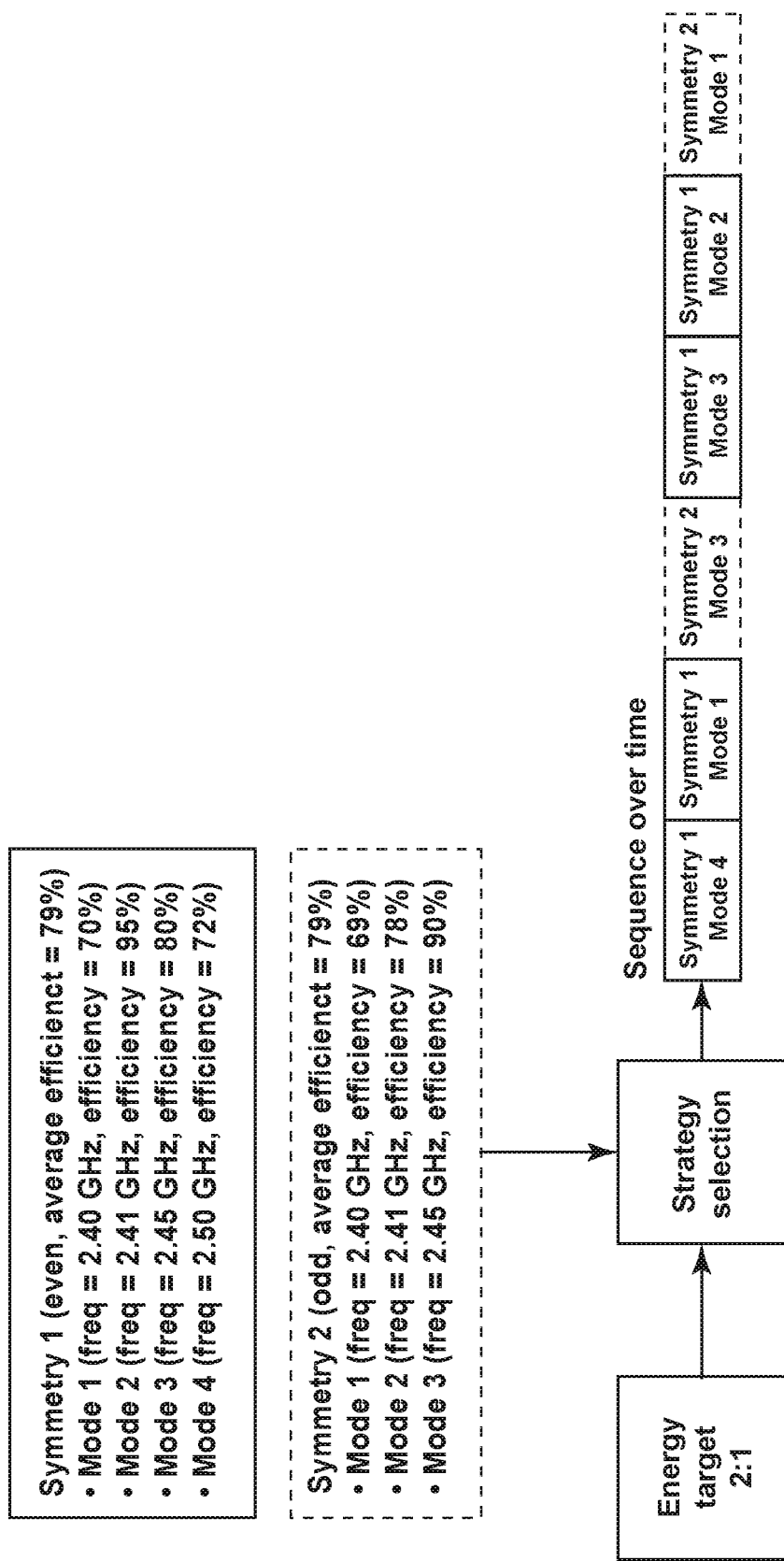
FIG. 22 is a block diagram illustrating an open-loop regulation of a heating strategy synthesis.
Figure 23:
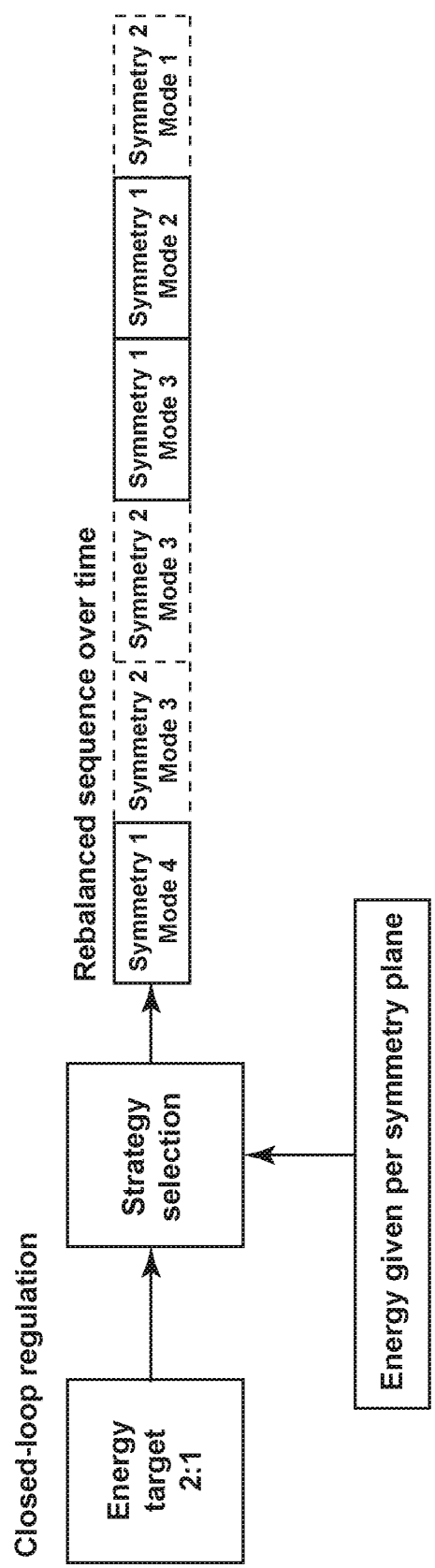
FIG. 23 is a block diagram illustrating a closed-loop regulation of a heating strategy synthesis.

After detecting asymmetries and finding the optimal rotation plane (step 404) and thus the optimized resonant modes, the controller 14 generates a heating strategy (step 406) to utilize the optimized resonant modes. For a given heating strategy, a selected sequence of optimized resonant modes is stored in memory associated with controller 14. The microwave oven 10 will be configured to execute the selected sequence by applying the proper phase shifts and operating frequencies of the RF channels 40A-40D in order to activate the optimized resonant modes present in the list and couple energy to them in the enclosed cavity 20, 222. Each optimized resonant mode can be activated for a specific duration of time. For example, each mode can be excited for the same time duration or, in another example, each mode can be excited for a duration of time that is inversely proportional to the experimentally determined efficiency of the mode. Moreover, the sequence of optimized modes can include all the optimized resonant modes or just a subset that is proportional to the heating target ratio. Expanding upon the earlier example of a target ratio of 2:1, the sequence of optimized modes can include twice the number of resonant modes belonging to the first symmetry plane with respect to the number of resonant modes belonging to the second symmetry plane. The resonant modes belonging to a certain symmetry can be interleaved with resonant modes belonging to the other symmetry so as not to apply the same heating pattern for too much time that can detrimentally affect heating performance. In another example, the sequence of optimized modes can be selected such that the sum of the inverse efficiencies of the modes belonging to a first symmetry and the sum of the inverse efficiencies of the modes belonging to a second symmetry are selected to satisfy the ratio target energy. In another example, the microwave oven 10 can realize the energy target set point by regulating the power output used for the RF channels 40A-40D. Collectively, the above described examples represent an open-loop operation where the heating strategy is set and then applied. An example of the open-loop algorithm is depicted in FIG. 22.

Figure 24:
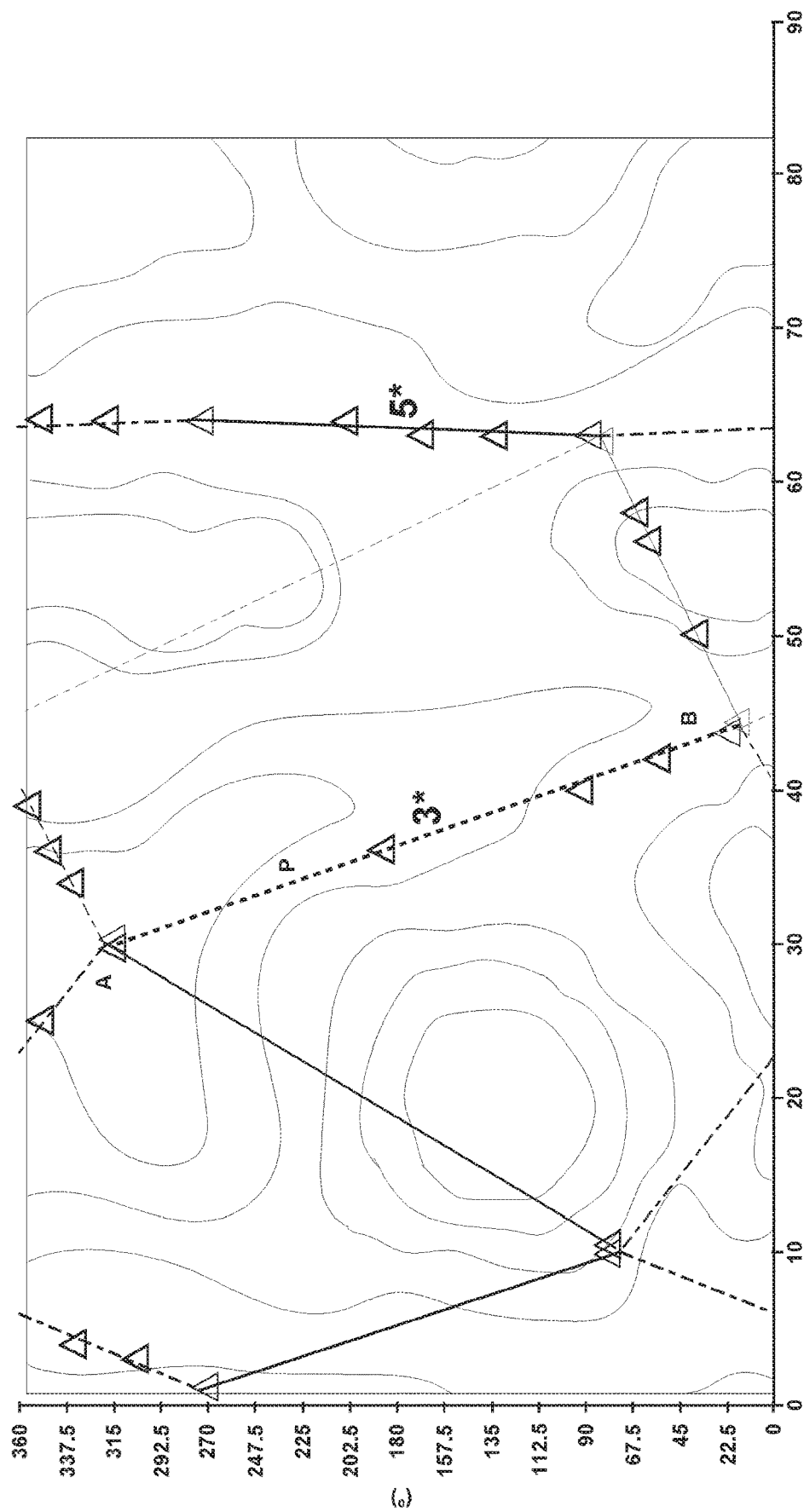
FIG. 24 is a phase and frequency plot demonstrating an efficiency response of a heating cavity and a stirring route for an electronic stirring operation.

The sequence of heating patterns determined in the heating strategy may be selected in such a way as to perform what is referred to herein as "electronic stirring." "Electronic stirring" is a sequence of heating patterns that results a smooth change in the heating patterns such that the spatial correlation between one imposed actuation and the next one is high. The signal generator 16 may be a small signal generator and be set such that the frequency and phase shifts are smoothly changed over time in such a way that the heating patterns caused by such excitations are also smoothly changed. Examples of electronic stirring are illustrated in FIG. 24, which show efficiencies at various phases and frequency indices. As illustrated by the various lines superimposed in FIG. 24, the sequence of heating patterns follow a number of paths (P) between resonant modes (A and B) identified in the efficiency map. Thus, rather than just alternating excitations between those that produce resonant modes (A and B), various intermediate excitations are generated lying between the resonant modes (A and B). Although the path (P) is linear in FIG. 24, the path may be stepped, interpolated or following specific routes. Such settings may vary based on specific hardware implementations and/or variations in a detected resonance map in the frequency/phase domain. Regardless of the path selected, the control scheme may attempt to cause a smooth change in the heating pattern by moving from a first detected resonance (e.g., A) to a second detected resonance (e.g., B).

Each path in the electronic stirring may be traversed by generating excitations with specific frequency and phase shifts. For example, the frequency and phase of the beginning and ending resonant modes of the path may be used to identify a sequence of phase and frequency shifts to traverse a path between the two resonant modes. If the path is linear and the excitations are stepped, the phase shifts for each excitation could be calculated as the difference between the phase of the beginning point (first resonant mode) and the phase of the ending point (second resonant mode) divided by the number of steps or excitations to be generated between the two modes. Similarly the frequency shifts for each excitation could be calculated as the difference between the frequency of the beginning point (first resonant mode) and the frequency of the ending point (second resonant mode) divided by the number of steps or excitations to be generated between the two modes.

The speed of variations (i.e., the speed of the stirring routes) may be changed according to the specific food type and/or cooking cycle phase. In addition to specifying the phase and frequency of the control signals, the controller 14 may further control a rate of change of the frequency and phase of the control signals as the path (P) is traversed. In this way, the rate of change or rate of travel along the path (P) may be utilized to control a stirring speed. Such a speed may vary based on a cooking cycle type and/or type of food load to improve a cooking operation. For example, the speed of the stirring route may be faster for a segment of defrost cycle when a food load is frozen and slower when the food load begins thawing. The manner by which the controller 14 may determine that the thawing process has started is described further below.

By providing such electronic stirring, cooking may be performed more evenly due to the enhanced heating pattern variety (i.e., simultaneous coupling to more than one resonance). Moreover, due to the high spatial correlation of successive heating patterns due to the specific stirring route selected and the excitations selected, the edges of the food load may be uniformly irradiated. This allows for edge management of the cooking process whereby heated portions of the edges are alternated over time in order to let portions rest and thermally exchange heat with cooler portions of the food load to avoid burnt edges.

The electronic stirring thus provides a heating strategy that resembles what a mechanical solution (i.e., a stirrer or turntable) would provide. This particularly provides enhanced defrosting performance. As discussed herein, a mode may correspond to a frequency and phase of each of the RF signals and corresponding RF feeds (e.g. the RF feeds 26A-26D, 226A-226B). For example, a first RF signal and a second RF signal may be generated by the RF controller 32 in response to an instruction from the controller 14 to activate an RF feed at a mode comprising a frequency and a phase shift. In response to the instruction, the first RF signal may be set to operate at the frequency and the phase shift relative to a timing of the second RF signal. Additionally, the second RF signal may be set to operate at the frequency and the phase shift relative to a timing of the first RF signal. In this way, the controller 14 may induce the electromagnetic radiation in the cooking cavity 20 to achieve the frequencies and phases required to provide for the electronic stirring as discussed herein.

More specifically, to perform the electronic stirring discussed above, the controller 14 may be configured to control a scanning operation for the resonant cavity. The scanning operation may comprise emitting a plurality of frequencies and corresponding phase shifts between or among the RF feeds (e.g. the RF feeds 26A-26D, 226A-226B). While emitting the plurality of frequencies, the controller 14 may measure the efficiency of the reflection power in the cooking cavity 20. As further discussed in reference to FIG. 28, the controller 14 may be operable to map and/or interpolate the entire efficiency response of the cooking cavity 20 in the frequency and phase domain.

Based on the measure or interpolated efficiency results, the controller 14 may detect a plurality of resonance frequencies for the cooking cavity 20 with a particular food load. The resonant modes may correspond to critical or resonance frequencies of the cooking cavity 20. For example, the resonance frequencies of the RF feeds may correspond to a first resonant mode comprising a first phase and a first frequency, and a second resonant mode comprising a second phase of a second frequency. The controller 14 may select the first resonant mode and the second resonant mode as waypoints or beginning and end points of the stirring route. In this way, the controller 14 may be operable to determine a path defining the stirring route as a plurality of intermediate modes between the first mode and the second mode.

With the stirring route identified between the first resonant mode and the second resonant mode, the controller may control an electric stirring procedure by controlling the RF signals supplied to the high-power amplifiers 18A-D along the intermediate modes. In order to control the stirring route, the controller 14 may sequentially activate a plurality of high-power amplifiers (e.g. high-power amplifiers 18A-D) to emit the corresponding RF feeds into the cooking cavity along the intermediate modes. In this way, the controller 14 may sequentially excite the cooking cavity 20 at frequencies and phase shifts defined by the intermediate modes. The controller 14 may adjust the frequencies and phase shifts incrementally in order to smoothly adjust the frequencies and phase shifts between or among the RF signals to traverse a path between the two resonant modes.

The controller 14 may further adjust a rate of change from one intermediate mode to the next in order to control a stirring rate. The rate of change may be adjusted based on one or more user settings and/or automated setting for a particular food type or cooking process. For example, the controller 14 may control the stirring rate to maintain a frequency and phase setting for the RF feeds to vary at a rate varying from approximately 0.1 seconds to approximately 4 seconds per mode or similarly for each frequency and/or phase variation along the stirring path. For a defrost operation, a stirring rate may be approximately 0.05 to 0.5 seconds per mode. For typical food loads during rapid heating operations, the stirring rate may be approximately 0.5 to 1 second per mode. Finally for some specific foods, a lower stirring rate may be applied up to 1 to 3 seconds per mode. In a specific example, the stirring rate may be approximately 2 to three second per mode for a potato or mashed potato heating setting.

Referring back to FIG. 17, after the heating strategy is generated in step 406, the controller 14 excites the enclosed cavity 20, 222 with a selected set of phasors for a set of frequencies corresponding to each of the selected sequence of heating patterns through RF feeds 26A-26D, 226A-226B (step 408).

In operation, the controller 14 can implement closed-loop regulation (step 410) by using an integrated amplifier power measurement system 150 to detect the energy delivered to the load or a proxy of delivered energy such as the efficiency, in order to determine the net power balance expressed as the total input power less the total reflected power. The energy measurement can be integrated in an accumulator relative to the current symmetry plane. At specified intervals of time, the controller 14 uses closed-loop regulation to rebalance the actuation sequence of the excited modes to increase or decrease the number of actuations for a specific symmetry plane to better achieve the required energy target set point. In another example, the controller 14 can use closed-loop regulation to adjust the power applied to the enclosed cavity 20, 222 for a specific symmetry plane or a specific mode. An example of the closed-loop algorithm is depicted in FIG. 24. Notice in the example that after the rebalancing, the number of optimized resonant modes in the first symmetry plane is reduced by one. The controller 14 may also monitor the energy (or a proxy) in order to obtain feedback about the axis of rotation applied.

Figure 25A:
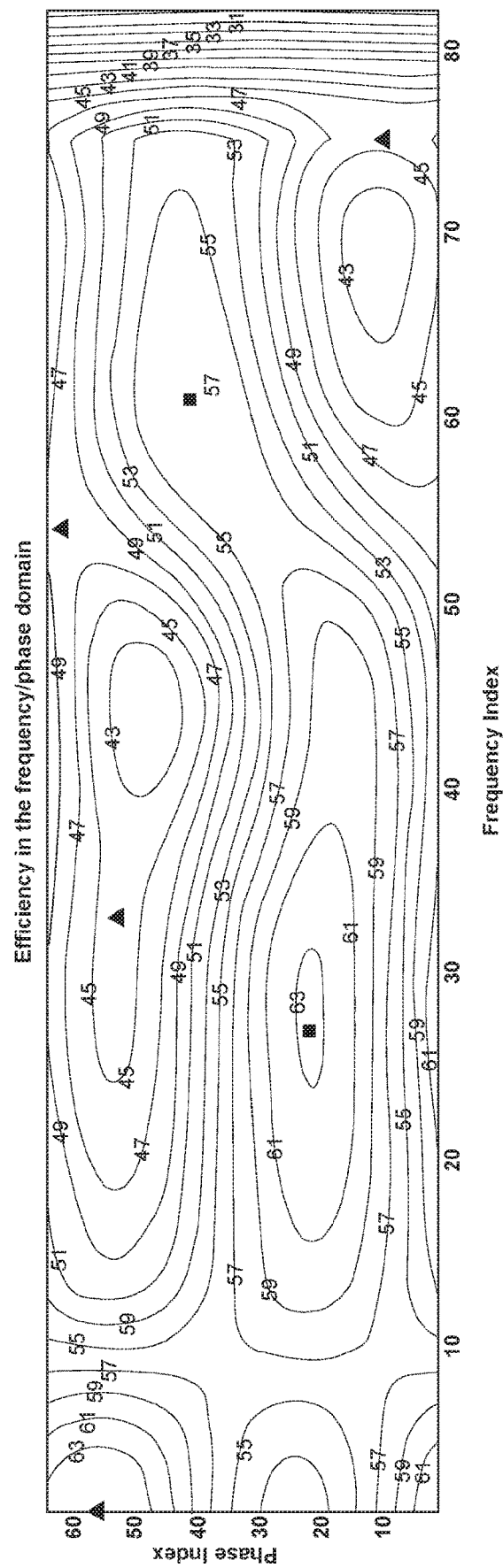
FIG. 25A is an efficiency map of one example of a food load in the enclosed cavity where the cooking appliance includes two ports.
Figure 25B:
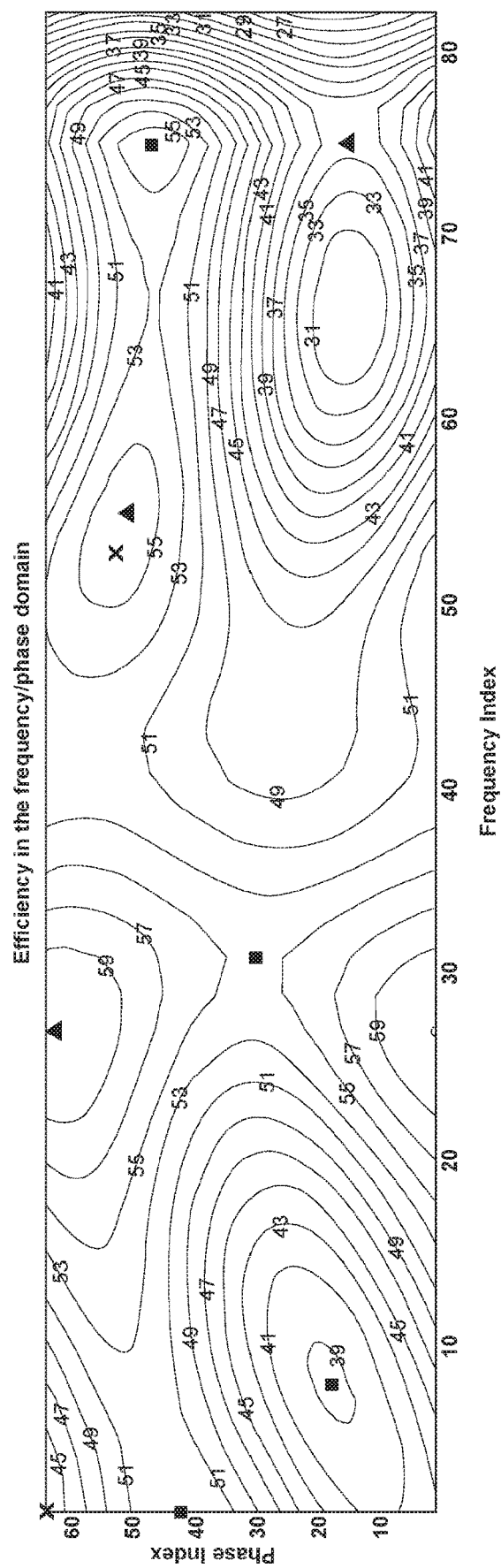
FIG. 25B is an efficiency map of one example of a food load in the enclosed cavity where the cooking appliance includes four ports.

FIG. 25A is an efficiency map of one example of a food load in the enclosed cavity where the cooking appliance includes two ports. FIG. 25B is an efficiency map of one example of a food load in the enclosed cavity where the cooking appliance includes four ports. Thus these efficiency maps are a frequency/phase representation of two different states. In each map, the resonant modes are marked with squares/triangles with respect to the symmetry plane in which they lie. The cross marker shown in FIG. 25B depicts a resonant mode that the algorithm has filtered for some reason (for example, because it is too close to another one).

Figure 26A:
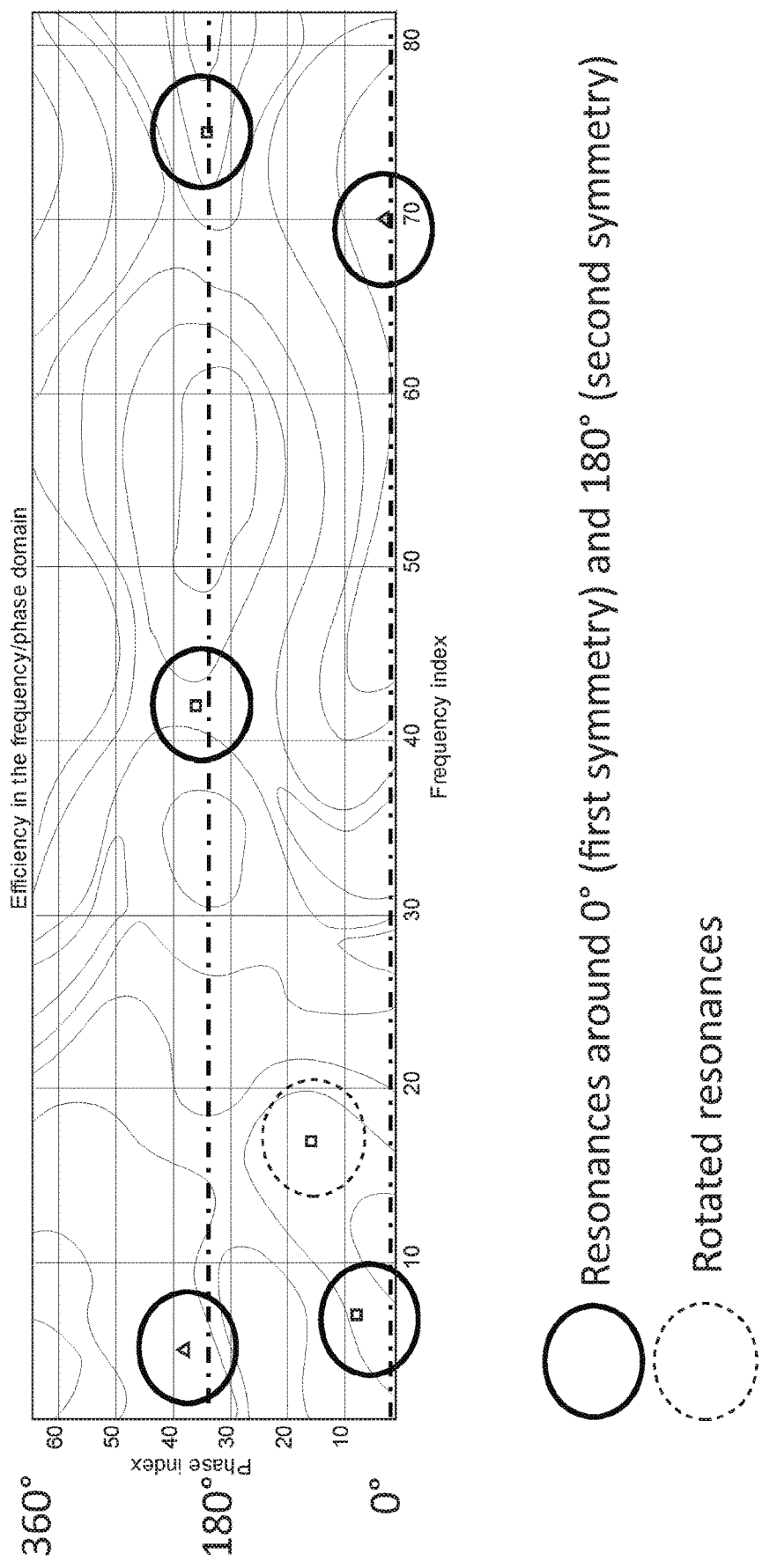
FIG. 26A is an efficiency map of an example where the system is mostly symmetric and most of the resonances are not rotated.
Figure 26B:
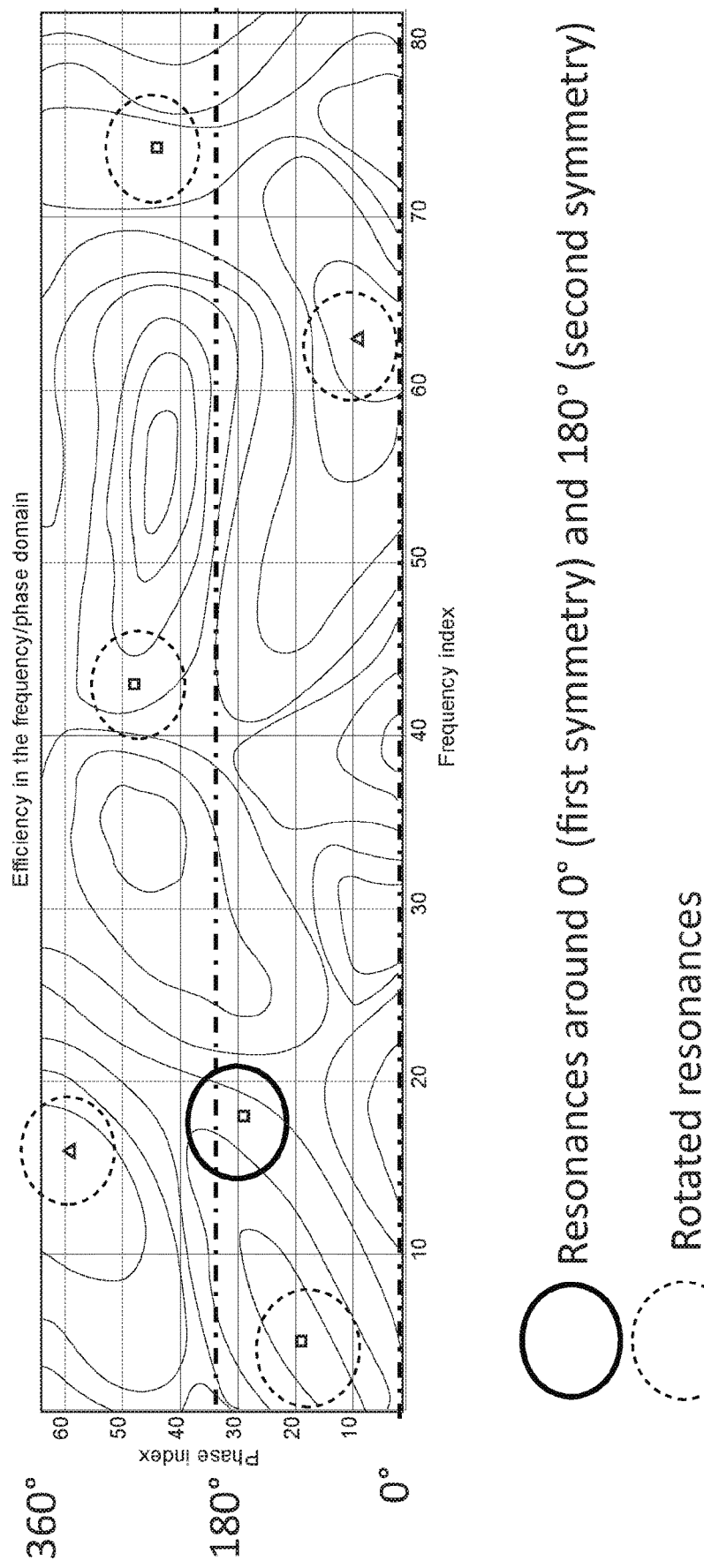
FIG. 26B is an efficiency map of an example where the system is mostly asymmetric and most of the resonances are rotated.

FIG. 26A shows an example of an efficiency map in the frequency/phase domain where the system is mostly symmetrical and most of the resonances are around 0° (first symmetry plane) and 180° (second symmetry plane). Such resonances would not need to be rotated. In this example, the highest efficiency (coupling) is obtained using the nominal axis (first: 0°, second 180°. FIG. 26B shows an example of an efficiency map in the frequency/phase domain where the system is asymmetrical and most of the resonances are not around either 0° (first symmetry plane) or 180° (second symmetry plane). Such resonances may be subject to rotation. In this example, the highest efficiency (coupling) is obtained applying specific rotations to each pole. If the nominal axis (first: 0°, second 180°) were used, a lower efficiency would be obtained.

Figure 27:
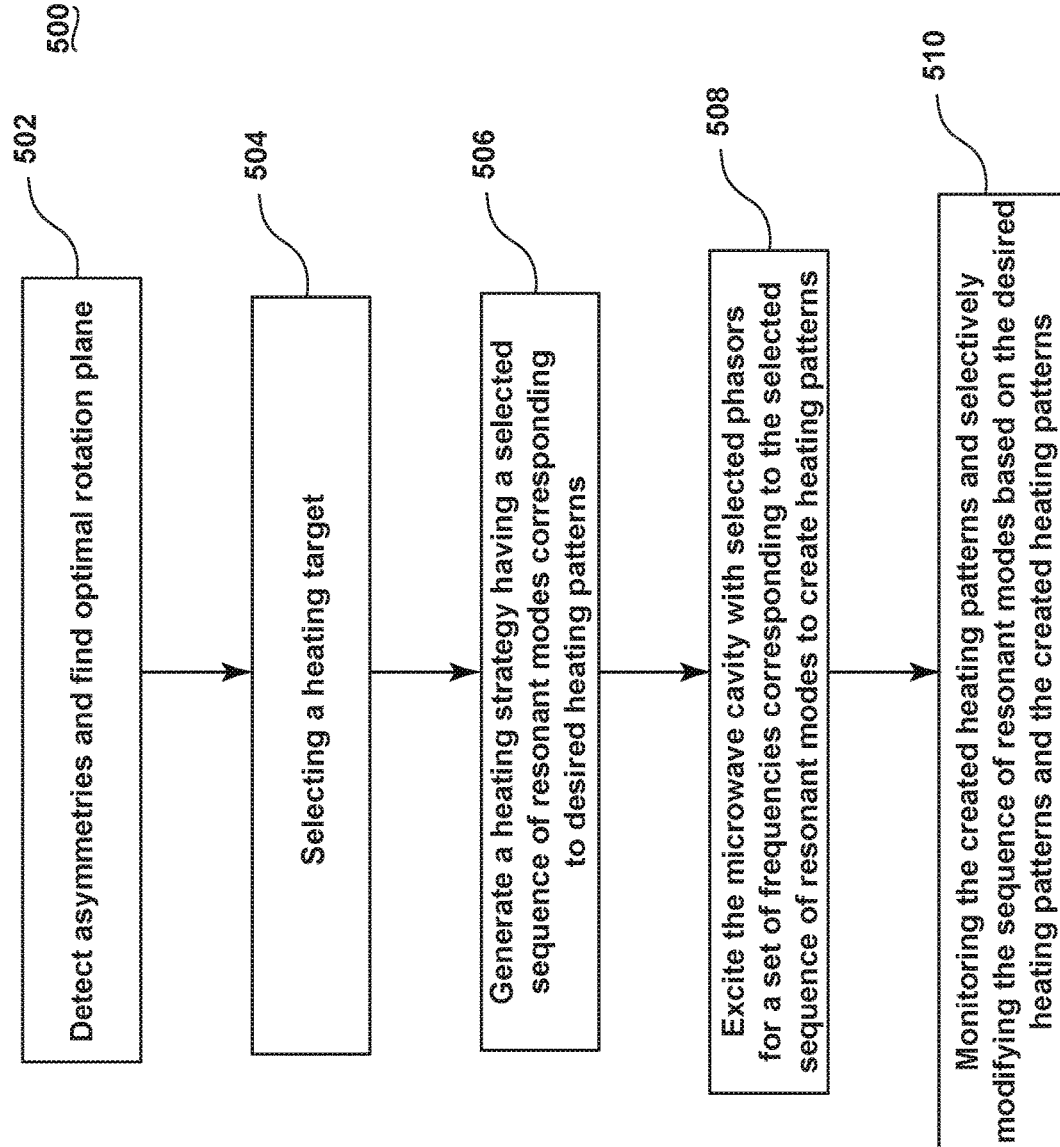
FIG. 27 is a flowchart illustrating an alternative method of exciting an enclosed cavity with radio frequency radiation in accordance with various aspects described herein.

An alternative to the approach described above is discussed below with reference to FIG. 27. Here, the controller 14 may be configured to perform a method (500) of activating a sequence of preclassified resonant modes into an enclosed cavity 20, 222 to control a heating pattern therein with RF radiation from a plurality of RF feeds 26A-26D, 226A-226B shown in FIG. 27. The plurality of RF feeds 26A-26D, 226A-226B transfer the RF radiation into the enclosed cavity 20, 222 and measure the forward and backward power at the plurality of RF feeds 26A-26D, 226A-226B. The method includes the steps of detecting asymmetries and finding the optimal rotation plane (step 502); selecting a heating target corresponding to an amount of energy that is to be to delivered to each symmetry plane in the enclosed cavity 20, 222 based in part upon a load positioned in the enclosed cavity 20, 222 (step 504); generating a heating strategy based on the heating target to determine desired heating patterns, the heating strategy having a selected sequence of resonant modes to be transferred to the enclosed cavity 20, 222 that correspond to the desired heating patterns (step 506); exciting the enclosed cavity 20, 222 with a selected set of phasors for a set of frequencies corresponding to each resonant mode of the selected sequence of resonant modes (step 508) to create heating patterns; and monitoring the created heating patterns based on the forward and backward power measurements at the RF feeds 26A-26D, 226A-226B to use closed-loop regulation to selectively modify the sequence of resonant modes into the enclosed cavity 20, 222 based on the desired heating patterns and the created heating patterns as monitored (step 510).

In method 500, the steps of detecting asymmetries and finding the optimal rotation plane (step 502) and selecting a heating target (step 504) are performed in a reversed order than in method 400 described above with respect to FIG. 17. In addition, the details of these two steps are different. Specifically, in step 402, the first, second, and third substeps (phasors excitations substep (1), excitations analysis substep (2), and resonant mode rotation substep (3)) are now performed in the asymmetry detecting step 502 rather than the heating target selection step 504. To find optimum rotations, the controller 14 generates a preselected set of excitations to find frequencies representing unrotated resonant modes and then generates excitations in a small region close to those frequencies representing resonant modes while shifting the phases and measuring the resulting efficiencies. If a specific phase at a frequency leads to an increase in efficiency, the optimized resonant mode is the phase-shifted one, and the rotation is the phase shift. Thus, in step 502, substep (1), the controller 14 first excites the cavity with a plurality of pre-selected frequencies to identify unrotated resonant modes and then identifies a set of excitations for each unrotated resonant mode to be analyzed by acting on a plurality of phase-shifts and keeping the frequency locked for that resonant mode. Specifically, for each unrotated resonant mode, the controller 14 generates a set of excitations with the same frequency (of the nominal mode) and a combination of phase-shifts. The set of phases might be defined a-priori, statically defined on run-time, or even be adaptive according to different parameters. Furthermore, the phase-axis might include all the phase-shifts inside the analysis range or a few samples only, in order to save computational time at the expense of approximation. The phase-shifts are not arbitrarily defined, since an excitation related to a specific symmetry plane might couple with another one if rotated too close to it. It is thus advantageous for the controller 14 to set proper bounds to the phase-axis.

The selected actuations may be stored together with their efficiencies. For each mode of each symmetry class, the map phasor/efficiency is stored, i.e. if a cavity has two ports with two possible classes and two modes for each one has been selected, four sets of excitations will be performed, each set with all the defined phase-shifts, thus obtaining four sets of efficiency measurements to be further analyzed.

The recorded map of efficiency is then analyzed in the second substep (excitations analysis substep (2)) in order to find the phase-shift that optimizes efficiency, since theoretically the efficiency vs. phase curve should follow a sinusoidal trend with a maximum on the actual symmetry plane of the system.

Once the optimal rotation plane has been found, the resonant mode is changed accordingly per the third substep (resonant mode rotation substep (3)). From reconciling the information from all the symmetry planes it is possible to have the full picture of the resonant modes available in the cavity classified per class of symmetry. Additional details of substeps (1)-(3) are described above with respect to FIG. 17.

In step 504, a heating target is then selected corresponding to an amount of energy that is to be to delivered to each symmetry plane in the enclosed cavity based in part upon the food load positioned in the enclosed cavity where the heating target includes a plurality of resonant modes that are rotated using the selected rotations in the preceding step 502. Step 502 thus includes substep (4) of step 402 described above. When selecting a heating target, the controller 14 is further configured to select the heating target according to food load and cooking cycle requirements.

Following step 504, the controller 14 performs steps 506-510, which correspond to steps 406-410 of FIG. 17. Insofar as these steps are the same, the details of steps 506-510 are not provided. Instead, the description of steps 406-410 above is incorporated herein by reference.

Figure 28:
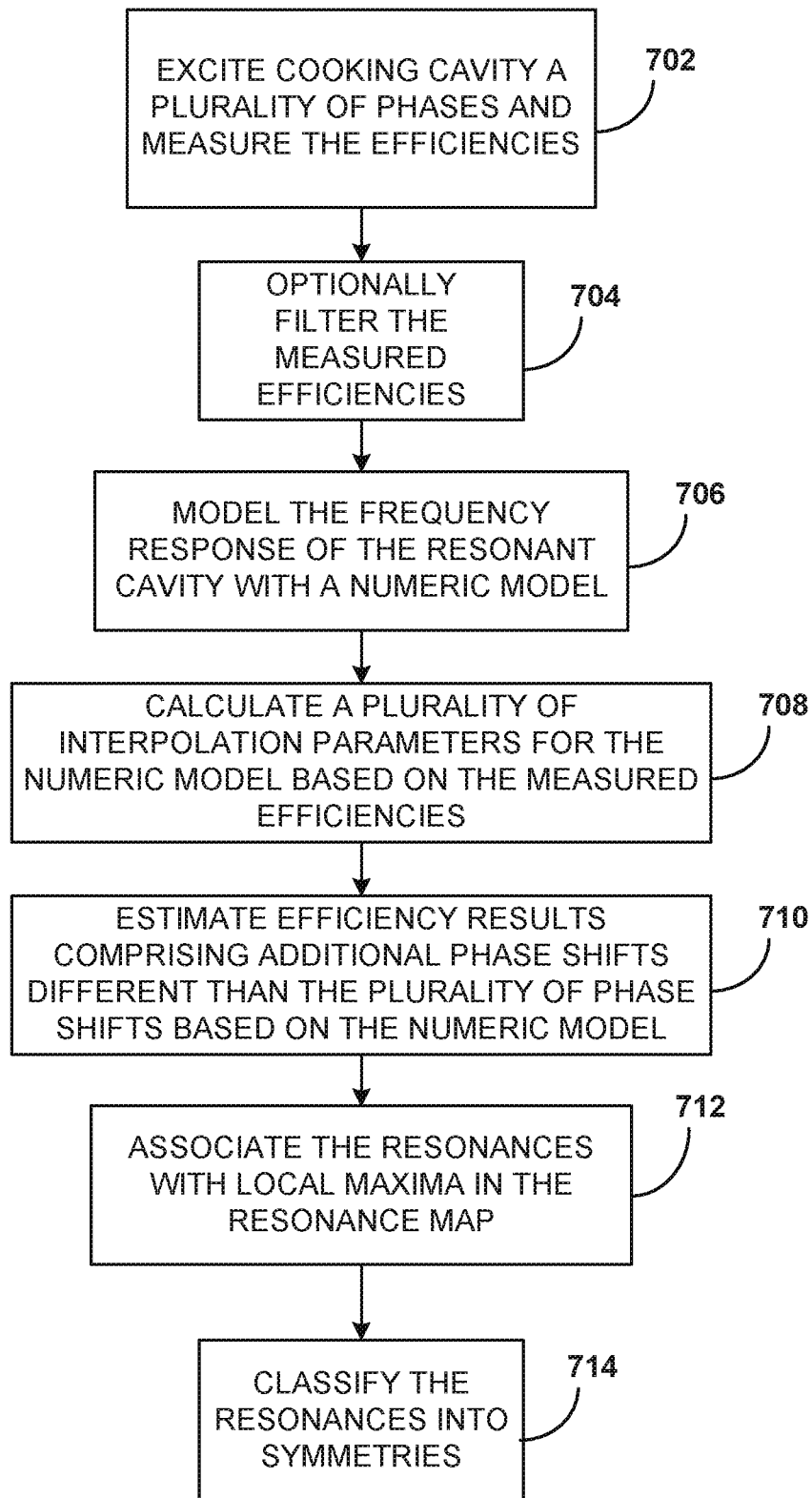
FIG. 28 is a flowchart illustrating a method of spectro-modal identification of resonant modes within the cooking cavity.

With reference to FIG. 28, a method 700 of spectromodal identification of resonant modes within the cooking cavity 20 is now described. The system 10 may map the resonance peaks over a range of frequencies and phase shifts of the output signals. It is important that the results be measured for each system 10 and food load because the resonance map may vary based on changes in the food load and heating cavity 20 throughout a cooking operation. In general, the controller 14 may detect the resonance map by completing a frequency sweep (step 702) whereby excitations at various frequencies and predetermined phase shifts are applied to the cavity 20 according to symmetries that can be excited in the system 10. During step 702, the output power of the high-power amplifiers 18A-D shall be reduced to a safe level, (i.e. low enough to ensure no damage even when high reflections occur).

Figure 29A:
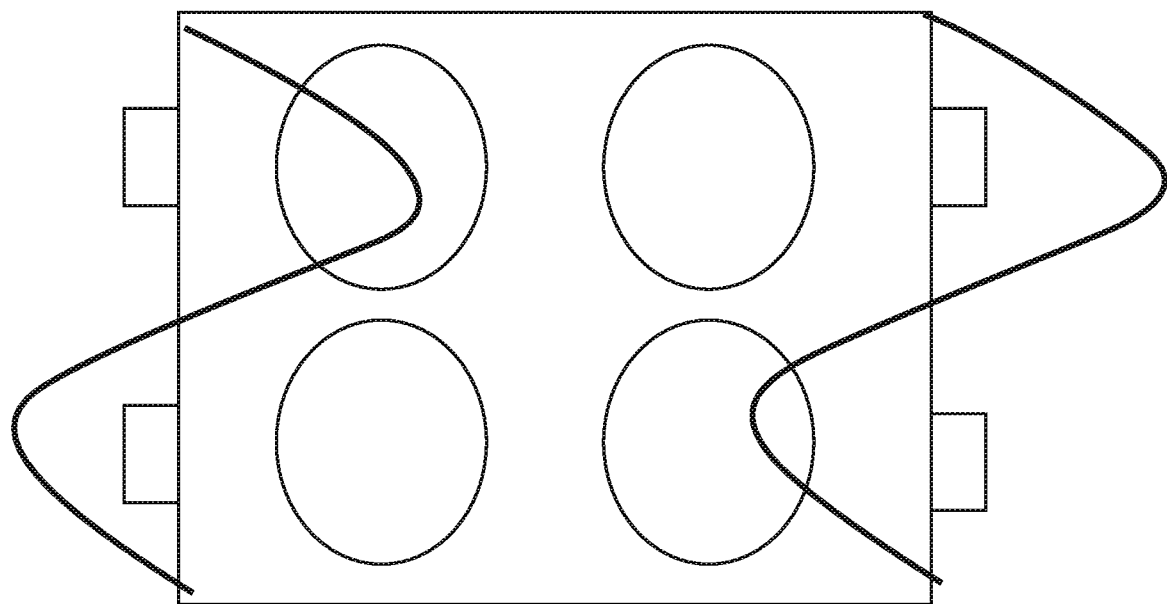
FIG. 29A is a schematic diagram of a heating cavity demonstrating a phase shift having an even symmetry.
Figure 29B:
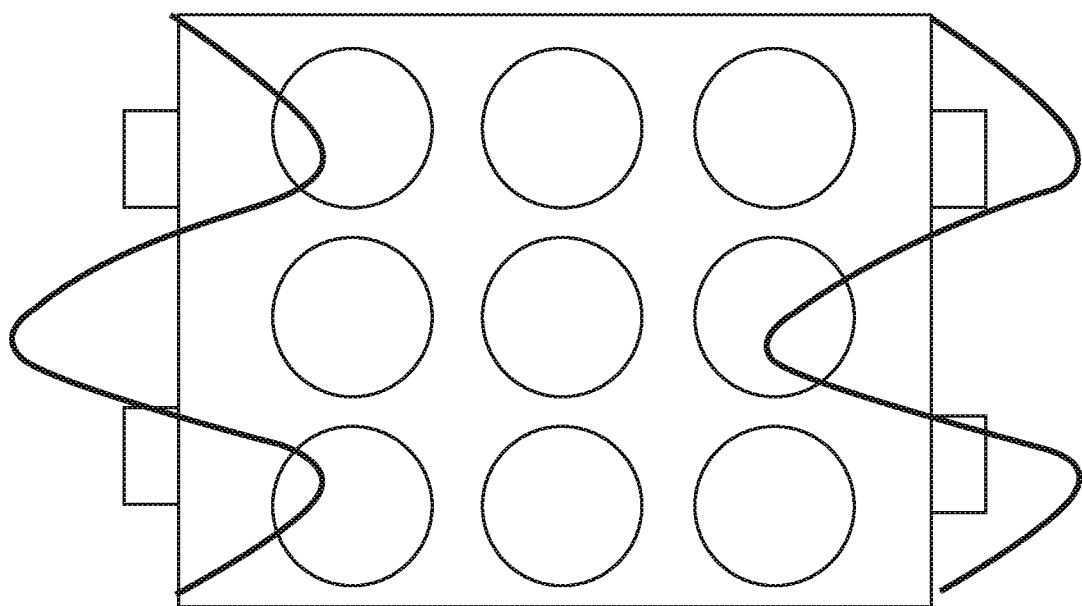
FIG. 29B is a schematic diagram of a heating cavity demonstrating a phase shift having an odd symmetry.

Referring to FIGS. 29A and 29B, an embodiment of the cooking cavity 20 comprising four waveguide inlet ports (RF feeds 26A-D, 226A-D) is shown. For step 702, the controller 14 may be configured to supply a different control signal to each of four corresponding amplifiers 18A-D such that there may be three phase shifts that may be applied to the radiation emitted from the RF feeds 26A-D, 226A-D. Accordingly, the controller 14 may control an excitation symmetry may be applied to measure the response of the system 10 to a particular food load. For example, for a four-port system, the phases may be [0, 0, 0]°, [0, 45, 45]°, [0, 90, 90]°, [0 180, 180]°, and so on. Optionally, for step 702, the controller 14 may test all the phase shift vectors in order to build a detailed resonance map collecting efficiency at every given frequency/phase shifts point.

Figure 30:
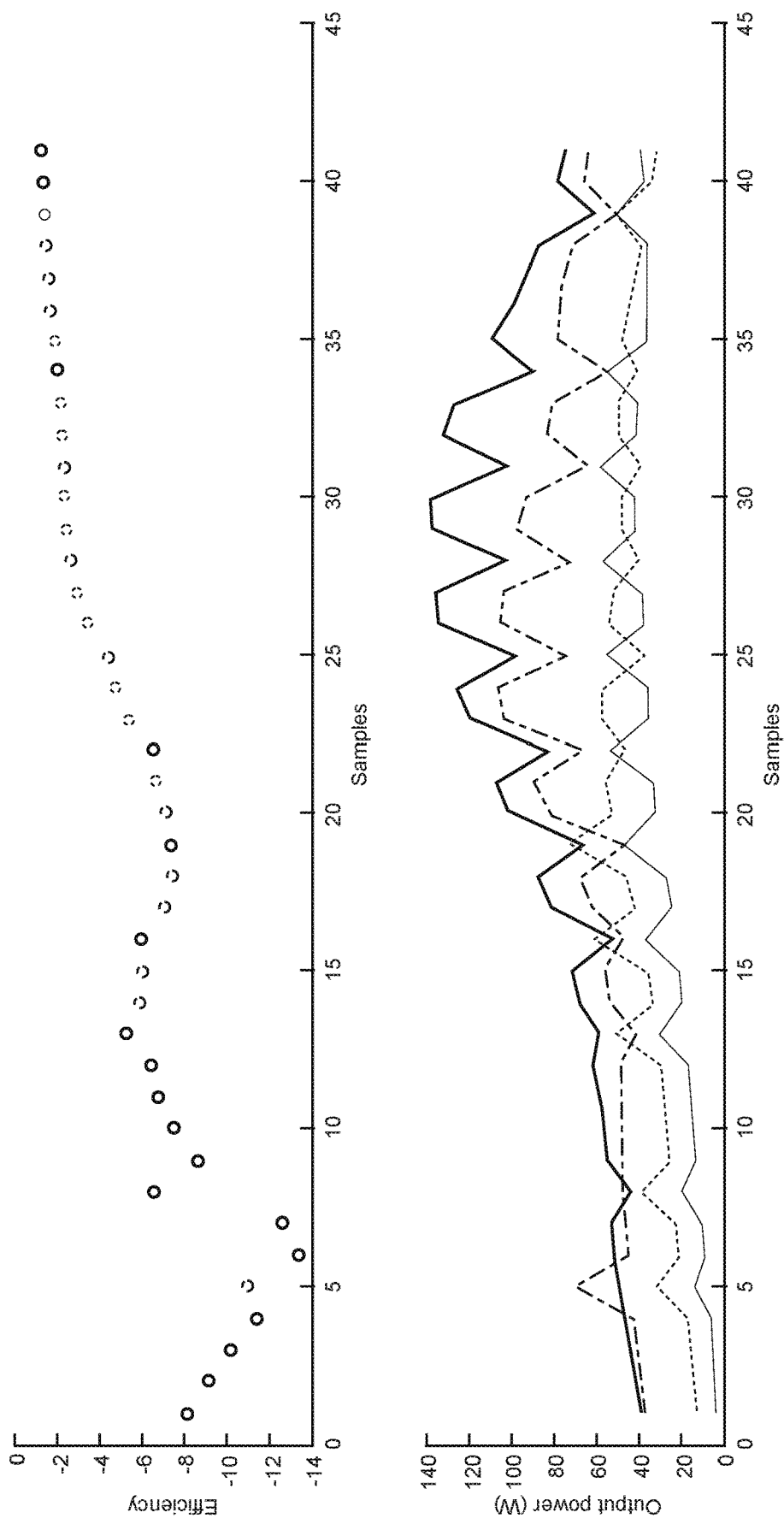
FIG. 30 are graphic plots illustrating an example of adaptive filtering.

Optionally, the controller 14 may also filter the measured efficiency in step 704 over a frequency span given a fixed phase shift with a low-pass filter. Alternatively, the measured efficiency may be filtered over the frequency span given a fixed phase shift with an adaptive filter. The adaptive filter may have weights given by a measured imbalance power distribution supplied by each of the amplifiers 18A-D. By filtering the results, peaks in injected power from the amplifiers 18A-D may be removed. In this way, false peaks that do not correspond to resonances of the device 10 may be removed from the results. An example of adaptive filtering is shown in FIG. 30.

In some embodiments, the controller 14 may model the cooking cavity 20 including the food load with a numeric or mathematical model as shown in step 706. The model may relate the efficiency of the cooking cavity 20 with a food load to the operating frequency of the RF feeds 26A-D, 226A-D. For example, for every axis the model may relate the system efficiency η and per-channel reflections ρ of the RF feeds 26A-D, 226A-D to the rotation angle γ (vector of phase shifts between ports). This relationship is represented as Equations 1 and 2.

$$\eta(f,\gamma)=\eta_1(f)\cos(\gamma)+\eta_2(f)\sin(\gamma)+\eta_3(f) \quad \text{(Equation 1)}$$

$$\rho(f,\gamma)=\rho_1(f)\cos(\gamma)+\rho_2(f)\sin(\gamma)+\rho_3(f) \quad \text{(Equation 2)}$$

Equations 1 and 2 may further be represented with a general form demonstrated in Equation 3.

$$x(f,\gamma)=x_{ic1}(f)\cos(\gamma)+x_{ic2}(f)\sin(\gamma)+x_{ic3}(f) \quad \text{(Equation 3)}$$

Accordingly, the model of the cooking cavity 20 may comprise a plurality of unknown interpolation parameters. These interpolation parameters may correspond to three variables: $x_{ic1}(f)$, $x_{ic2}(f)$, $x_{ic3}(f)$. Since there are three parameters per frequency, the minimum number of efficiencies to be sampled in order to be able to invert the model of the cooking cavity 20 is equal to three. For example for a given frequency $f$, the controller 14 may excite the system 10 with phase shifts equal to [0, 120, 240°]. These efficiencies may then be measured by the measurement system to record the three efficiencies (e.g. 85°, 70°, 69°) as follows:

$$85\%=\eta_1(f)\cos(0)+\eta_2(f)\sin(0)+\eta_3(f)$$

$$70\%=\eta_1(f)\cos(120)+\eta_2(f)\sin(120)+\eta_3(f)$$

$$69\%=\eta_1(f)\cos(240)+\eta_2(f)\sin(240)+\eta_3(f)$$

In this way, the controller 14 may continue to calculate a plurality of interpolation parameters as the coefficients for the numeric model based on the measured efficiencies as demonstrated in step 708. Accordingly, the interpolation parameters may correspond to: $\eta_1(f)$, $\eta_2(f)$, $\eta_3(f)$.

With the interpolation parameters, the controller 14 may estimate efficiency results comprising additional phase shifts different than the phase shifts utilized to induce the measured efficiencies as shown in step 710. In some embodiments, the controller 14 may utilize the model of the system to interpolate the full space for all possible phase shifts over the operating range of the system. That is, the controller 14 may model the efficiency response of the system 10 for the cooking cavity 20 for each food load over substantially all operating frequencies and phase shifts of the RF feeds 26A-D, 226A-D.

As discussed herein, the disclosed interpolation method may provide for the controller 14 to measure efficiency responses for just three or four frequency and phase modes. With the measured efficiencies, the controller 14 may interpolate the results to get efficiency responses for all the other phase shifts based on the interpolation coefficients of the system including those that have not been tested. The interpolation coefficients may be stored in memory. In this configuration, the controller 14 may test the response of the reflected signals of only a few input signals to deduce the full efficiency of the heating cavity 20 in the frequency/ phase domain. Examples of resonance maps are shown in FIGS. 25 and 26. The resonance maps of FIGS. 25 and 26 demonstrate a plurality of resonance peaks in squares and triangles. The squares denote peaks with even symmetry and the triangles denote peaks with odd symmetry.

In step 712, the controller 14 may associate the resonances of the system 10 to local maxima in the resonance map. As discussed herein, the resonances of the system may correspond to resonant modes demonstrating critical or resonant frequencies of the system. The controller 14 may store the modes in memory and in some embodiments, may utilize the phase shifts and frequencies associated with the modes to control the RF feeds supplied into the cooking cavity 20. In this way, the controller may identify and control a distribution of the electromagnetic energy within the cooking cavity 20.

In step 714, the resonance maps of the system 10 may be categorized based on an odd, even, or combined frequency distributions among the phase shifts. That is, the applied phase shift directly relates to the class of symmetry of the coupled resonant mode. For example, the phase shift in FIG. 29A may correspond to an even symmetry. The phase shift in FIG. 29B may demonstrate the sources in antiphase relationship activates modes of odd symmetry. Such classification of the resonances may be made according to their absolute phase (i.e., if they are between 90°-270° then classify as secondary symmetry plane, if less than 90° or more than 270° classify as first symmetry plane. In this way, the controller 14 may monitor the reflected signals from each of the RF feeds 26A-D, 226A-D to identify sample data for a resonance map of the heating cavity 20.

The method described above with respect to FIG. 28 may be summarized as follows. The controller 14 may control the RF feeds corresponding to a first RF signal and a second RF signal. The RF signals may be within an operating range of system 10 and controlled by the controller 14 at a plurality of phase shifts between the first RF signal and the second RF signal. Additionally, the controller 14 may control the amplifier 18 to amplify the RF signals in order to generate the RF feeds in the cooking cavity 20. The controller 14 may further measure a plurality of efficiencies of the reflection signals in the cavity induced by the RF feeds for the plurality of phase shifts and estimate efficiency results for the frequency response of the cavity 20. The efficiency results may comprise additional phase shifts estimated for the operating range of the cooking device. In this example, the additional phase shifts are different from the plurality of phase shifts utilized to generate the RF feeds.

In addition to the efficiency, the controller 14 may additionally monitor the max reflected power signals for each of the RF feeds 26A-D, 226A-D to identify a capability of each of the amplifiers 18A-D to sustain operation of each of the modes of operation discussed herein. For example, based on the reflected power signals, the controller 14 may identify a maximum reflection of each individual channel of the RF feeds 26A-D, 226A-D. In this way, the controller 14 may compare the driving power supplied to the amplifiers 18A-D with the maximum reflection signal corresponding to each of the amplifiers 18A-D to determine if each of the amplifiers 18A-D is operable to maintain operation at a desired frequency and power. Accordingly, the controller 14 may verify that the operation of the amplifiers 18A-D is preserved to maintain the system models of the amplifiers 18A-D throughout operation. The controller 14 may further be configured to estimate the efficiency results based on a numeric model comprising a plurality of interpolation parameters. The interpolation parameters are calculated for the numeric model based on the plurality of efficiencies measured for the reflection signals. In some embodiments, the controller may update the interpolation parameters for the cooking cavity 20 during a cooking process. In order to update the interpolation parameters, the controller 14 may measure additional efficiencies of the reflection signals and recalculate the interpolation parameters to account for changes in the efficiency response that may result from heating the food load.

Benefits of the spectromodal identification method described above include the ability to detect the efficiency response and the resonance map of the system, better noise rejection when inconsistent powers are applied to the system (high-power amplifiers 18A-D overshoots, coarse regulation of the power), and reduced sensing-identification time resulting in higher effective power (due to the reduction of output power of the high-power amplifiers 18A-D to a safe level during step 702). Optionally, a random access memory may be used to store 'snapshots' of the system to notify the user, measure or quantify changes over time of the snapshots. Another options to use techniques such vector fitting or other fitting techniques to classify the resonances in terms of Q-factor and resonant (critical) frequency.

When the RF system of the electromagnetic cooking device is stable for a given RF excitation (at a set frequency and set phase shift for a multiport system), reflected power is constant. Insofar as reflected power is inversely related to efficiency, the efficiency also remains constant when the RF system is stable for a given excitation. However, if the RF system is unstable, the reflected power and hence the efficiency varies over time in a noisy fashion. The stronger the instability in the RF system, the bigger the oscillations in the reflected power. Causes of such instability may be changes in characteristics of the food load as the cooking cycle progresses. As explained further below, such changes in characteristics of the food load may be volumetric. Thus, by monitoring the change of the reflected power or efficiency throughout the cooking cycle, changes in the volume of the food load may be detected. The ability to detect changes in the volume of a food load or to detect other changes in characteristics of the food load, is advantageous in controlling the following specific processes: cooking popcorn, heating milk, bringing liquids to boiling, and melting foods such as chocolate or butter. Another advantage is that this ability can be used to detect and therefore prevent splattering of the food load in the cooking cavity. These specific examples are discussed further below under separate headings pertaining to each process.

In a multiport system such as that described above with multiple RF feeds 26A-D, 226A-D, any change in the input phasors (i.e., frequency, amplitude, phase shifts) will affect efficiency. Thus, one cannot simply monitor numerical values representing the efficiency throughout the cooking cycle to detect changes in characteristics of the food load when the heating strategy for that cooking cycle involves changing the input phasors throughout the cycle as changes in efficiency may be caused by the change in phasors rather than changes in the food load. Therefore, the time variation of the coefficient of variation of efficiency may be used to isolate changes in efficiency that are caused by changes in characteristics of the food load as opposed to those caused from changes in the input phasors.

Figure 31:
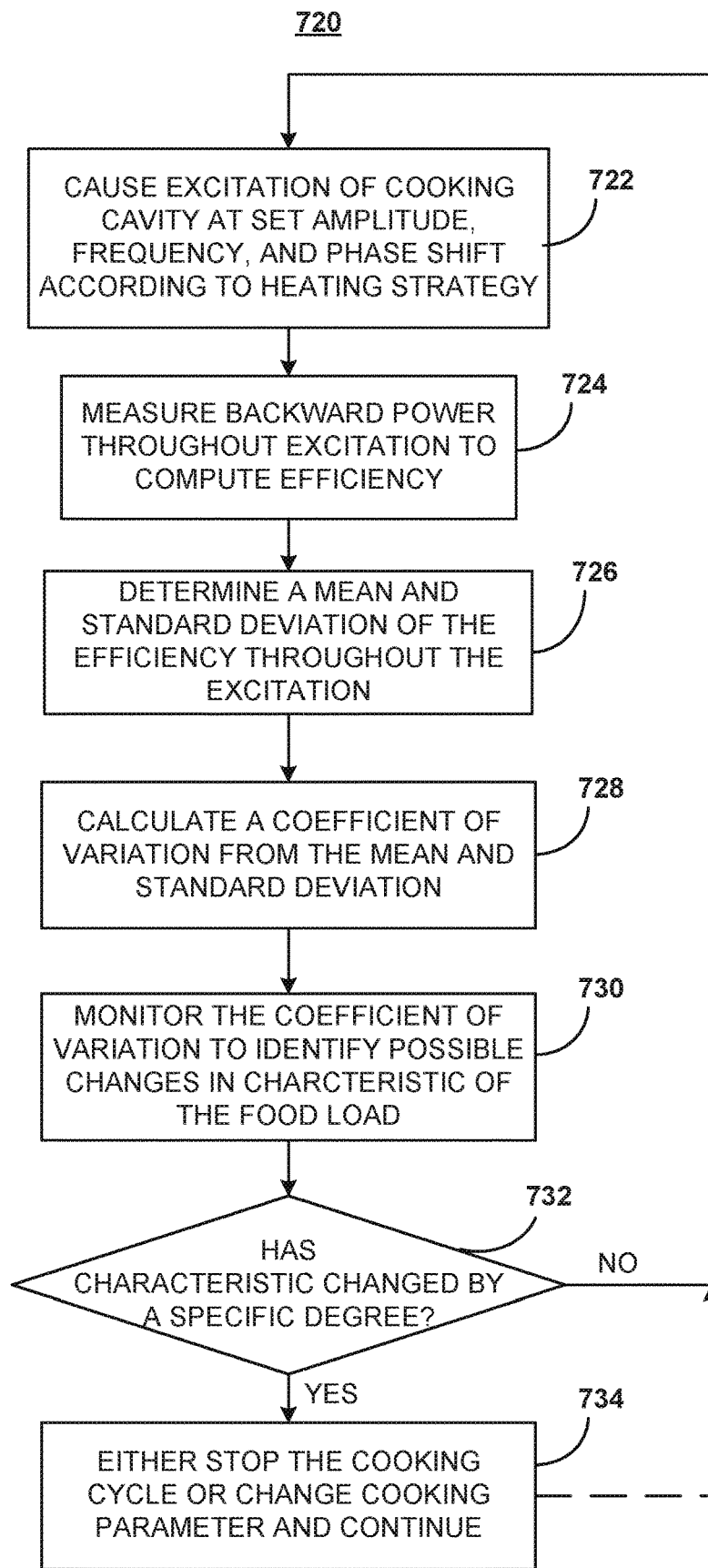
FIG. 31 is a flowchart illustrating a method of monitoring a food load using a coefficient of variation of the efficiency.

An electromagnetic cooking device 10 may therefore be provided that includes the enclosed cavity 20 in which a food load is placed, the controller 14, and the plurality of RF feeds 26A-D, 226A-D configured to introduce electromagnetic radiation into the enclosed cavity to heat up and prepare the food load, the plurality of RF feeds 26A-D, 226A-D are configured to allow measurement of forward and backward power at the plurality of RF feeds. The controller 14 may be configured to perform the steps of the method 720 shown in FIG. 31. Specifically, the controller 14 may control the system such that it generates RF excitations at a specified frequency and phase shifts from the plurality of RF feeds 26A-D, 226A-D (step 722) for a predetermined period of time (e.g., 0.5 to 4.0 seconds) in accordance with a heating strategy as discussed above. Next, over the predetermined time period (or throughout the duration of the excitation), the controller 14 measures and analyzes the backward power at the plurality of RF feeds 26A-D, 226A-D to calculate efficiency (in the manner discussed above) (step 724), determines a coefficient of variation in the efficiency (steps 726 and 728), and monitors the coefficient of variation to identify possible changes in a characteristic of the food load (step 730). The determination of the coefficient of variation in the efficiency may be made by determining a mean and standard deviation (std) of the efficiency over the predetermined time period (step 726) and calculating the coefficient of variation from the mean and standard deviation (step 728). In step 728, the coefficient of variation may be calculated as (std/mean). Next, in step 732, the controller 14 determines if a possible change is identified in a characteristic of the food load based on changes in the coefficient of variation over the cooking cycle up to that point in time where such a change reaches some specified threshold (e.g., a specified change in volume). Note that the specified degree of change in the food load characteristic needed to satisfy step 732 will vary depending on the type of food load as will be apparent from the examples described below. If no such change in the food load characteristic is identified, the controller 14 repeats steps 722-732 until such time that such a change is identified. Note that in repeating step 722 different input phasors may be used in accordance with the heating strategy. Thus, in executing the method 720, the controller 14 recomputes the mean and standard deviation and hence the coefficient of variation for the duration of each different input phasor excitation. In this way, mean and standard deviations are effectively normalized across all the different RF excitations and are comparable regardless of changes in the efficiency caused by changes in the input phasors.

Once the controller 14 identifies a change is identified in a characteristic of the food load that reaches the specified threshold (e.g., a specified change in volume) in steps 730 and 732, the controller 14 executes step 734 in which it may either stop the cooking cycle or change a cooking control parameter such as the heating strategy including amplitude, frequency and/or phase shifts of the input phasors, and continue through steps 722-732 until such time that another change occurs that may trigger yet another change in heating strategy or halt the cooking cycle. Again, the specific action taken in step 734 will depend on the type of food load and the corresponding cooking cycle and heating strategy for that type of food load.

Because it is the rate of variation over time and not the absolute level that is of interest, by calculating the coefficient of variation of the efficiency, the identification of a change in a characteristic of the food load is insensitive to the relative efficiency level. This allows comparisons between the different excitations at different amplitudes, frequencies and phase shifts.

As noted above, once the change in the coefficient of variation identifies a change in a characteristic of the food load to a specified degree, the cooking process may be stopped or altered. Optionally, a frequency scan can be repeated to remap the resonant modes.

Although the example is provided herein where the coefficient of variation of efficiency is used, other metrics may be used to determine a change in a characteristic of the food load. Such other metrics may measure the amount of 'noise' superimposed to the efficiency where the noise can be normalized across all input phasors. Such metrics may distinguish the kind of variations or system instability. One approach may be to execute a fast Fourier transform (FFT) on the measured backward power or the computed efficiency so as to focus on high frequency content caused by changes in the food load as changes caused by changes in input phasors present themselves in low frequency content due to the changes in input phasors at 0.5 to 4.0 second increments. It should be noted that the efficiency is being continuously calculated throughout the duration of each separate RF excitation and that the changes that are being monitored are not in the seconds domain, but rather in the less-than-one-second domain, such that a change in food load may be detected during any one excitation.

Having now described the manner in which the coefficient of variation can be computed, several applications are now described.

A. Automatic Boiling Detection

Figure 32A:
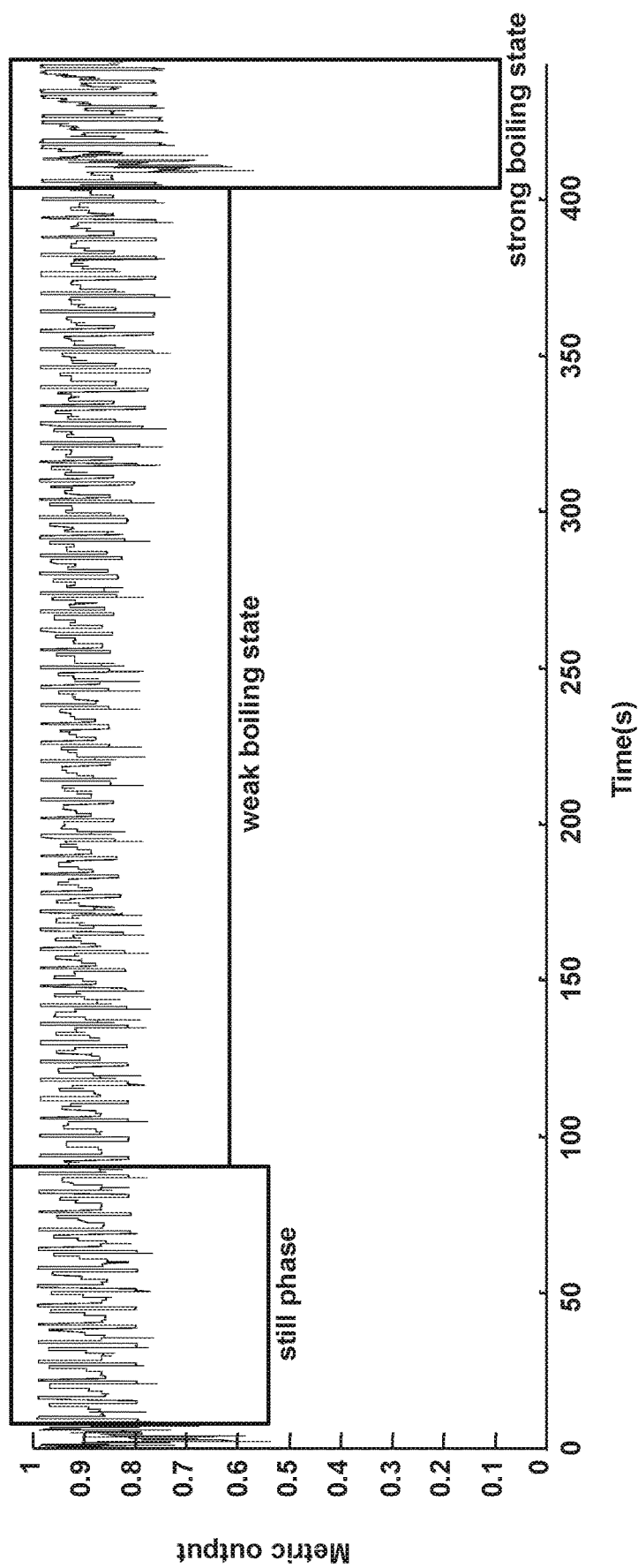
FIG. 32A illustrates sample data for an efficiency of a liquid being heated in a cooking cavity during a still phase, a weak boiling state, and a strong boiling state.

Referring to FIGS. 32A and B, sample data is shown for the efficiency (FIG. 32A) and corresponding coefficient of variation of efficiency (FIG. 32B) for a liquid heated in the cooking cavity 20 over a period of time. For purposes of illustration, the efficiency and corresponding coefficient of variation are shown during each of a still phase, a weak boiling state, and a strong boiling state of the liquid. By calculating the coefficient of variation of efficiency and monitoring the signal properties, the controller 14 is operable to detect oscillations in the reflected power that is proportional to the oscillations in the volume of the liquid. Notably, the coefficient of variation of efficiency is proportional to a boiling level of the liquid. That is, the greater the degree of boil, the greater the coefficient of variation of efficiency. Based on these properties, the controller 14 may detect a heating state of the liquid that may include a beginning time of boiling, the weak boiling state, and the strong boiling state.

Figure 32B:
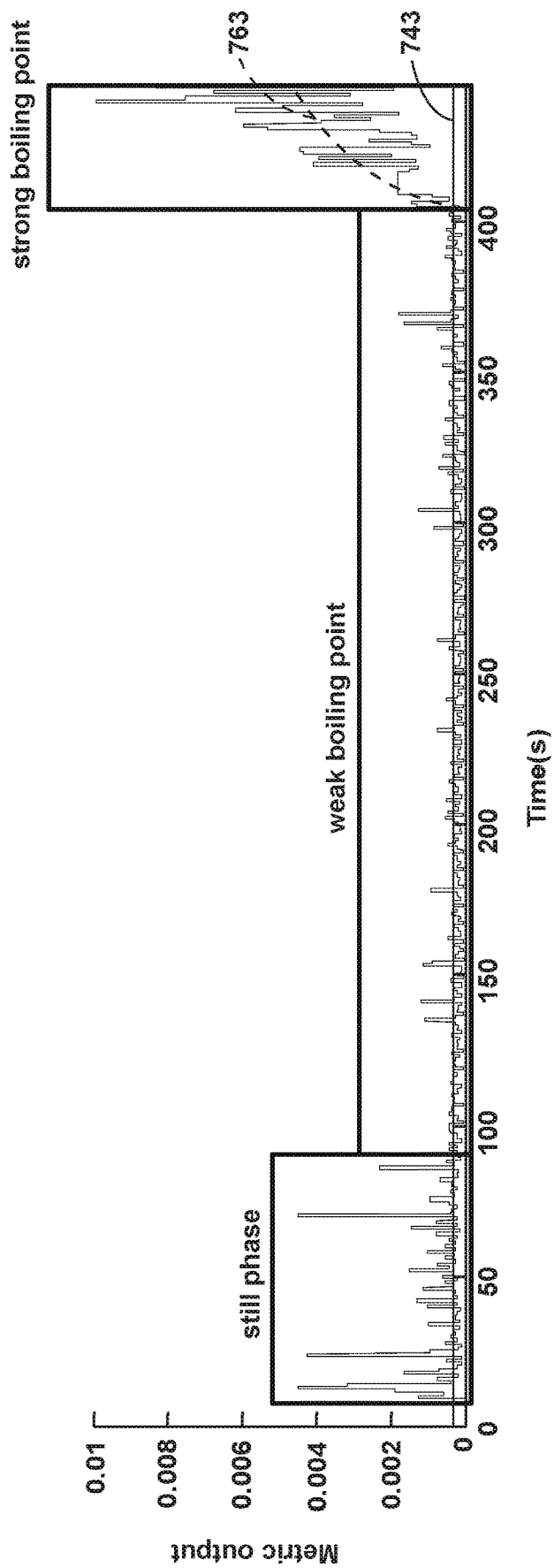
FIG. 32B illustrates sample data for a coefficient of variation determined from the efficiency shown in in FIG. 32A.
Figure 33:
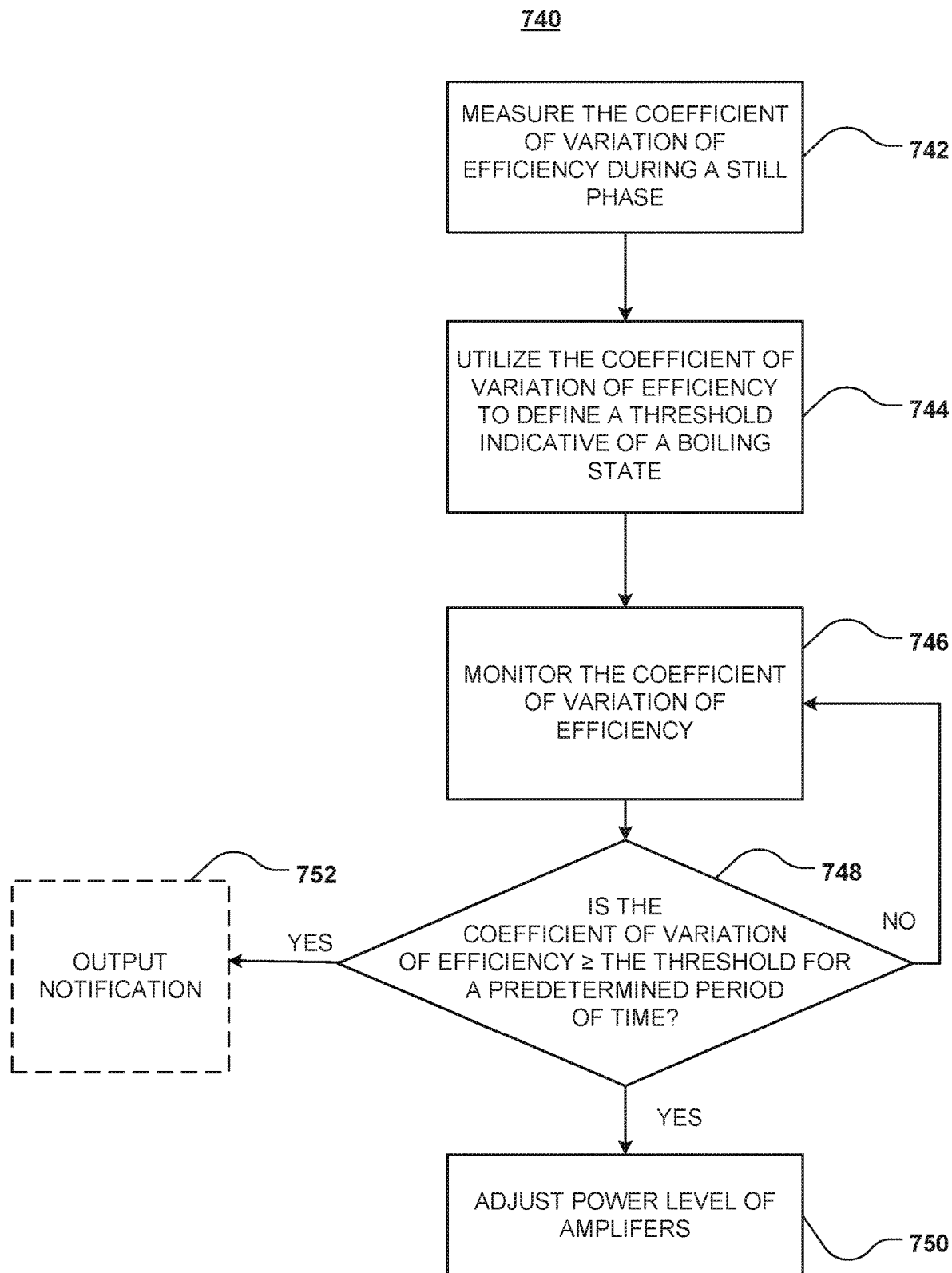
FIG. 33 is a flowchart illustrating a method of heating the liquid based on the coefficient of variation of efficiency and the threshold shown in FIG. 31B.

The controller 14 may control the heating of a liquid by performing heating method 740 shown in FIG. 33, in which the controller 14 first measures the coefficient of variation of efficiency during a still phase (step 742) that may correspond to an initial heating period. For example, the still phase may include a predetermined time period as shown in FIG. 32B. The coefficient of variation of efficiency measured during the still phase may be utilized to define a threshold (e.g., threshold 743, FIG. 32B) indicative of the strong boiling state (step 744). In some embodiments, the coefficient of variation of efficiency measured during the still phase may be stored to memory prior to defining the threshold. Alternatively, the threshold may be defined by a predetermined value stored to memory. For example, the threshold may be determined by measuring the mean of the coefficient of variation during the still phase or time period therein (e.g., the first 20 seconds) and multiplying the mean by a constant (e.g., 3). Thus, it will be understood that in some embodiments, the threshold may correspond to the product between the mean of the coefficient of variation of efficiency measured during a time period of the still phase and a predetermined multiplier.

Once the threshold is defined, the controller 14 monitors the coefficient of variation of efficiency (step 746), and if the coefficient of variation of efficiency is greater than or equal to the threshold for a predetermined period of time (step 748), it is determined that the liquid is in the strong boiling state, and in response, the controller 14 adjusts a power level of amplifiers 18A-D (e.g., changing a duty cycle, input power, etc.) (step 750). Otherwise, the controller 14 determines that the liquid is in a weak boiling state and continues to monitor the coefficient of variation of efficiency (step 746) until the condition specified at step 748 is satisfied. With respect to step 750, the adjustment may include maintaining or increasing the power level to keep the liquid in the strong boiling state, decreasing the power level to maintain the liquid near the strong boiling state or returning the liquid to the weak boiling state, or stopping the heating of the liquid altogether by deactivating amplifiers 18A-D. Furthermore, the adjustment to the power level may be limited to a period of time set by the controller 14. Optionally, once the condition specified at step 748 is satisfied, or in other words, the controller 14 has detected that the liquid has reached the strong boiling state, the controller 14 may output a notification to the user interface 28 or a mobile device such as a smartphone (step 752). In response, a user may provide input to the controller 14 (via the user interface 28 or the mobile device) accepting the adjustments described at step 750 or otherwise making other adjustments, if desired.

Figure 34:
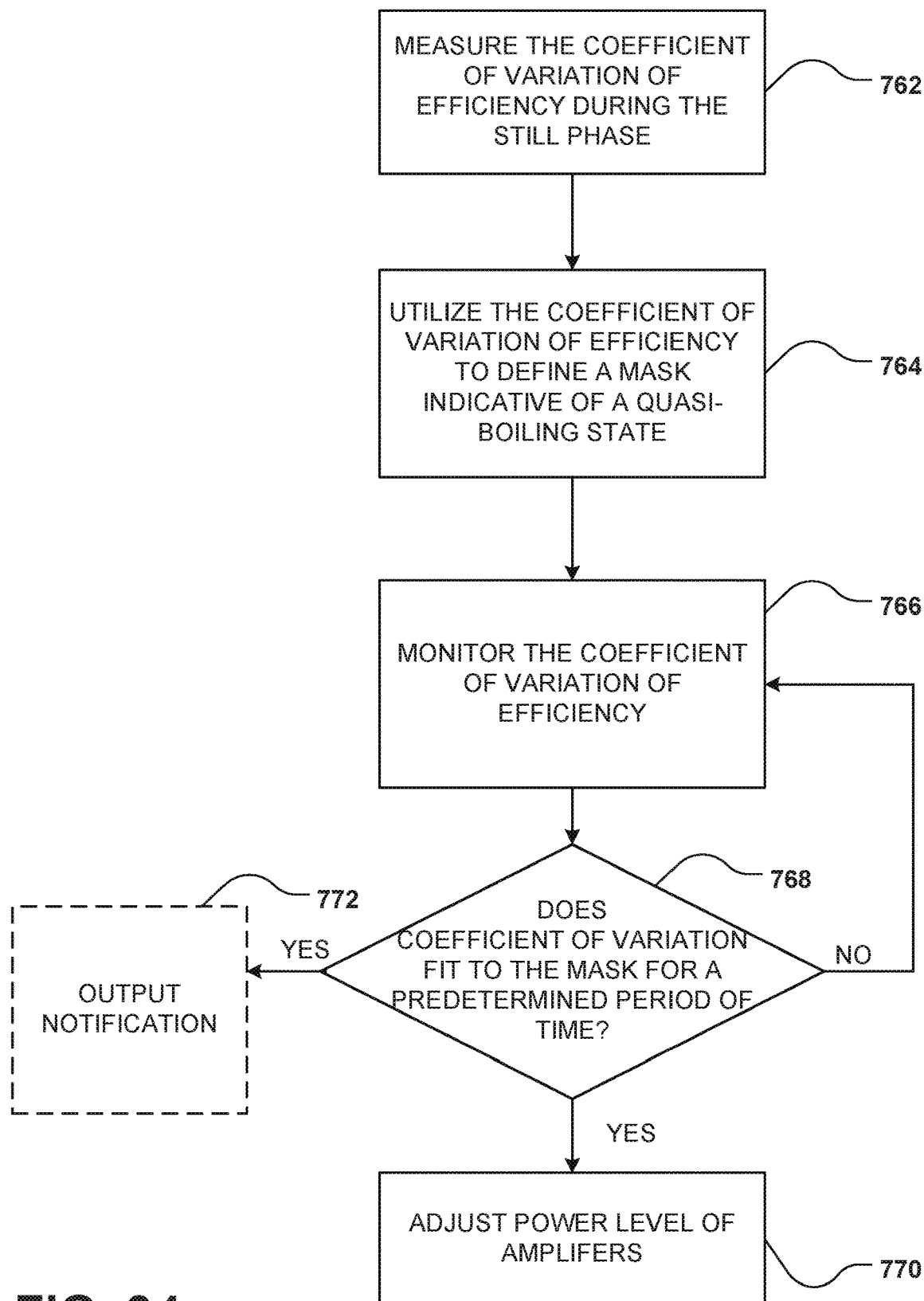
FIG. 34 is flowchart illustrating and alternative method of heating the liquid based on the coefficient of variation of efficiency and the mask shown in FIG. 31C.

The controller 14 may additionally or alternatively control the heating of the liquid by performing heating method 760 shown in FIG. 34, in which the controller 14 first measures the coefficient of variation of efficiency during the still phase (step 762). The coefficient of variation of efficiency measured during the still phase may be utilized to define a mask (e.g., mask 763, FIG. 32B) indicative of the strong boiling state (step 764). In some embodiments, the coefficient of variation of efficiency measured during the still phased may be stored to memory prior to defining the mask. Alternatively, the mask may be defined by a predetermined function stored to memory. It is contemplated that the mask may be expressed as a rising linear, exponential, or logarithmic function. Once the mask is defined, the controller 14 monitors the coefficient of variation of efficiency (step 766), and if the coefficient of variation of efficiency fits to the mask for a predetermined period of time (step 768), the controller 14 determines that the liquid is in the strong boiling state, and in response, adjusts a power level of amplifiers 18A-D (step 770). Otherwise, the controller 14 determines that the liquid is the weak boiling state and continues to monitor the coefficient of variation of efficiency (step 746) until the condition specified at step 768 is satisfied. With respect to step 770, the adjustment may include maintaining the power level, increasing the power level, decreasing the power level, or stopping the heating of the liquid altogether. Optionally, once the condition specified step 768 is satisfied, or in other words, the controller 14 has detected that the liquid has reached the strong boiling state, the controller 14 may output a notification to the user interface 28 or a mobile device such as a smartphone (step 772). In response, a user may provide input to the controller 14 (via the user interface 28 or the mobile device) accepting the adjustments made at step 770 or otherwise making other adjustments, if desired.

It will be appreciated that a user may select which method 740, 760 to implement using the user interface 28 or a mobile device. Advantageously, the methods 740, 760 described above greatly improve energy consumption and enable a user to obtain an optimum boiling level and temperature of a liquid without having to input any specific characteristics of the liquid such as mass or volume. Likewise, the system 10 is able implement the methods 740, 760 without having to detect the specific mass or volume of the liquid.

B. Automatic Milk Heating

Figure 35:
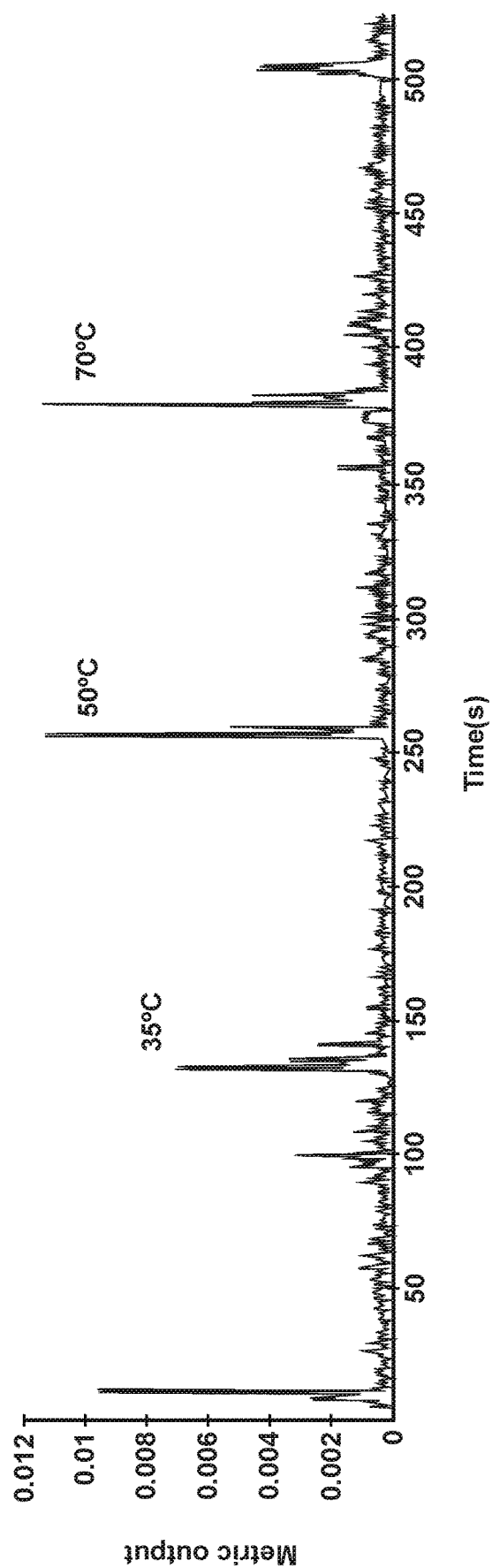
FIG. 35 illustrates sample data for the coefficient of variation of efficiency for milk heated in the cooking cavity.

Referring to FIG. 35, sample data is shown for the coefficient of variation of efficiency (metric output) for a specific liquid, namely milk, which is heated in the cooking cavity 20 over a period of time. The coefficient of variation results for milk demonstrate changes in the reflected power at approximately 37° C., 50° C., and 85° C. based upon steep changes in permittivity with respect to temperature rise that are related to protein denaturation and other chemical changes. These chemical reactions drive frequency shifts and Q-factor variations in the resonances of the system 10. Each of the changes corresponds to a state of the milk that may be detected by the controller 14 and utilized in conjunction with measured resonance shifts to estimate the temperature of milk and control an automated heating function. That is, the controller 14 may indirectly detect the temperature of the milk and control a heating state of the milk in response to the milk temperature being: below 37° C., between 37° C. and 50° C., between 50° C. and 85° C., and greater than 85° C. In this way, the controller 14 may automatically prepare the milk to a specific temperature or range based on user-specified temperature input. Such a feature is particularly beneficial for heating milk to the appropriate temperature for a young child or baby.

Figure 36:
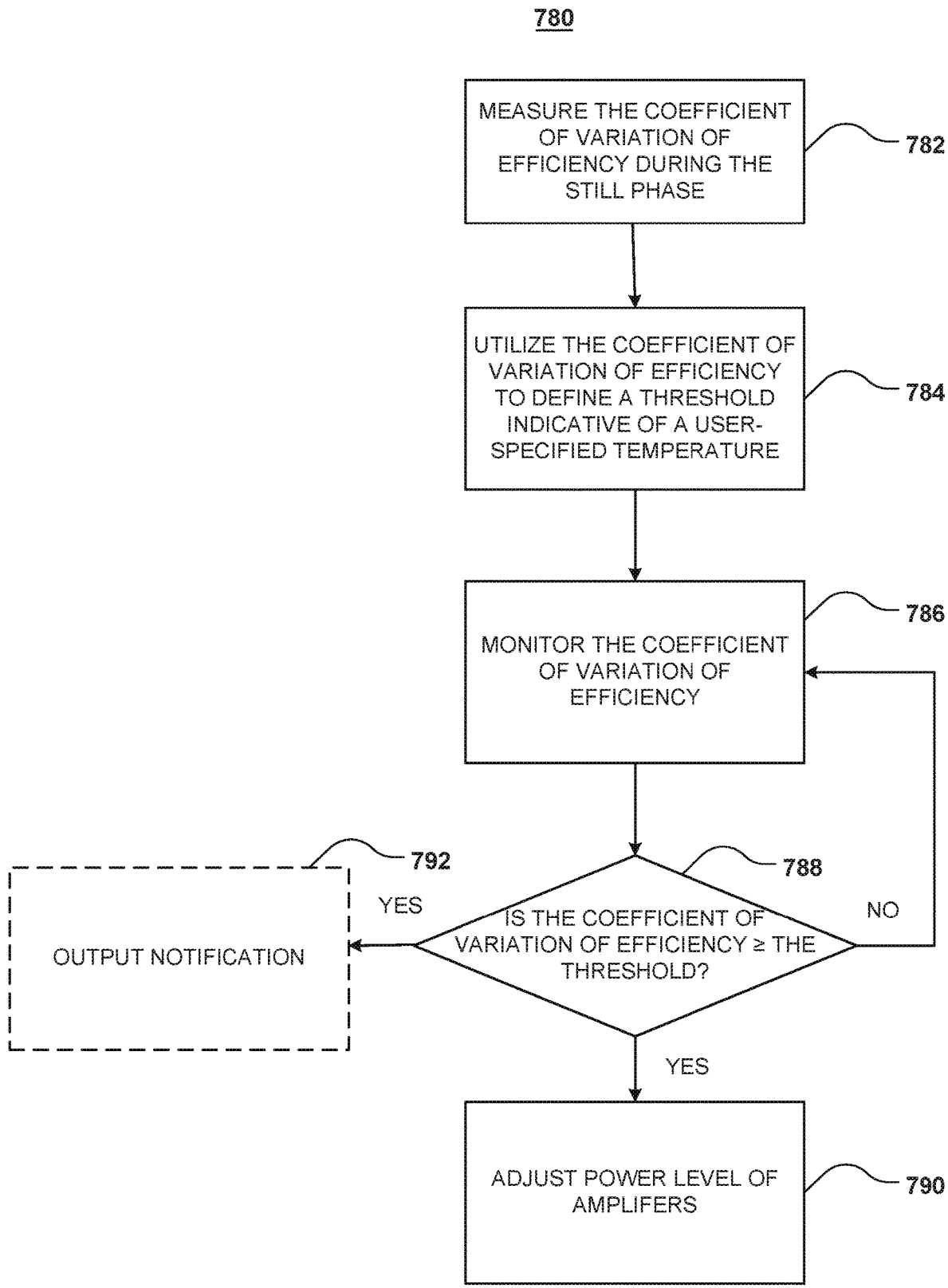
FIG. 36 is a flowchart illustrating a method of heating milk based on the coefficient of variation of efficiency and a threshold indicative of a user-specified temperature.

The controller 14 may control the heating of milk by performing method 780 shown in FIG. 36, in which the controller 14 first measures the coefficient of variation of efficiency during a still phase (step 782) that may correspond to an initial heating period. The coefficient of variation of efficiency measured during the still phase may be utilized to define a threshold indicative of a temperature specified by a user (step 784) via the user interface 28 or a mobile device, for example. In some embodiments, the coefficient of variation of efficiency measured during the still phase may be stored to memory prior to defining the threshold. Once the threshold is defined, the controller 14 monitors the coefficient of variation of efficiency (step 786) in conjunction with resonance shifts, and if the coefficient of variation of efficiency is greater than or equal to the threshold (step 788), the controller 14 adjusts the power level of amplifiers 18A-D (step 790). In one specific example, the controller 14 may maintain the milk at the temperature specified by the user (e.g., a "keep warm" functionality) or stop the heating of the milk altogether. Optionally, once the condition specified at step 788 is satisfied, or in other words, the controller 14 has estimated that the milk has reached the temperature specified by the user, the controller 14 may output a notification to the user interface 28 and/or a mobile device such as a smartphone (step 792). In response, a user may provide input to the controller 14 (via the user interface 28 or the mobile device) accepting the adjustments described at step 790 or otherwise making other adjustments, if desired.

Advantageously, method 780 described above greatly improves energy consumption and enables a user to obtain an optimum milk temperature without having to input any specific characteristics of the milk such as mass or volume. Likewise, the system 10 is able to implement method 780 without having to detect the specific mass or volume of the milk.

C. Automatic Butter and Chocolate Melt

Figure 37:
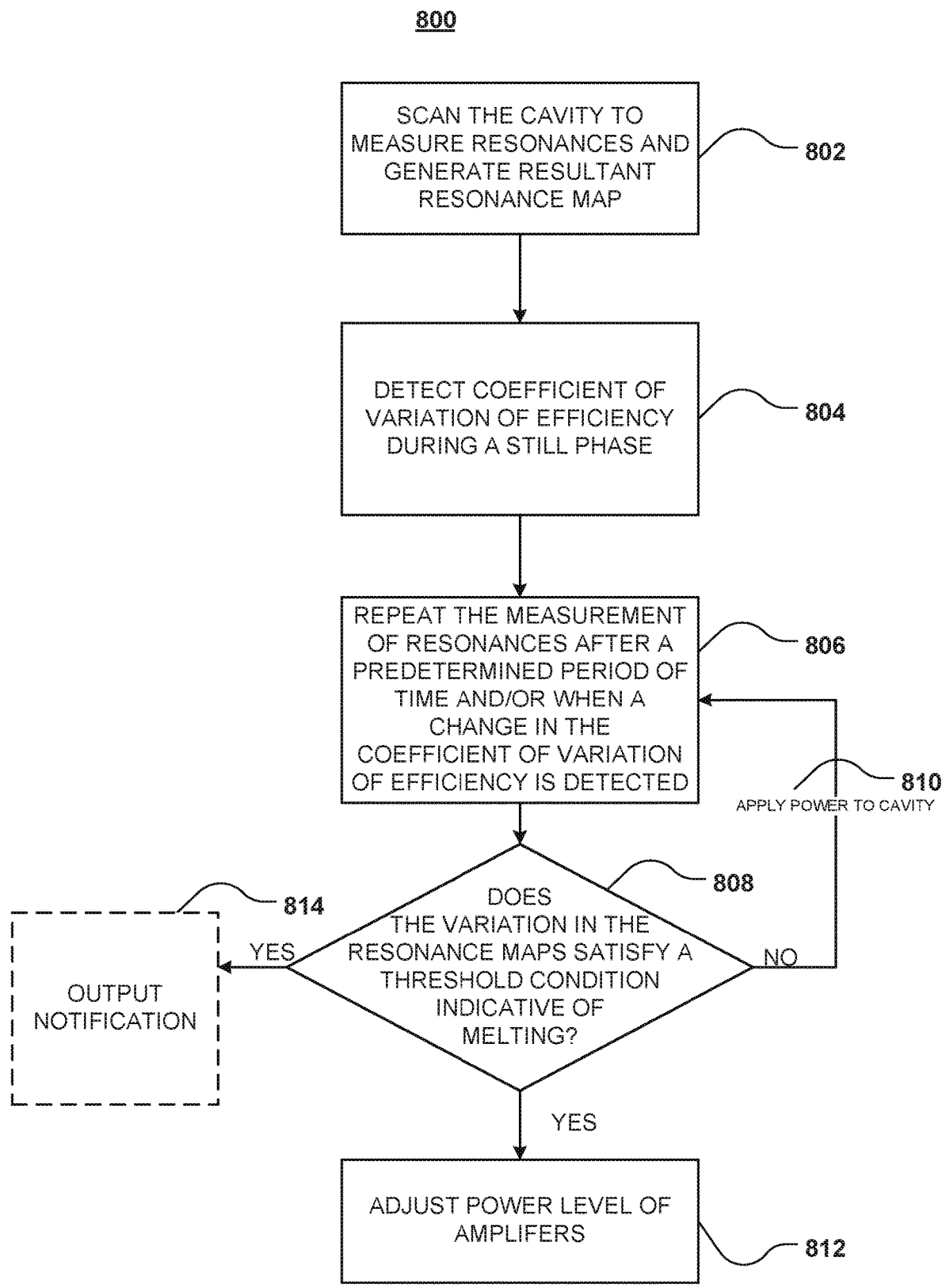
FIG. 37 is a flowchart illustrating a method of melting a food load based on changes in resonances and the coefficient of variation of efficiency.

The system 10 may also be utilized to accurately melt butter and chocolate without overheating the melted liquid. The controller 14 may control the melting of a food load such as butter or chocolate by performing a method 800 shown in FIG. 37, in which the controller 14 first scans the cavity 20 to measure resonances using spectromodal identification and generates a resultant resonance map (step 802), which may be stored to memory. In addition, the controller 14 may detect the coefficient of variation of efficiency during a still phase that may correspond to an initial heating period and initial volume (step 804). Next, the controller 14 conditionally repeats the measurement of the resonances after a predetermined period of time and/or when a change in the coefficient of variation of efficiency is detected (step 806). For example, the controller 14 may identify one or more changes in the coefficient of variation of efficiency following the still phase to be a change in volume of the food load. For chocolate, butter, and similar substances, the change in volume corresponds to a change in shape and consistency at the beginning of melting. The controller 14 may then determine if the variation between the resonance maps satisfies a threshold condition that is indicative of a melting condition (i.e., the food load is melting) (step 808). If not, the controller 14 controls the amplifiers 18A-D to apply power to the cavity 20 (e.g., with a predefined amount of energy) (step 810) before returning to step 806. Otherwise, the controller 14 adjusts the power level of amplifiers 18A-D (step 812) once the threshold condition is satisfied in step 808. In one specific example, the controller 14 determines that the condition specified in step 808 is satisfied if the rate of variation over time of the resonances falls below a predetermined threshold. In response, the controller 14 stops the heating of the food load. In some embodiments, the controller 14 will stop the heating process once a predefined amount of energy has been applied to the food load. In some control schemes, it is contemplated that the controller 14 may also adjust the power level of the system 10 according to the state of the food load. Optionally, once the condition specified at step 808 is satisfied, or in other words, the controller 14 has detected that the food load has melted, the controller 14 may output a notification to the user interface 28 or a mobile device such as a smartphone (step 814). In response, a user may provide input to the controller 14 (via the user interface 28 or the mobile device) accepting the adjustments described at step 812 or otherwise making other adjustments, if desired.

By using method 800 to control the system 10 during a melting process, perfect melting or softening can be automatically achieved with no burnt portions. Additionally, a user is not required to input the mass or volume of the food load to be melted. Furthermore, energy is saved due to the automatic stopping once melting has been achieved.

D. Automatic Splatter Control for Liquids, Sauces, and Mixed Loads

Figure 38:
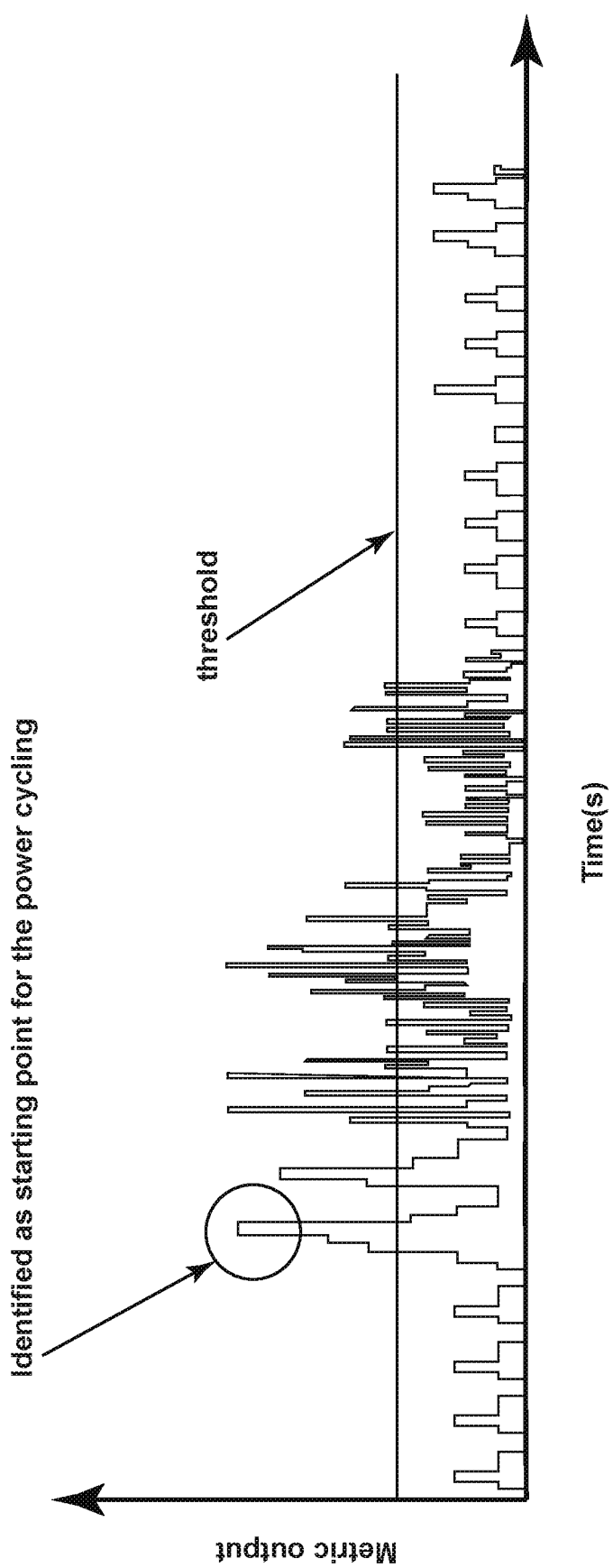
FIG. 38 illustrates sample data for the coefficient of variation of efficiency for a sauce heated in the cavity.

Referring now to FIG. 38, sample data is shown for the coefficient of variation (metric output) of efficiency for a liquid heated in the cooking cavity 20 over a period of time. The liquid may correspond to a sauce, for example. In some embodiments, the liquid may be part of a mixed load, that is, a food load having both liquid and solid constituents.

Figure 39:
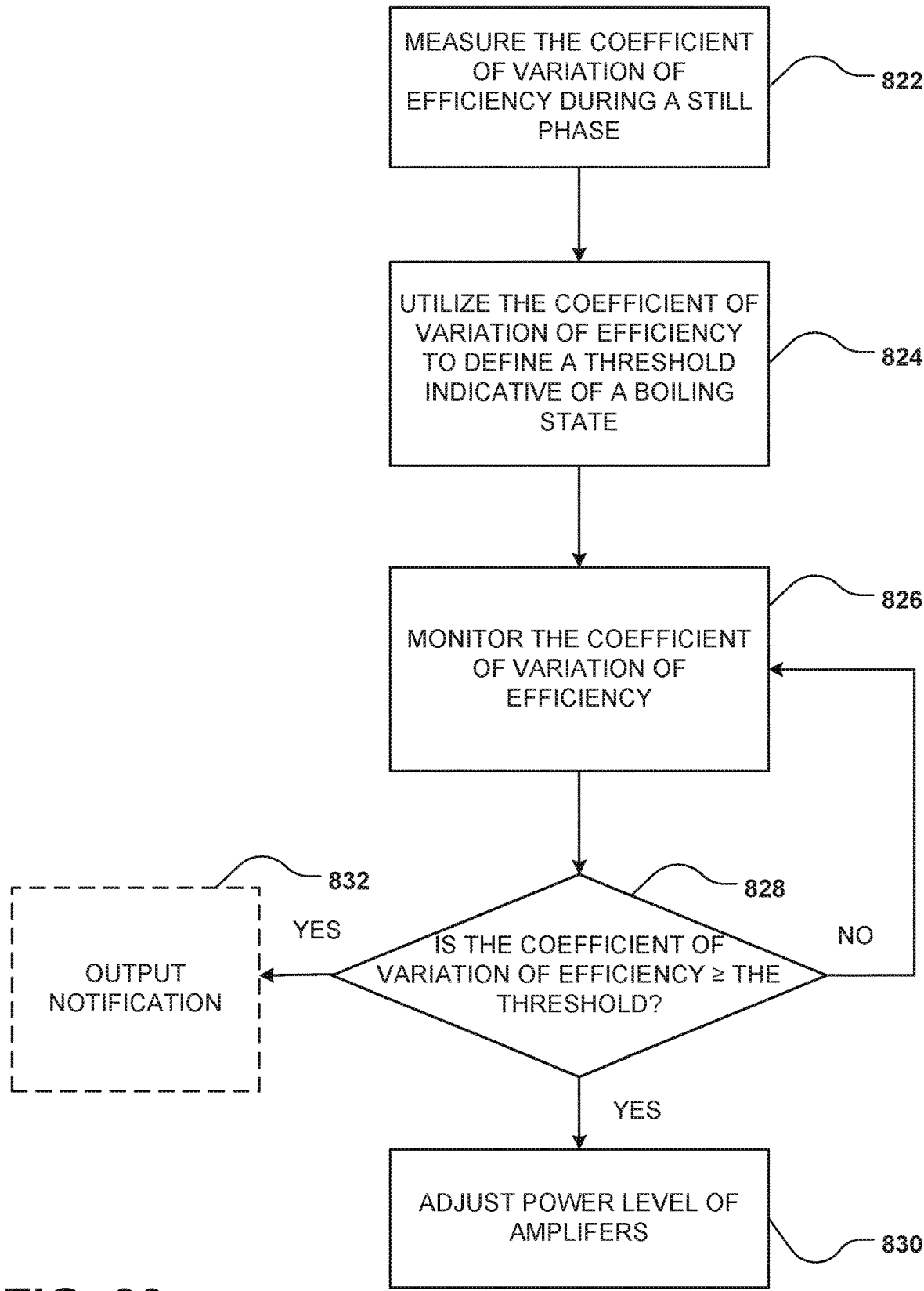
FIG. 39 is a flowchart illustrating a method of heating the sauce based on the coefficient of variation of efficiency and a threshold indicative of a boiling state of the sauce.

The controller 14 may control the heating of the liquid or an at least partially liquidized food load using a method 820 shown in FIG. 39, in which the controller 14 first measures the coefficient of variation of efficiency during a still phase (e.g., starting point, FIG. 38) that may correspond to an initial heating period (step 822). The coefficient of variation of efficiency for the still phase may be utilized to define a threshold (e.g., threshold 823, FIG. 38) indicative of a boiling state (step 824). In some embodiments, the coefficient of variation of efficiency measured during the still phased may be stored to memory prior to defining the threshold. Alternatively, the threshold may be defined by a predetermined value stored to memory. Once the threshold is defined, the controller 14 monitors the coefficient of variation of efficiency (step 826), and if the coefficient of variation of efficiency is greater than or equal to the threshold (step 828), the controller 14 adjusts a power level of amplifiers 18A-D (e.g., changing a duty cycle, input power, etc.) (step 830). Otherwise, the controller 14 continues to monitor the coefficient of variation of efficiency (step 826) until the condition specified at step 828 is satisfied. With respect to step 830, the adjustment may include reducing the power level until the coefficient of variation of efficiency is reduced by a predetermined amount followed by increasing the power level for a predetermined amount of time or until the coefficient of variation of efficiency satisfies the condition specified in step 828 (e.g., reaches the threshold). In this manner, the liquid is heated while avoiding splattering. So long as the condition specified in step 828 is satisfied, steps 828 and 830 may be continuously repeated or the heating of the liquid may be stopped after a predetermined period of time has passed. Optionally, once the condition specified at step 828 is satisfied, or in other words, the controller 14 has detected that the liquid has reached the boiling state, the controller 14 may output a notification to the user interface 28 or a mobile device such as a smartphone (step 832). In response, a user may provide input to the controller 14 (via the user interface 28 or the mobile device) accepting the adjustments described at step 830 or otherwise making other adjustments, if desired.

E. Automatic Popcorn Cooking

Figure 40:
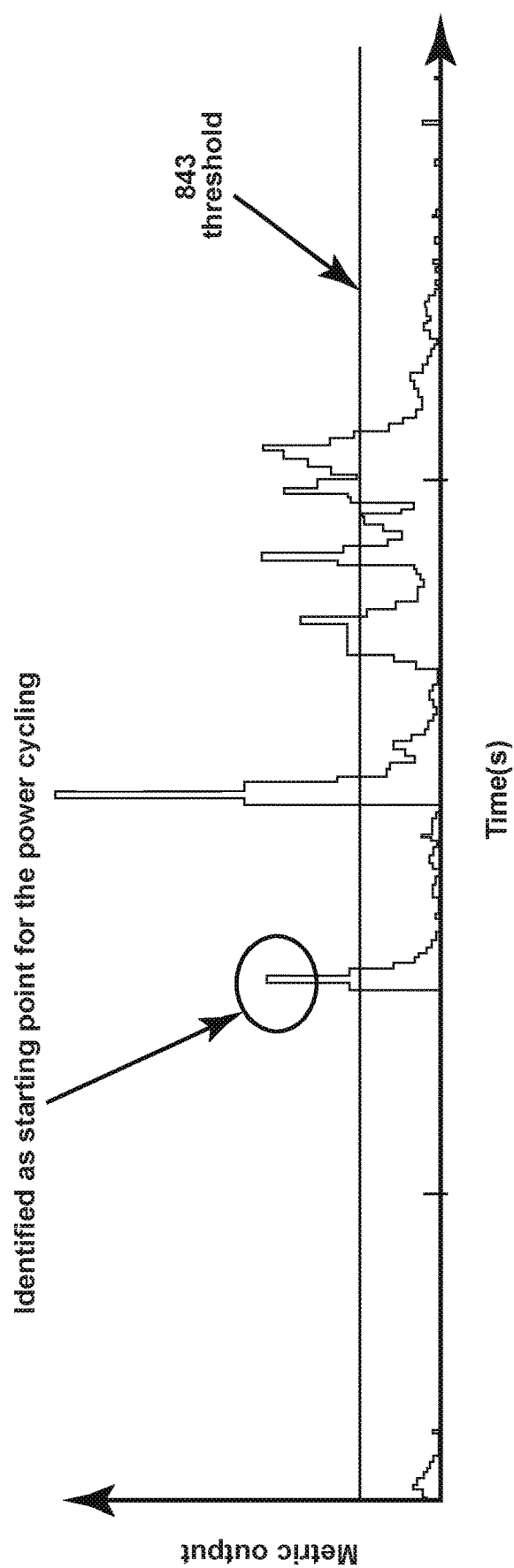
FIG. 40 illustrates sample data for the coefficient of variation of efficiency for popcorn being popped in the cavity.

Referring now to FIG. 40, sample data is shown for the coefficient of variation of efficiency (metric output) for popcorn being popped in the cavity 20 over a period of time. From the results, the coefficient of variation of efficiency is proportional to the frequency of popped kernels over time. Additionally, the coefficient of variation of efficiency is affected by sudden volume increases in the bag of popcorn once the popping begins. Accordingly, by monitoring the coefficient of variation of efficiency, the controller 14 may control the popping of the popcorn based on a frequency or timing of the kernels popped over time. The change in the coefficient of variation of efficiency in response to the popping may be linked to changes in volume and distribution of the kernels in the popcorn bag. As will be described in greater detail below, the controller 14 may control the popping of the popcorn based on detecting a beginning of popping and a threshold at which popping is complete.

Figure 41:
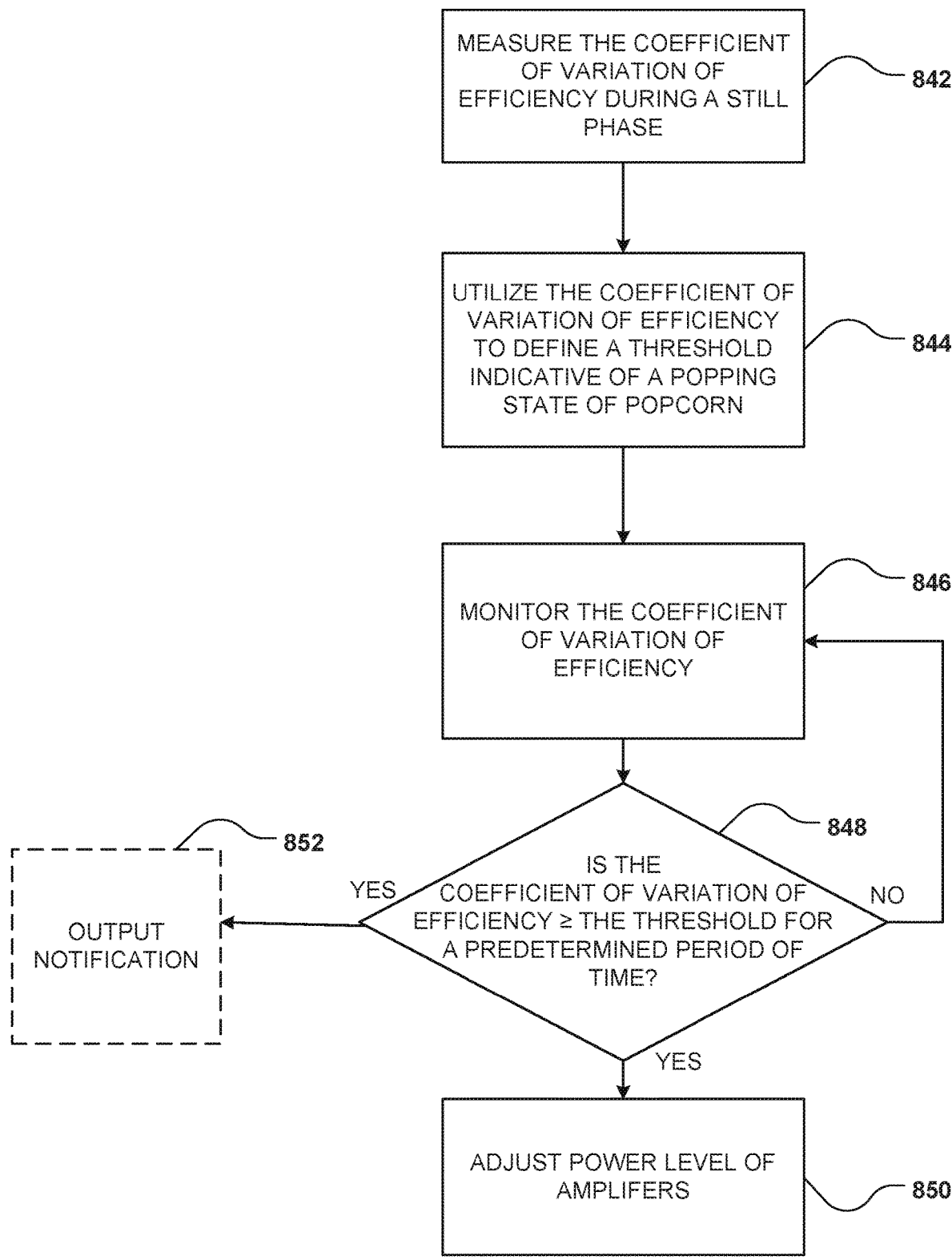
FIGS. 41 and 42 are flowcharts illustrating a method of popping popcorn based on the coefficient of variation of efficiency and a threshold indicative of a popping state of popcorn.

The controller 14 may control a popping process of popcorn by using a method 840 shown in FIG. 41, in which the controller 14 first measures the coefficient of variation of efficiency during a still phase (step 842) that may correspond to an initial popping period (e.g., the starting point, FIG. 39). The coefficient of variation of efficiency measured during the still phase may be utilized to define a threshold (e.g., threshold 843, FIG. 40) indicative of a popping state of the popcorn (step 844). In some embodiments, the coefficient of variation of efficiency measured during the still phase may be stored to memory prior to defining the threshold. Alternatively, the threshold may be defined by a predetermined value stored to memory. Once the threshold is defined, the controller 14 monitors the coefficient of variation of efficiency (step 846), and if the coefficient of variation of efficiency is greater than or equal to the threshold for a predetermined period of time (step 848), the controller 14 adjusts a power level of amplifiers 18A-D (e.g., changing a duty cycle, input power, etc.) (step 850). Otherwise, the controller 14 continues to monitor the coefficient of variation of efficiency (step 846) until the condition specified at step 848 is satisfied. With respect to step 850, the adjustment may include adjusting (e.g., maintaining or decreasing) the power level of amplifiers 18A-D and may also include assigning a time limit. Optionally, once the condition specified at step 848 is satisfied, or in other words, the controller 14 has detected that the popcorn is in the popping state, the controller 14 may output a notification to the user interface 28 or a mobile device such as a smartphone (step 852). In response, a user may provide input to the controller 14 (via the user interface 28 or the mobile device) accepting the adjustments described for step 850 or otherwise making other adjustments, if desired.

Figure 42:
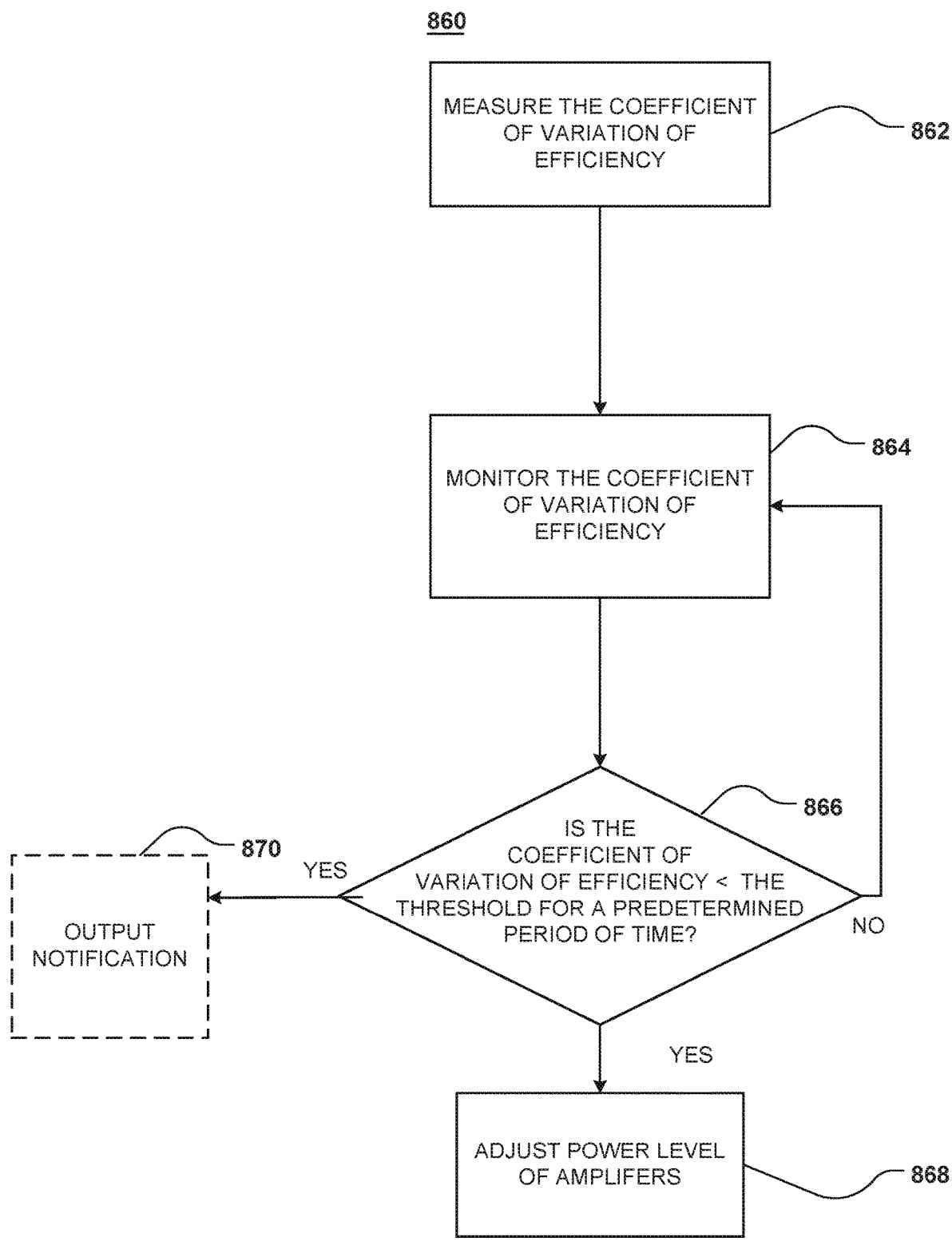

Subsequent to the completion of method 840, the end of the popping process may be detected in response to the coefficient of variation of efficiency being below the threshold for a predetermined amount of time. As shown in FIG. 42, method 860 begins with the controller 14 measuring the coefficient of variation of efficiency (step 862). The controller 14 monitors the coefficient of variation of efficiency (step 864), and if the coefficient of variation of efficiency falls below the threshold defined in step 844 of method 840 (step 866) for a predetermined period of time, the controller 14 adjusts (e.g., decreases) the power level and may also assign a time limit in which to end the popping process (step 868). Alternatively, the controller 14 may stop the popping process immediately. Otherwise, the controller 14 continues to monitor the coefficient of variation of efficiency (step 864) until the condition specified at step 866 is satisfied. Optionally, once the condition specified at step 866 is satisfied, or in other words, the controller 14 has detected that the popping of the popcorn has completed or is near completion, the controller 14 may output a notification to the user interface 28 or a mobile device such as a smartphone (step 870). In response, a user may provide input to the controller 14 (via the user interface 28 or the mobile device) accepting the adjustments described at step 868 or otherwise making other adjustments to the power level and/or time limit, if desired.

Advantageously, the methods 840 and 860 described above enable the system 10 to automatically pop popcorn without burning or undercooking the popcorn. Furthermore, by allowing the user to make adjustments to the power level and/or time limit, the user may fine tune the automatic popping feature to his or her liking.

A method of detecting a change in a Q-factor of the system 10 is now described with reference to FIG. 43. The system 10 may correspond to a radio frequency (RF) system that may be locally modeled as a linear passive time-invariant system equivalent to an RLC circuit. Such modeling may correspond to a Foster representation of admittance. The circuit equivalent may correspond to a Resistor/Inductor/Capacitor (RLC) equivalent that varies based on a size of the cooking cavity 14, feeding system (e.g. RF feed 26A-D, 226A-D positioning), type of food load (material and temperature), as well as food load size and displacement. As the food load is heated, resonances (RLC circuits) shift and the Q-factor changes due to its relation to the equivalent RLC circuit. The equation for the Q-factor is shown as Equation 4.

$$Q = \frac{1}{R}\sqrt{\frac{L}{C}} \quad \text{(Equation 4)}$$

The system 10 may be further configured to scan the cooking cavity 20 by monitoring the reflection signal to model the system response according to spectromodal theory.

For example, based on the reflected signals from the RF feeds 26A-D, 226A-D, the permittivity ε of the system 10 may be identified. Additionally, the loss tangent of the system 10 may be calculated as the ratio between an imaginary permittivity component ε" and a lossless permittivity component ε', wherein the lossless permittivity component is a product of a free space permittivity and a relative permittivity. The equation for the loss tangent is shown as Equation 5.

$$\tan\delta = \frac{\varepsilon''}{\varepsilon'} \quad \text{(Equation 5)}$$

Based on the loss tangent, the Q-factor may be calculated as the inverse of the loss tangent as shown in Equation 6.

$$Q = \frac{1}{\tan\delta} \quad \text{(Equation 6)}$$

In this way, the controller 14 may be operable to calculate the Q-factor based on the reflected signals from the RF feeds. Further details describing methods of modeling resonant cavities are discussed in Kurokawa, K., ed. *An Introduction to the Theory of Microwave Circuits.* publication: Academic Press, 2012, the entirety of which is incorporated herein by reference.

Accordingly, based on the reflected signals from the RF feeds, the controller 14 may identify various spectromodal characteristics of the cavity 20. In this way, the system 10 may determine and store poles (i.e. resonance frequencies) and map the Q-factor of the cooking cavity 20 in the frequency/phase domain. The system 10 may initially scan and map the Q-factor at the beginning of a cooking operation. The system 10 may further repeat the scan and map the Q-factor after a predetermined amount of time or when a change in the reflection pattern is detected.

By comparing the changes in the Q-factor over time, the system 10 is operable to quantify the amount of variation in the system 10 due to changes in the food load (e.g. temperature rise due to dielectric heating). In this way, the system can detect various changes in the food load for one or more automatic cooking functions.

Figure 43:
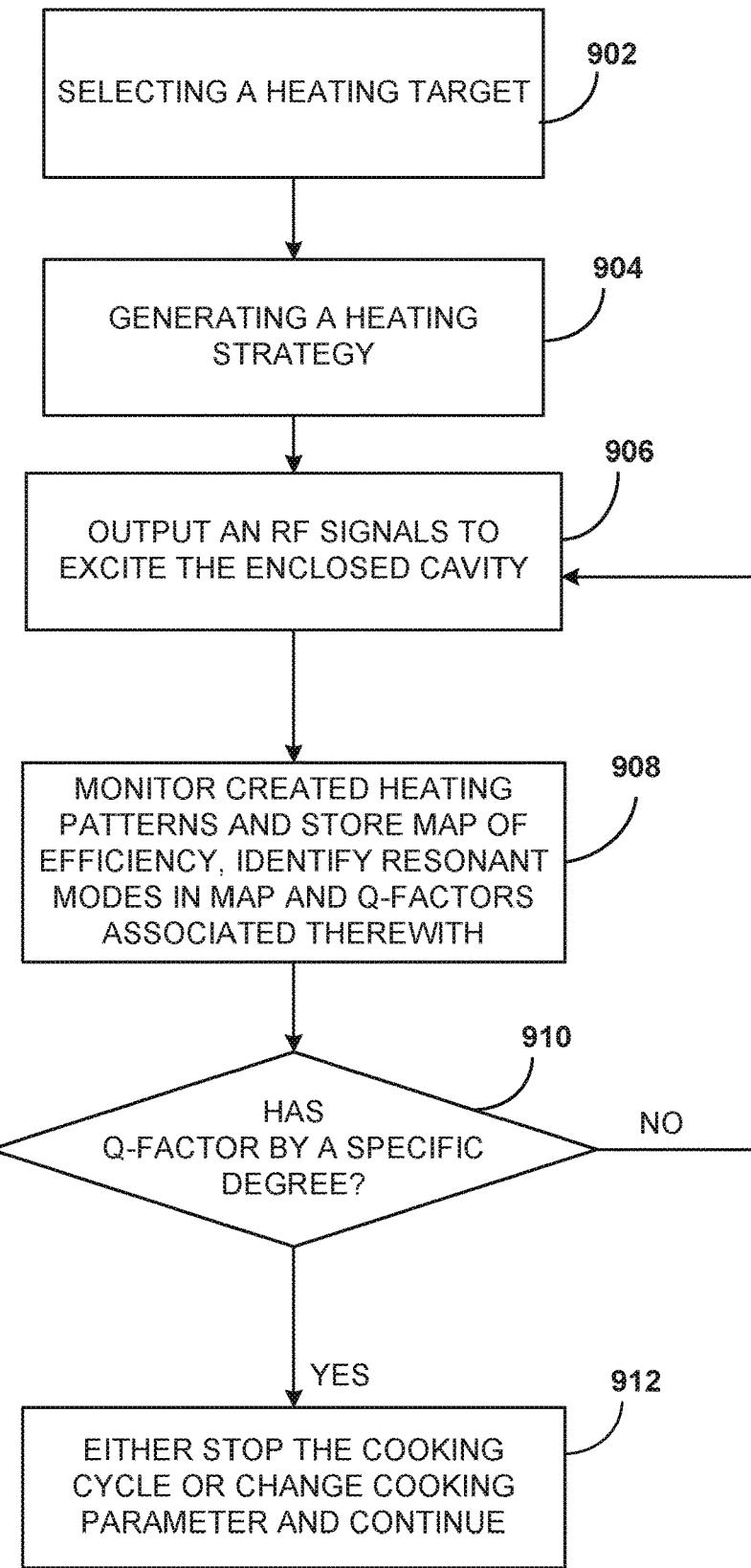
FIG. 43 is a flowchart illustrating a method of monitoring a food load using a Q-factor.

With reference to FIG. 43, a method 900 is provided for controlling cooking in an electromagnetic cooking device 10 having an enclosed cavity 20 in which a food load is placed and a plurality of RF feeds 26A-D, 226A-D configured to introduce electromagnetic radiation into the enclosed cavity 20 to heat up and prepare the food load, the plurality of RF feeds 26A-D, 226A-D configured to allow measurement of forward and backward power at the plurality of RF feeds 26A-D, 226A-D. The method may be executed by controller 14 and comprises: selecting a heating target corresponding to an amount of energy that is to be delivered to the food load positioned in the enclosed cavity 20 (step 902); generating a heating strategy based on the heating target to determine a sequence of desired heating patterns, the heating strategy having a selected sequence of resonant modes for energy transfer into the enclosed cavity 20 that corresponds to the sequence of desired heating patterns (step 904); causing the RF feeds 26A-D, 226A-D to output a radio frequency signal of a selected frequency, a selected phase value and a selected power level to thereby excite the enclosed cavity with a selected set of phasors for a set of frequencies corresponding to each resonant mode of the selected sequence of resonant modes to create heating patterns (step 906); monitoring the created heating patterns based on the forward and backward power measurements at the RF feeds 26A-D, 226A-D to measure resonances in the enclosed cavity using spectromodal identification and storing a map of efficiency in frequency and phase domains in which the controller identifies resonant modes and Q-factors associated with each of the identified resonant modes (step 908); determine if a specified change is detected in at least one Q-factor (step 910); and when the specified change in the at least one Q-factor is identified, stopping cooking of the food load using the generated heating strategy (step 912) otherwise continuing excite the cavity in accordance with the heating strategy and monitoring the Q-factor in steps 906-910.

The specified change in Q-factor may be when the Q-factor changes to a Q-factor that is indicative of completion of thawing. Specifically, the specified change in Q-factor may be when the Q-factor changes to be equal to about 8. It should be noted that the Q-factor of ice is about 300 and the Q-factor of water is about 8. Thus, a food load that has thawed will have a Q-factor of about 8. Accordingly, by monitoring the Q-factor, the electromagnetic cooking device 10 may implement an automatic defrost function that does not require the user to input the food type or food mass.

Also, by monitoring the Q-factor, the electromagnetic cooking device 10 may automatically determine when cooking of the food load is completed. In this case, the specified change in Q-factor is when the Q-factor changes to a Q-factor that is indicative of completion of cooking. The Q-factor that is indicative of completion of cooking may be determined by the user inputting an identification of the food type via user interface 28. Controller 14 may then select the heating target and generate the heating strategy based upon this identification of the food load. In addition, the controller may select a pre-stored map of efficiency showing resonance modes corresponding to a completely cooked food load of the type of the identified food load, identify Q-factors of the resonance modes in the pre-stored map, and compare the maps of efficiency stored during the cooking process to the pre-stored map to determine when the at least one Q-factor changes to a Q-factor that is identified from the pre-stored map, which is indicative of completion of cooking.

Figure 44A:
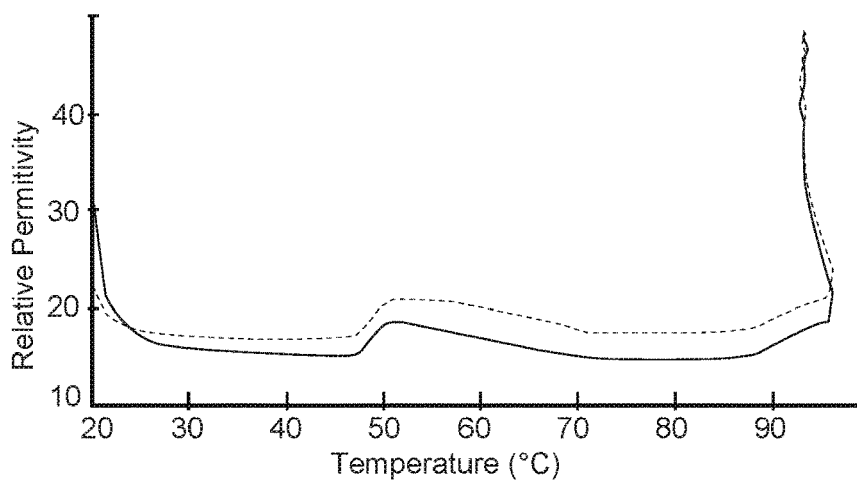
FIG. 44A is a plot demonstrating a relative permittivity for a bread based food load.
Figure 44B:
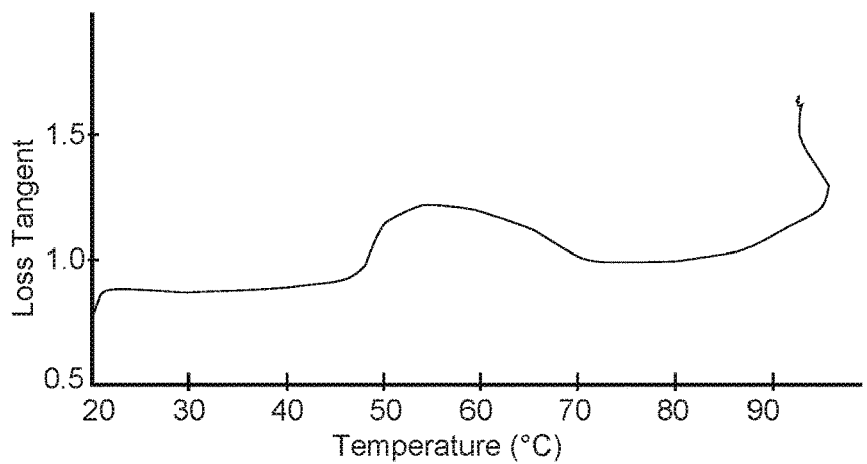
FIG. 44B is a plot demonstrating a loss tangent for a bread based food load.
Figure 44C:
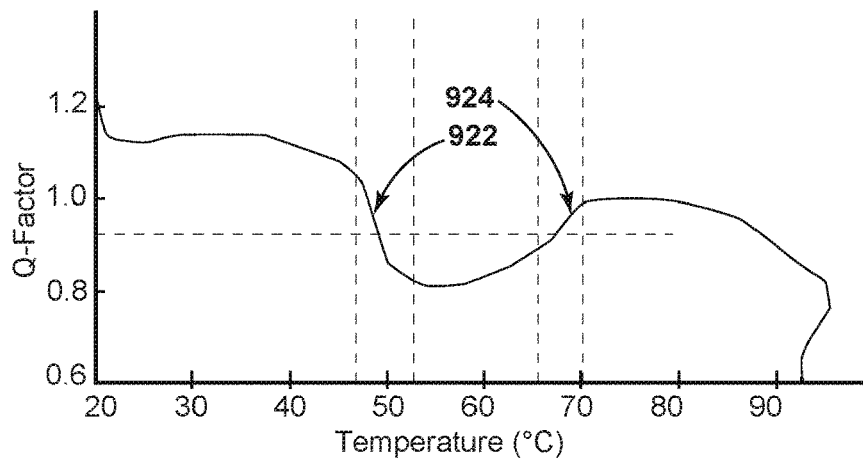
FIG. 44C is a plot demonstrating a Q-factor for a bread based food load.

Referring now to FIGS. 44, 45, and 46, plots are shown demonstrating the relative permittivity, loss tangent, and Q-factor for a plurality of food types. Referring first to FIGS. 44A, 44B, and 44C, experimental results for a bread or grain based food load are shown. The experimental results include a relative permittivity in FIG. 44A, a loss tangent in FIG. 44B, and a Q-factor in FIG. 44C for the bread in relation to a temperature of the bread. Each of the plots may demonstrate indications of various properties that may be utilized to identify a level of doneness or a cooking level of the bread. As discussed herein, doneness or a cooking level may correspond to a temperature that may indicate a completion of heating a food load to a desired level in the cooking cavity 20. Accordingly, in various embodiments, the controller 14 may determine a cooking temperature or level of preparation or doneness independent of an elapsed cooking time and independent of a starting temperature of the food load.

From the results demonstrated in one or more of FIGS. 44A, 44B, and 44C, the controller 14 may identify the level of doneness in the form of a chemical change or physical change in the food load. Referring to FIG. 44C, the Q-factor maintains a relatively consistent change over the temperatures from approximately 25° C. to 45° C. Then, between the temperatures of 47° C. and 53° C., the Q-factor changes rapidly. Accordingly, by monitoring the Q-factor for the food load, the controller 14 may identify a change in the Q-factor exceeding a predetermined change threshold. More particularly, the controller 14 may monitor the Q-factor to identify a decrease in the Q-factor exceeding a predetermined change threshold over a first change 922. In this case, in response to an indication that the food load comprises bread, the controller may monitor the Q-factor for a decrease in the Q-factor from approximately 1.05 to 0.85 or a change exceeding a decrease threshold of at least 0.1, which may occur over a predetermined period of time.

Because the Q-factor changes more rapidly over the first change 922 than during other periods of the cooking process, the controller 14 may identity an increase in the rate of change of the Q-factor exceeding a predetermined threshold for bread. Accordingly, the controller 14 may consistently identify the first change 922 in the bread and automatically stop or adjust the cooking cycle in response to the detection of the first change 922. In this specific example of the bread, the first change 922 may correspond to a first gas development of a yeast of the bread. Accordingly, in response to identifying the first change 922, the controller may identify first gas development of a yeast of the bread and adjust or stop a cooking cycle.

Note that the specific temperatures noted in FIGS. 44, 45, and 46 may be approximate. Accordingly, the specific temperature ranges (e.g. the first range 922) and others discussed herein may only be approximately the same as a known temperatures corresponding to a first gas development of a yeast and other physical and/or chemical changes discussed herein as being detected by the controller 14. However, this apparent error only demonstrates the strength of utilizing the Q-factor to detect the changes in the food load without the error demonstrated in the experimental results. In other words, the controller 14 may monitor the Q-factor to more accurately detect the changes in the physical and/or chemical structure of the food load than by utilizing a temperature probe like that utilized to gather the experimental results in FIGS. 44, 45, and 46. Also, though discussed in reference to specific foods and temperatures, the disclosure may provide for automatic detection of various properties of various food loads and their constituent ingredients.

Still referring to FIG. 44C, the controller may further identify a second change 924 in the Q-factor. More particularly, the controller 14 may monitor the Q-factor to identify an increase in the Q-factor exceeding a predetermined change threshold over the second change 922. In this case, in response to an indication that the food load comprises bread, the controller may first monitor the Q-factor the first change 922. Next the controller may monitor the food load for the second change 924 or an increase a decrease in the Q-factor from approximately 0.8 to 1 or 0.9 to 0.98 indicating an increase in the Q-factor exceeding an increase threshold of at least 0.1, which may occur in a predetermined period of time. For bread, the second change 924 may correspond to a concurrent enzymatic effect and starch gelatinization occurring over the measured temperatures of approximately 66° C.-71° C. Again, in response to the identification of the second change 924, the controller may automatically stop or adjust the cooking cycle.

Figure 45A:
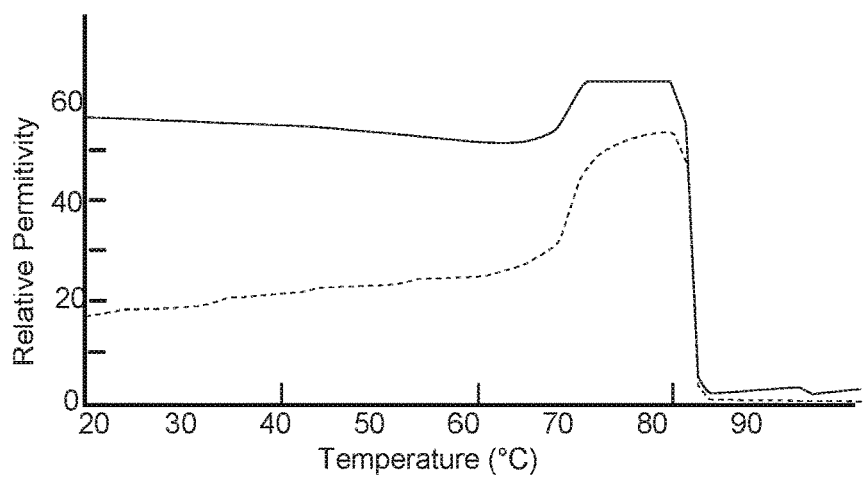
FIG. 45A is a plot demonstrating a relative permittivity for a potato based food load.
Figure 45B:
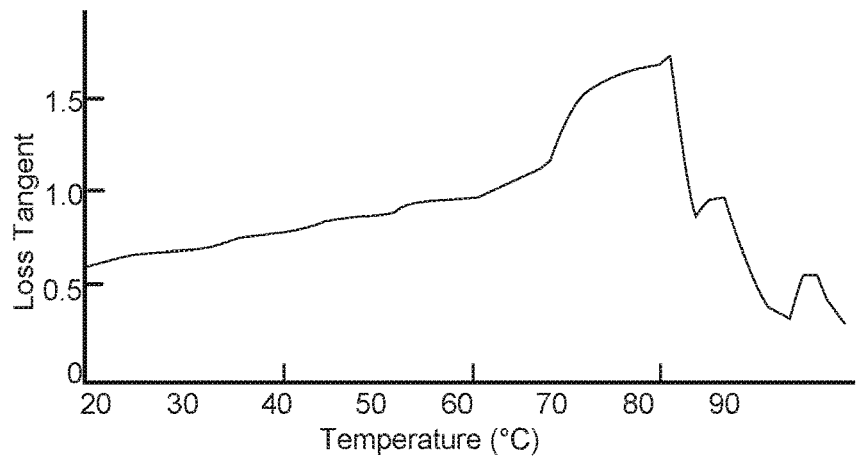
FIG. 45B is a plot demonstrating a loss tangent for a potato based food load.
Figure 45C:
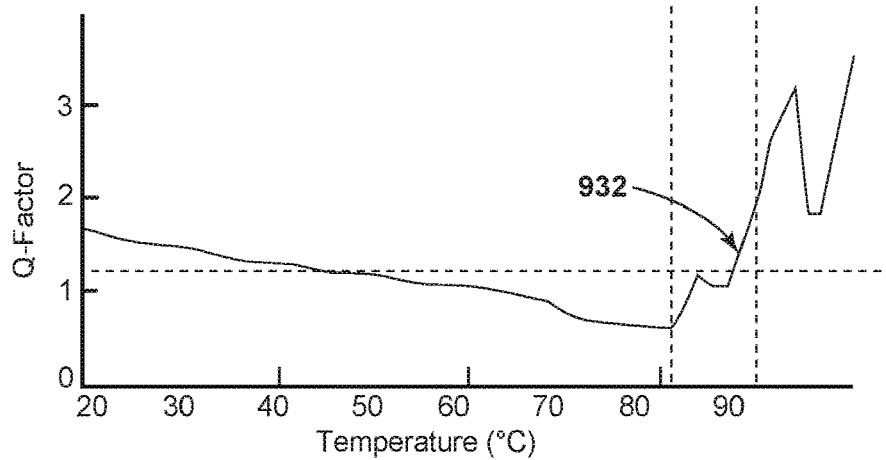
FIG. 45C is a plot demonstrating a Q-factor for a potato based food load.

Referring now to FIGS. 45A, 45B, and 45C, experimental results for a beef or meat based food load are shown. The experimental results include a relative permittivity in FIG. 45A, a loss tangent in FIG. 45B, and a Q-factor in FIG. 45C for the beef in relation to a temperature of the beef. Each of the plots may demonstrate indications of various properties that may be utilized to identify a level of doneness or a cooking level of the beef. From the results demonstrated in on or more of FIGS. 45A, 45B, and 45C, the controller 14 may identify the level of doneness in the form of a chemical change or physical change in the food load.

Referring to FIG. 45C, the Q-factor maintains a relatively consistent change over the temperatures from approximately 20° C. to 80° C. Then, between the temperatures of 80° C. and 90° C., the Q-factor changes rapidly. Accordingly, by monitoring the Q-factor for the food load, the controller 14 may identify a change in the Q-factor exceeding a predetermined change threshold. More particularly, the controller 14 may monitor the Q-factor to identify an increase in the Q-factor exceeding a predetermined change threshold over a third change 932. In this case, in response to an indication that the food load comprises beef, the controller may monitor the Q-factor for an increase in the Q-factor from approximately 0.6 to 1.1 or a change exceeding an increase threshold of at least 0.4, which may occur over a predetermined period of time. In this way, the controller may detect a level of doneness of the beef independent of an initial temperature of the beef and also independent of a total cooking time elapsed to cook the beef.

Because the Q-factor changes more rapidly over the third change 932 than during other periods of the cooking process, the controller 14 may identity an increase in the rate of change of the Q-factor exceeding a predetermined threshold for beef. Accordingly, the controller 14 may consistently identify the third change 932 in the beef and automatically stop or adjust the cooking cycle in response to the detection of the third change 932. In this specific example of the beef, the third change 932 may correspond to a protein denaturation of the beef. Accordingly, in response to identifying the third change 932, the controller 14 may identify protein denaturation of a meat and adjust or stop a cooking cycle.

Figure 46A:
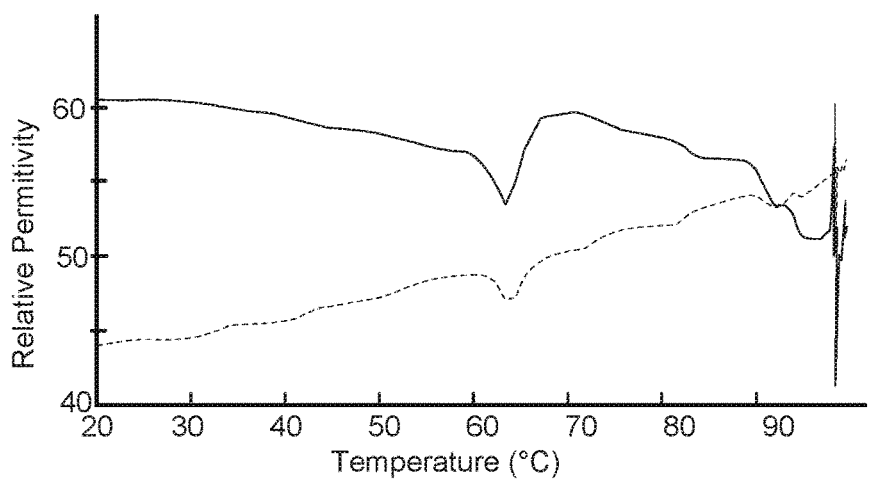
FIG. 46A is a plot demonstrating a relative permittivity for a meat based food load.
Figure 46B:
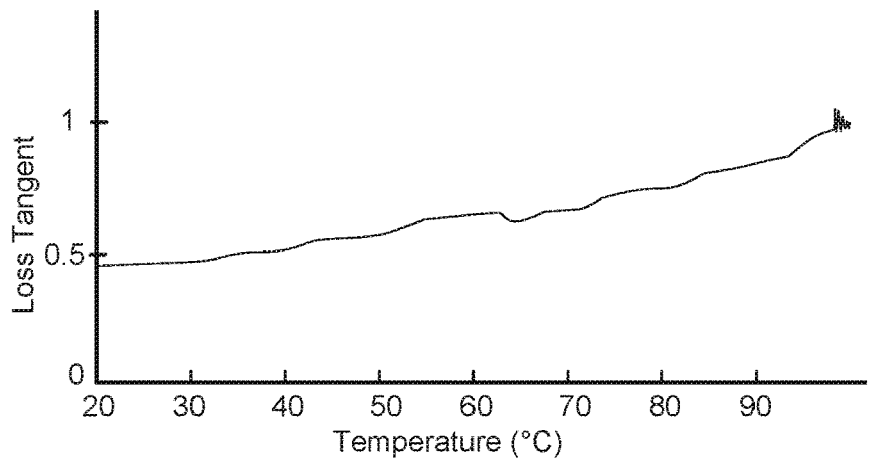
FIG. 46B is a plot demonstrating a loss tangent for a meat based food load.
Figure 46C:
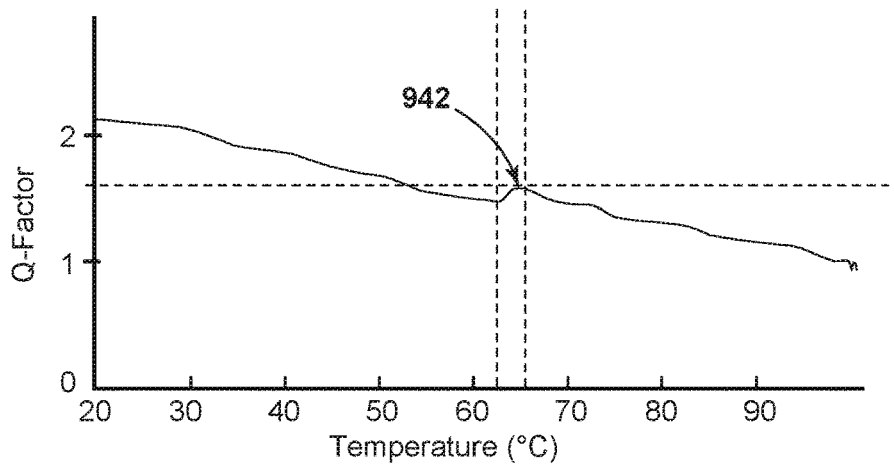
FIG. 46C is a plot demonstrating a Q-factor for a meat based food load.

Referring now to FIGS. 46A, 46B, and 46C, experimental results for a potato or food load containing potato starch are shown. The experimental results include a relative permittivity in FIG. 46A, a loss tangent in FIG. 46B, and a Q-factor in FIG. 46C for the potato in relation to a temperature of the potato. Each of the plots may demonstrate indications of various properties that may be utilized to identify a level of doneness or a cooking level of the potato. From the results demonstrated in on or more of FIGS. 45A, 45B, and 45C, the controller 14 may identify the level of doneness in the form of a chemical change or physical change in the food load.

Referring to FIG. 46C, the Q-factor maintains a relatively consistent change in the form of a gradual decrease over the temperatures from approximately 20° C. to 60° C. Then, between the temperatures of 60° C. and 65° C., the Q-factor changes direction and increases. Accordingly, by monitoring the Q-factor for the food load, the controller 14 may identify a change in the Q-factor exceeding a predetermined change threshold or a change in a rate of change or direction of the change in the Q-factor. More particularly, the controller 14 may monitor the Q-factor to identify an increase in the Q-factor exceeding a predetermined change threshold over a fourth change 942. In this case, in response to an indication that the food load comprises potato, the controller 14 may monitor the Q-factor for an increase in the Q-factor from approximately 1.4 to 1.7 or a change exceeding an increase threshold of at least 0.2 in a predetermined period of time. In this way, the controller 14 may detect a level of doneness of the potato independent of an initial temperature of the potato and also independent of a total cooking time elapsed to cook the potato.

Because the trend in the Q-factor changes in direction and rate over the fourth change 942, the controller 14 may identity an increase in the rate of change of the Q-factor exceeding a predetermined threshold for the potato. Accordingly, the controller 14 may consistently identify the fourth change 932 in the potato and automatically stop or adjust the cooking cycle in response to the detection of the fourth change 942. In this specific example of the potato, the fourth change 942 may correspond to a starch gelatinization of the potato starch. Accordingly, in response to identifying the fourth change 942, the controller 14 may identify starch gelatinization of the potato starch and adjust or stop a cooking cycle.

Figure 47:
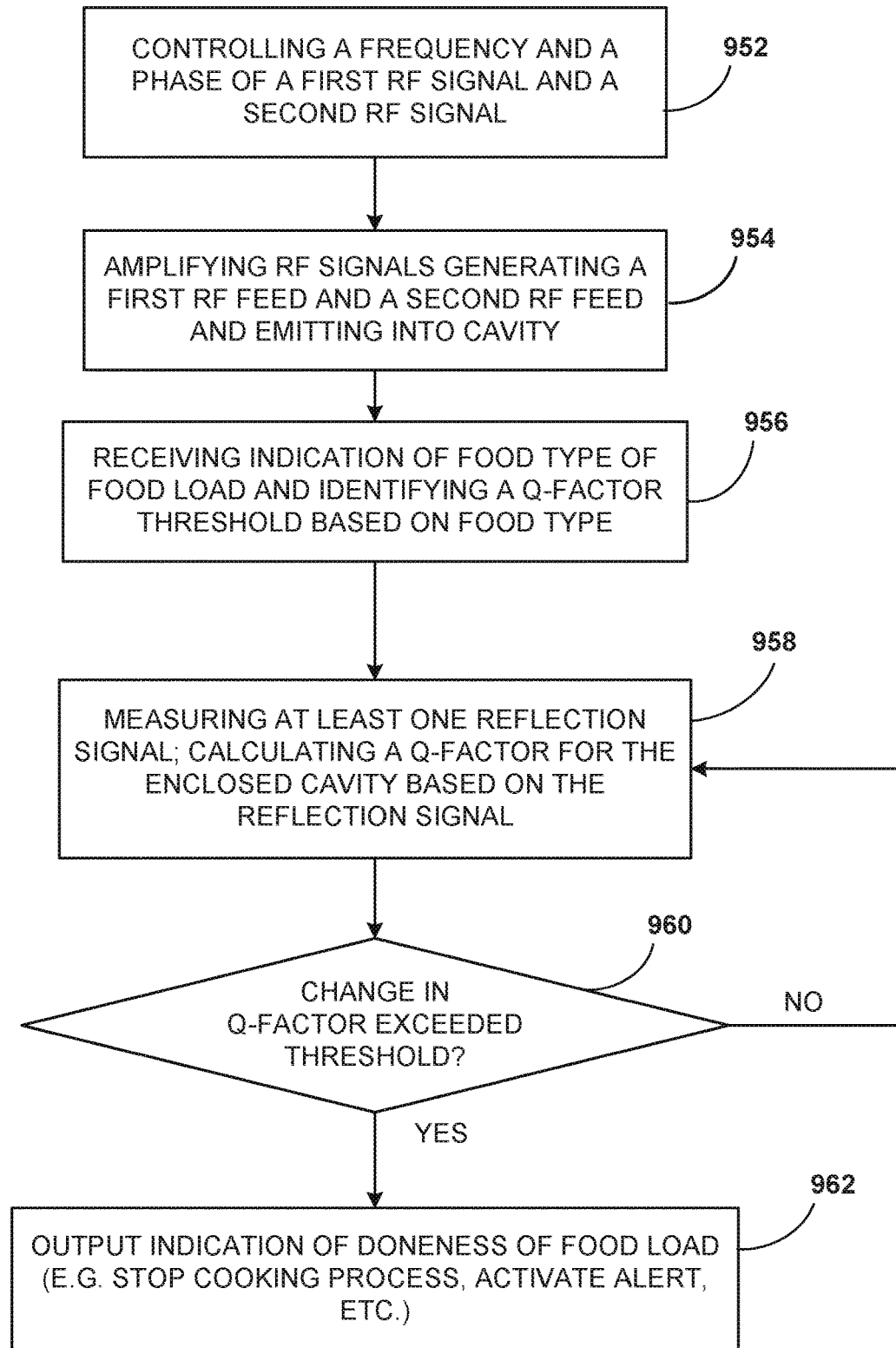
FIG. 47 is a flow chart of a method of identifying a level of doneness based on a Q-factor in accordance with the disclosure.

Referring now to FIG. 47, a method 950 of identifying a level of doneness of a food load based on a calculated Q-factor is discussed in further detail. The method 950 may begin by controlling a frequency and phase of the RF signals in step 952. In step 954, the controller 14 may control the high power amplifiers 18A-D generating at least a first RF feed and a second RF feed and emit the RF feeds in the cooking cavity 20. The controller 14 may additionally receive an indication of a food type of the food load in step 956. Based on the food type, the controller 14 may identify a Q-factor threshold or predetermined change threshold from memory corresponding to a level of doneness or cooking level of the food type. Once the cooking process has begun, in step 958, the controller 14 may measure at least one reflection signal from the cooking cavity 20 and calculate a Q-factor based on the reflection signal. The reflection signal may correspond to an indication of the forward and backward (or reflected) power magnitudes in the cavity 14.

From the calculation of the Q-factor, the controller 14 may monitor the Q-factor to identify a change in the Q-factor exceeding a predetermined change threshold in step 960. Though described generally as a predetermined change threshold, the predetermined change threshold may correspond to a predetermined rate of change, predetermined direction (increase or decrease) of a rate of change, and/or a predetermined change or sequence of changes in reference to a current direction, trend, or rate of change of the Q-factor. Some examples of detections of rates and directions (increases or decreases) in rates of change are discussed in reference to FIGS. 44, 45, and 46. If the change in the Q-factor does not exceed the predetermined threshold, the method 950 may return to step 958. If the change in the Q-factor does exceed the predetermined threshold, the controller 14 may identify that the food load has reached a level of completion or a doneness condition identified based on the particular food type indicated in step 956. In this way, the controller 14 may be operable to detect a level of doneness of the food load independent of an initial temperature of the food load and also independent of a total cooking time elapsed to cook the food load.

Although the above methods are described as being performed by controller 14, all or portions of the methods may be performed by RF control 32 or any other controller, microprocessor, microcontroller, logic circuit, or programmed gate array, either separately or in combination.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An electromagnetic cooking device comprising:
   a cavity in which a liquid is placed;
   a plurality of RF feeds configured to introduce electromagnetic radiation into the cavity for heating the liquid; and
   a controller configured to:
      analyze forward and backward power at the plurality of RF feeds to calculate efficiency;
      determine and monitor a coefficient of variation of the efficiency;
      detect a heating state in the liquid based on changes in the coefficient of variation; and
      adjust a power level of the electromagnetic radiation in response to detection of the heating state.

2. The electromagnetic cooking device of claim 1, wherein the coefficient of variation is based on a standard deviation and a mean of the efficiency during a predetermined period of time.

3. The electromagnetic cooking device of claim 2, wherein the coefficient of variation is determined by computing a quotient between the standard deviation and the mean.

4. The electromagnetic cooking device of claim 1, wherein the heating state is detected by comparing the coefficient of variation to a threshold, the threshold being predetermined or defined using the coefficient of variation determined during an initial heating period of the liquid.

5. The electromagnetic cooking device of claim 1, wherein the heating state is detected by comparing the coefficient of variation to a mask, the mask comprising a rising function that is predetermined or defined using the coefficient of variation determined during an initial heating period of the liquid.

6. The electromagnetic cooking device of claim 1, wherein the controller adjusts the power level by increasing the power level, decreasing the power level, or stopping the heating of the liquid.

7. A method of controlling cooking in an electromagnetic cooking device, the electromagnetic cooking device having a cavity in which a liquid is placed and a plurality of RF feeds configured to introduce electromagnetic radiation into the cavity to heat the liquid, the method comprising the steps of:
   analyzing forward and backward power at the plurality of RF feeds to calculate efficiency;
   determining a coefficient of variation of the efficiency;
   detecting a heating state in the liquid based on changes in the coefficient of variation; and
   adjusting a power level of the electromagnetic radiation in response to detection of the heating state.

8. The method of claim 7, wherein the coefficient of variation is determined by computing a quotient between a standard deviation and a mean of the efficiency during a predetermined period of time.

9. The method of claim 7, further comprising the step of outputting a notification upon detection of the heating state.

10. The method of claim 7, wherein the heating state is detected by comparing the coefficient of variation to a threshold, the threshold being predetermined or defined using the coefficient of variation determined during an initial heating period of the liquid.

11. The method of claim 7, wherein the heating state is detected by comparing the coefficient of variation to a mask, the mask comprising a rising function that is predetermined or defined using the coefficient of variation determined during an initial heating period of the liquid.

12. The method of claim 7, wherein the step of adjusting comprises increasing the power level, decreasing the power level, or stopping the heating of the liquid.

13. An electromagnetic cooking device comprising:
   a cavity in which a liquid is placed;
   a plurality of RF feeds configured to introduce electromagnetic radiation into the cavity to heat the liquid;
   a user interface with which to specify a heating process for the liquid; and
   a controller configured to:
      analyze forward and backward power at the plurality of RF feeds to calculate efficiency;
      determine and monitor a coefficient of variation of the efficiency, the coefficient of variation being proportional to a boiling level of the liquid;
      detect a heating state in the liquid based on changes in the coefficient of variation, the heating state being determined by the heating process specified via the user interface;
      adjust a power level of the electromagnetic radiation in response to detection of the heating state.

14. The electromagnetic cooking device of claim 13, wherein the coefficient of variation is determined by computing a quotient between a standard deviation and a mean of the efficiency during a predetermined period of time.

15. The electromagnetic cooking device of claim 13, wherein the heating state is detected if the coefficient of variation is greater than or equal to a threshold for a predetermined period of time, the threshold being predetermined or defined using the coefficient of variation determined during an initial heating period of the liquid.

16. The electromagnetic cooking device of claim 13, wherein the heating state is detected if the coefficient of variation fits to a mask for a predetermined period of time, the mask comprising a rising function that is predetermined or defined using the coefficient of variation determined during an initial heating period of the liquid.

17. The electromagnetic cooking device of claim 13, wherein the controller adjusts the power level by increasing the power level, decreasing the power level, or stopping the heating of the liquid.

* * * * *